(12) United States Patent
Shiraishi et al.

(10) Patent No.: US 6,621,508 B1
(45) Date of Patent: Sep. 16, 2003

(54) INFORMATION PROCESSING SYSTEM

(75) Inventors: Atsushi Shiraishi, Suwa (JP); Keisuke Tsuji, Suwa (JP); Roy Nakashima, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/484,855

(22) Filed: Jan. 18, 2000

(51) Int. Cl.$^7$ .................................................. G09G 5/00
(52) U.S. Cl. ...................... 345/810; 345/835; 345/764; 345/841; 345/778; 345/781
(58) Field of Search .............................. 345/769, 733, 345/810, 835, 764, 841, 963, 751, 752, 778, 864, 727, 728, 740, 748, 781, 790, 792; 709/201

(56) References Cited

U.S. PATENT DOCUMENTS

| | | | | |
|---|---|---|---|---|
| 5,438,679 A | * | 8/1995 | Inomata et al. | 714/47 |
| 5,592,605 A | * | 1/1997 | Asuma et al. | 345/775 |
| 5,796,394 A | * | 8/1998 | Wicks et al. | 345/751 |
| 5,956,025 A | * | 9/1999 | Goulden et al. | 345/716 |
| 6,000,000 A | * | 12/1999 | Hawkins et al. | 707/201 |
| 6,198,479 B1 | * | 3/2001 | Humpleman et al. | 345/733 |
| 6,466,971 B1 | * | 10/2002 | Humpleman et al. | 709/220 |

* cited by examiner

*Primary Examiner*—John W. Cabeca
*Assistant Examiner*—Cuong T. Thai

(57) ABSTRACT

The menu displays of a base-station device and its data-correlated, portable device are managed. In the base-station device, first icon information corresponding to the menu is displayed on a first display screen. In the portable device, second icon information (corresponding to the first) is displayed on a second display screen. The base-station device has a first storage unit for storing the first icon information, a first display control unit for controlling a first display unit, and a first communication unit for communicating with the portable device. The portable device has a second storage unit for storing the second icon information, a second display control unit for controlling a second display unit, and a second communication unit for communicating with the base-station device and for matching pieces of display data stored in the first and second storage units. Thus, the size of the second icon information is maintained smaller than the size of the first.

18 Claims, 70 Drawing Sheets

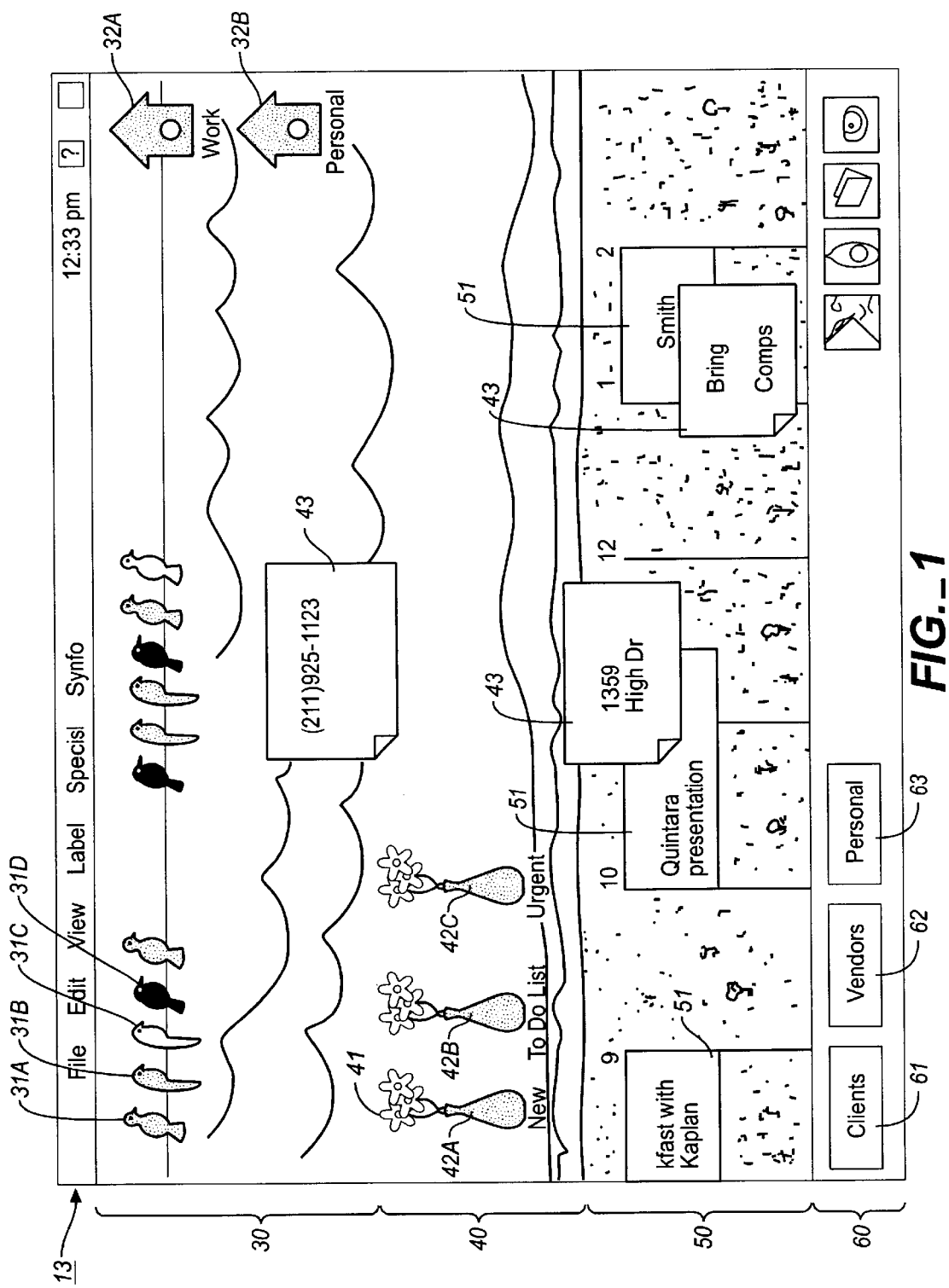
FIG._1

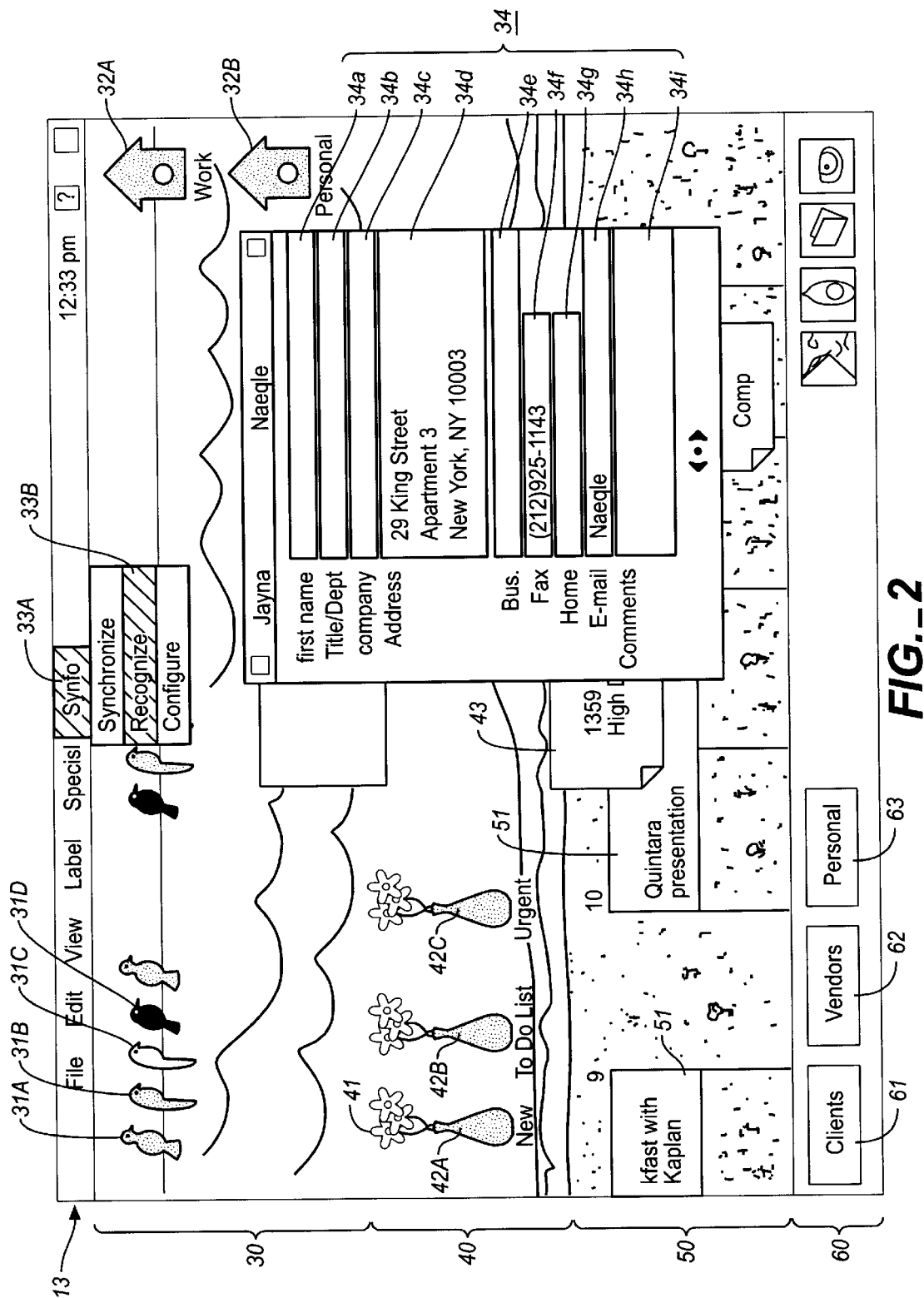
FIG._2

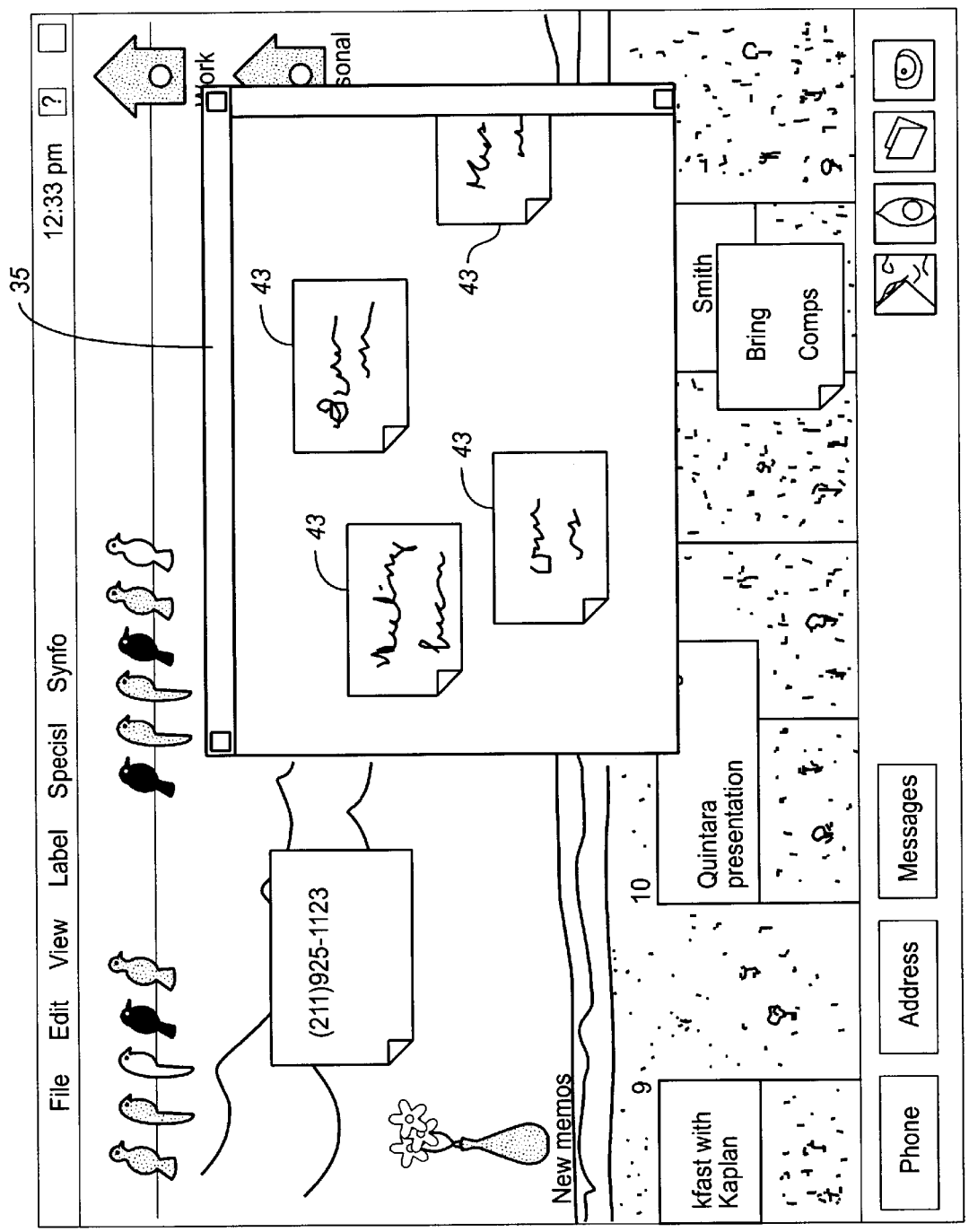
FIG._3

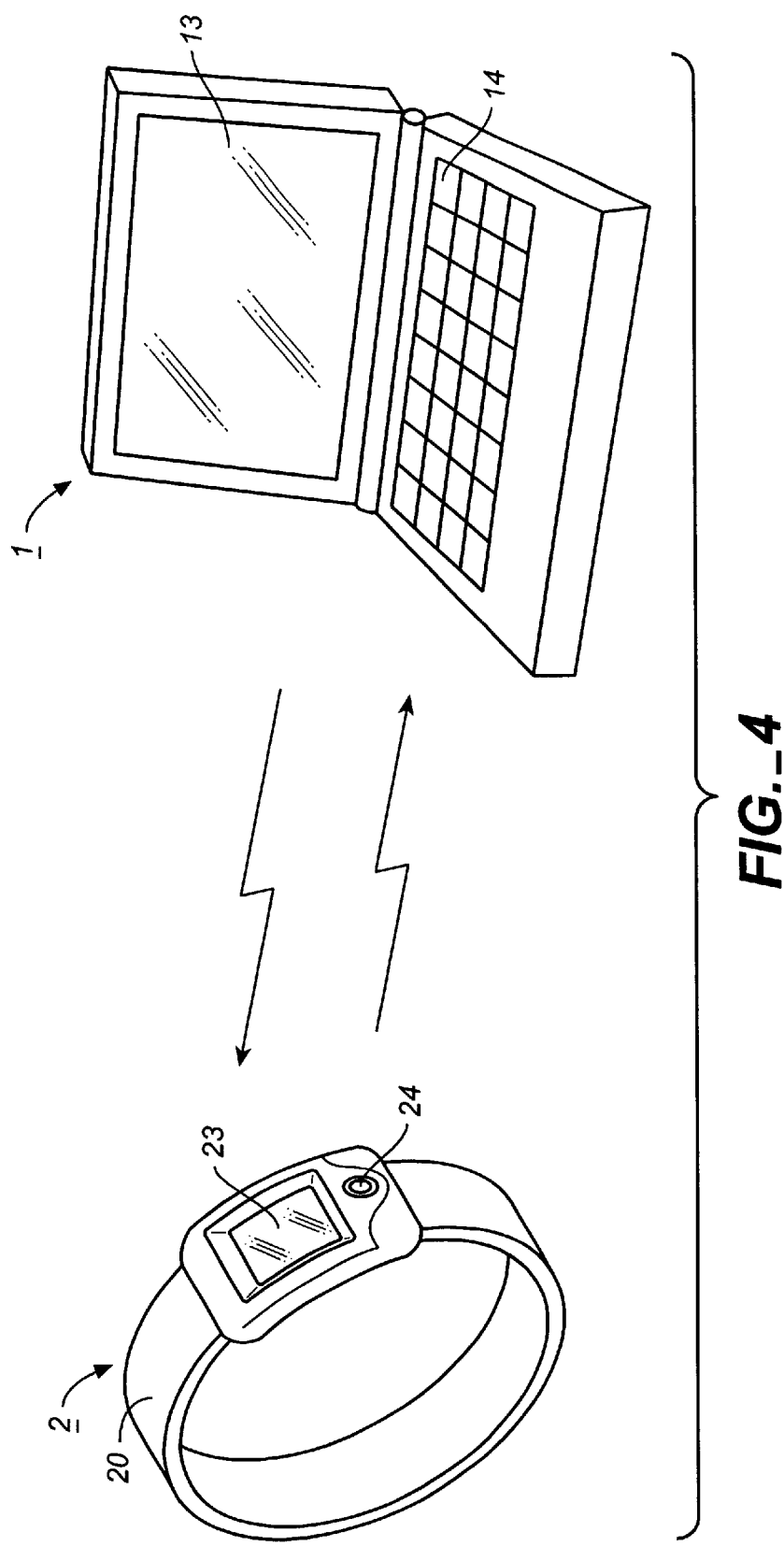
FIG._4

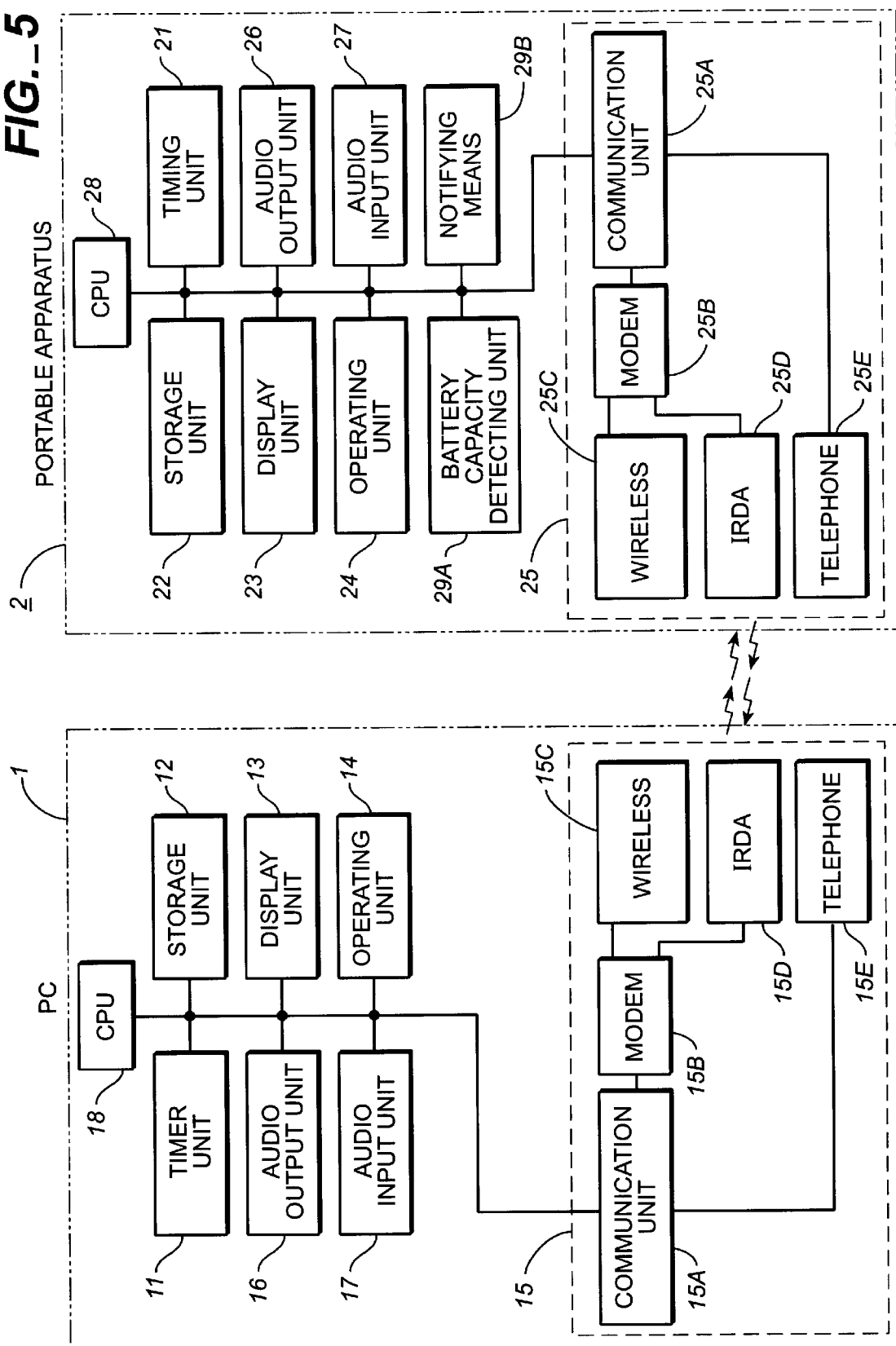

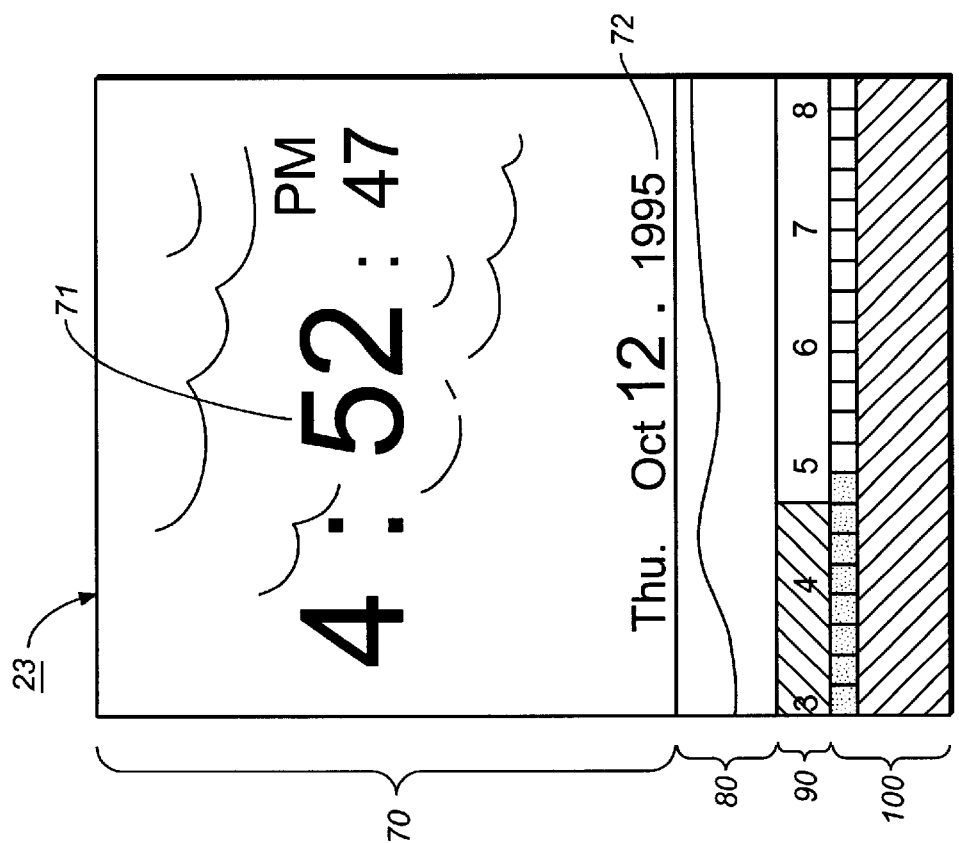
FIG._7
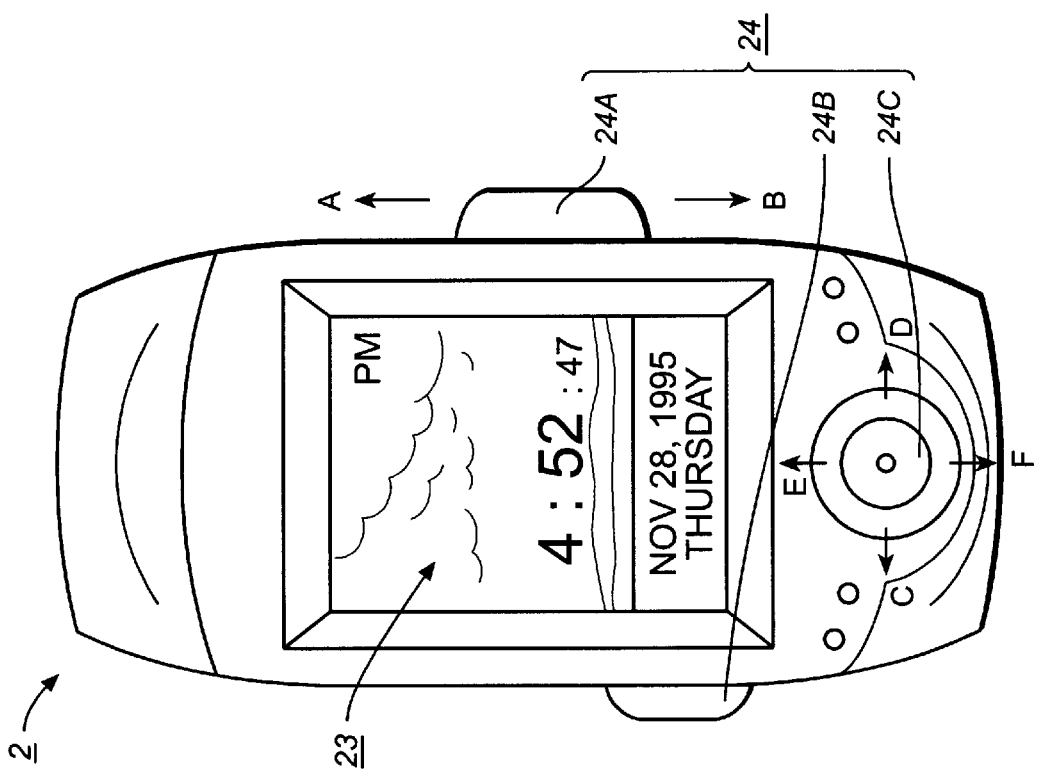
FIG._6

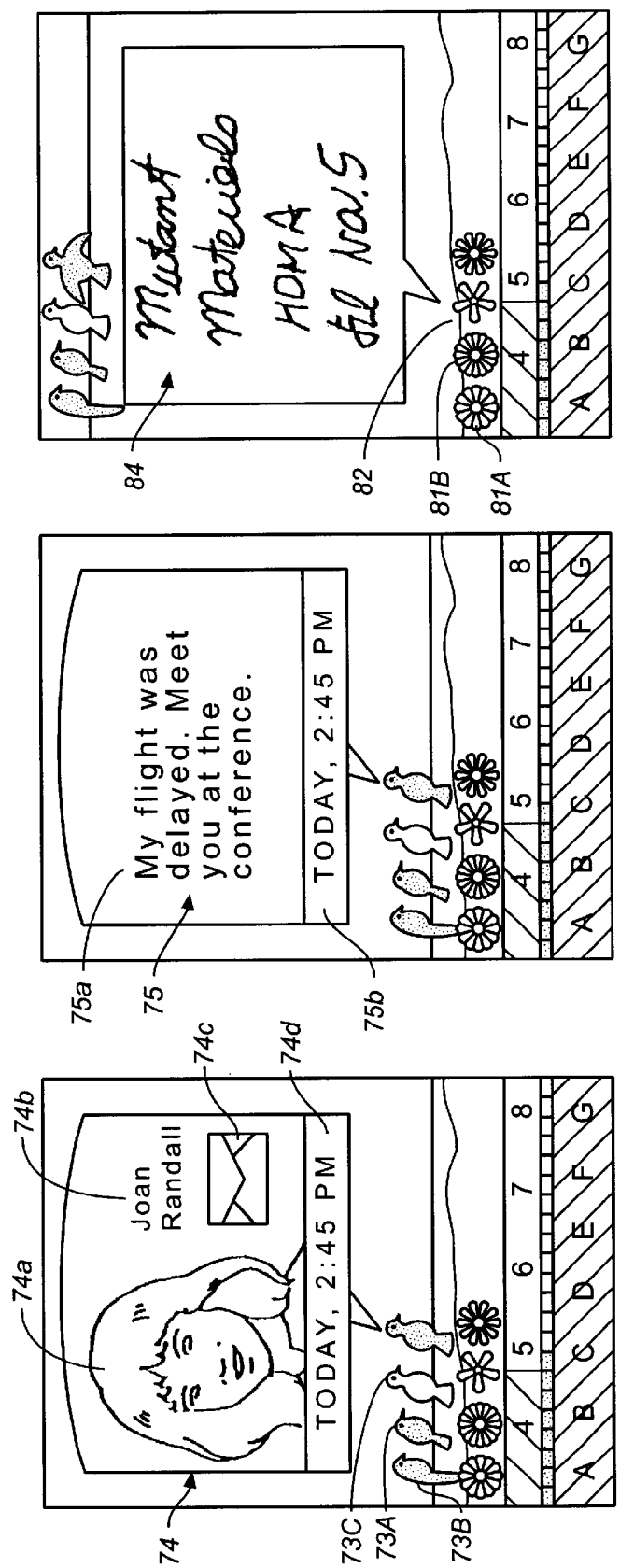

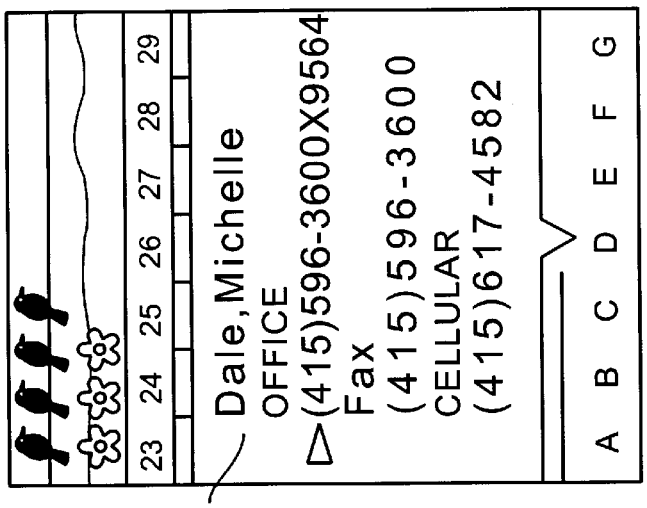
FIG._8F
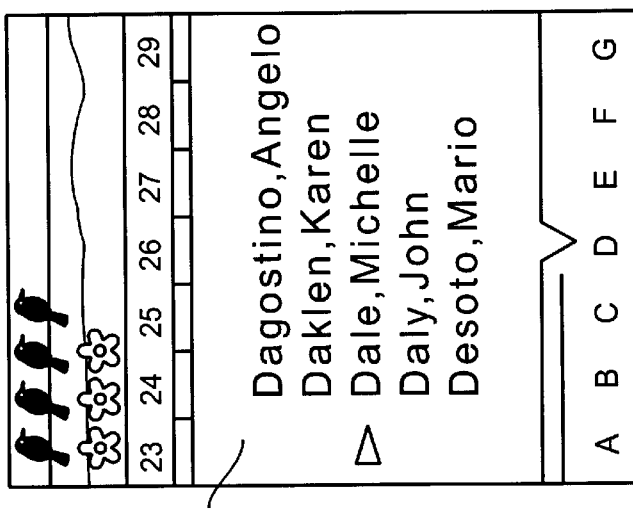
FIG._8E
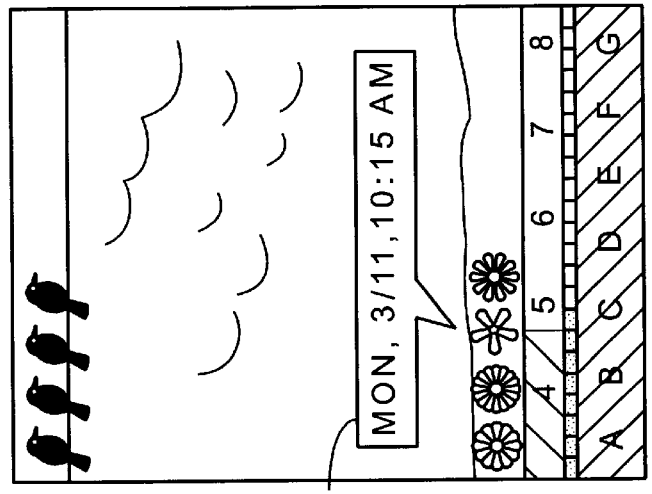
FIG._8D

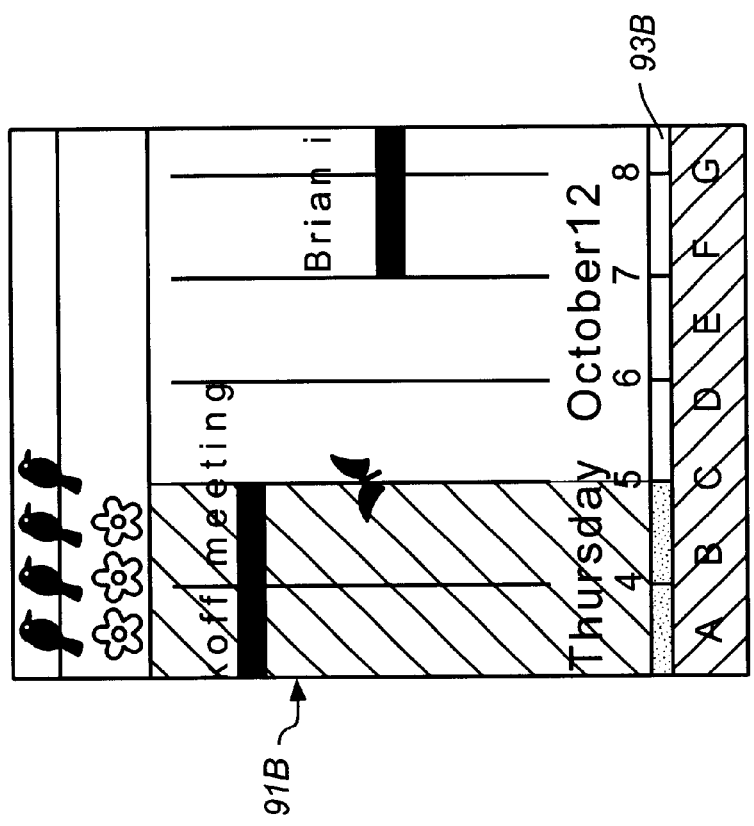
FIG._9B
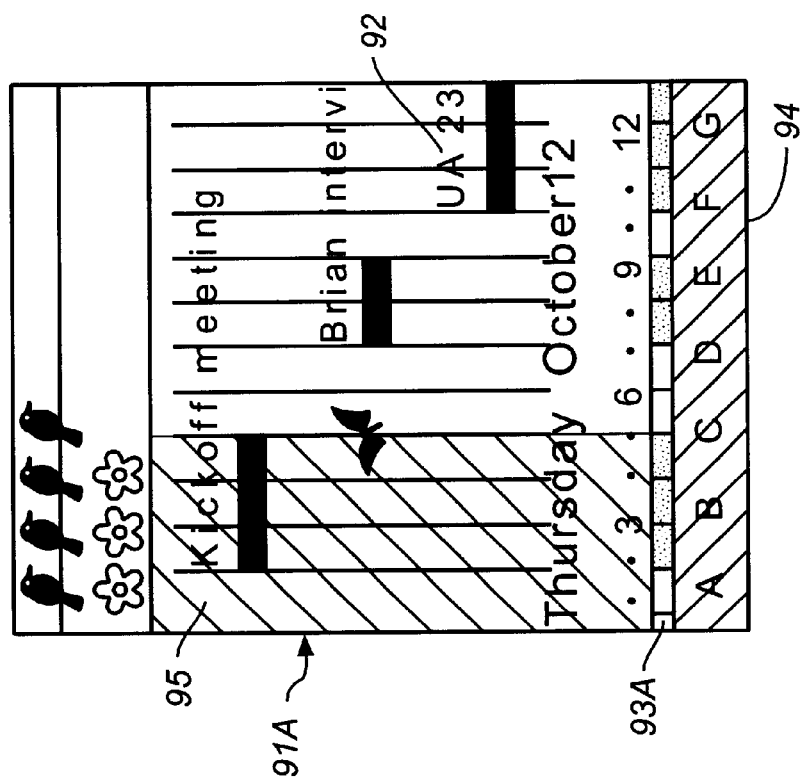
FIG._9A

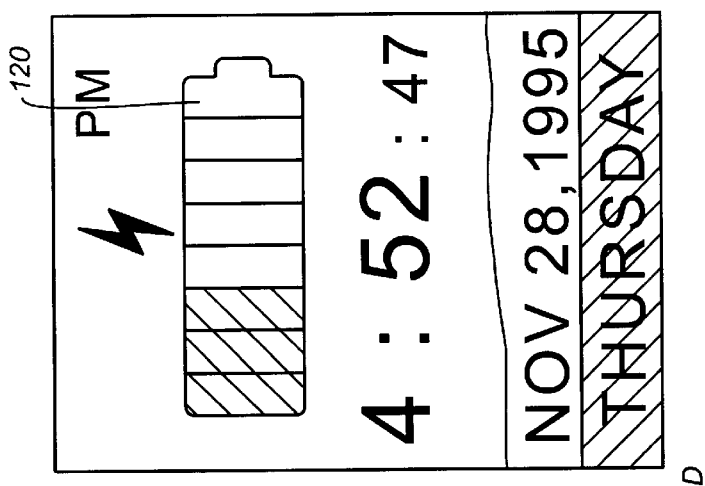
FIG._9E
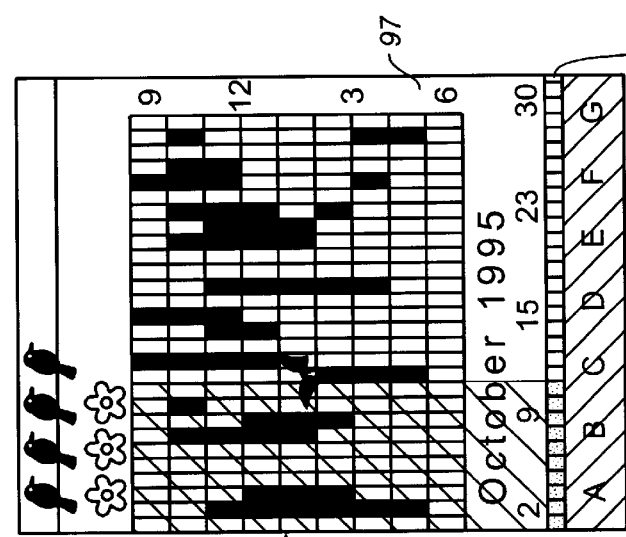
FIG._9D
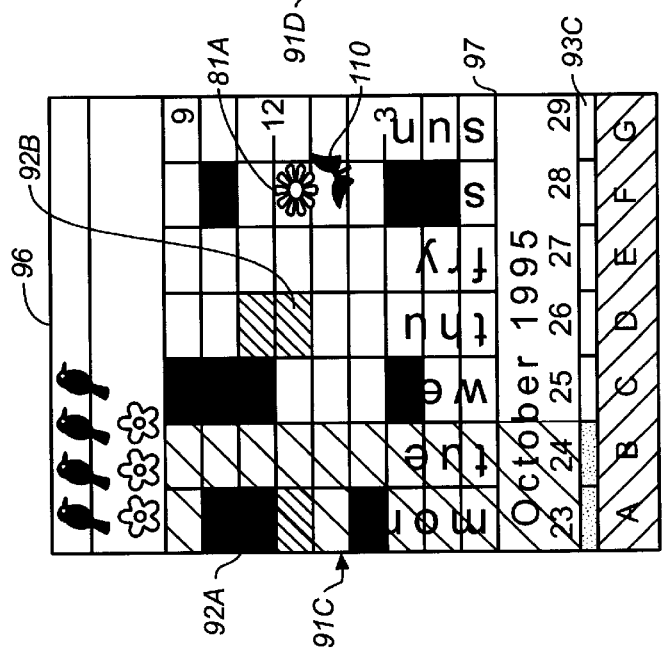
FIG._9C

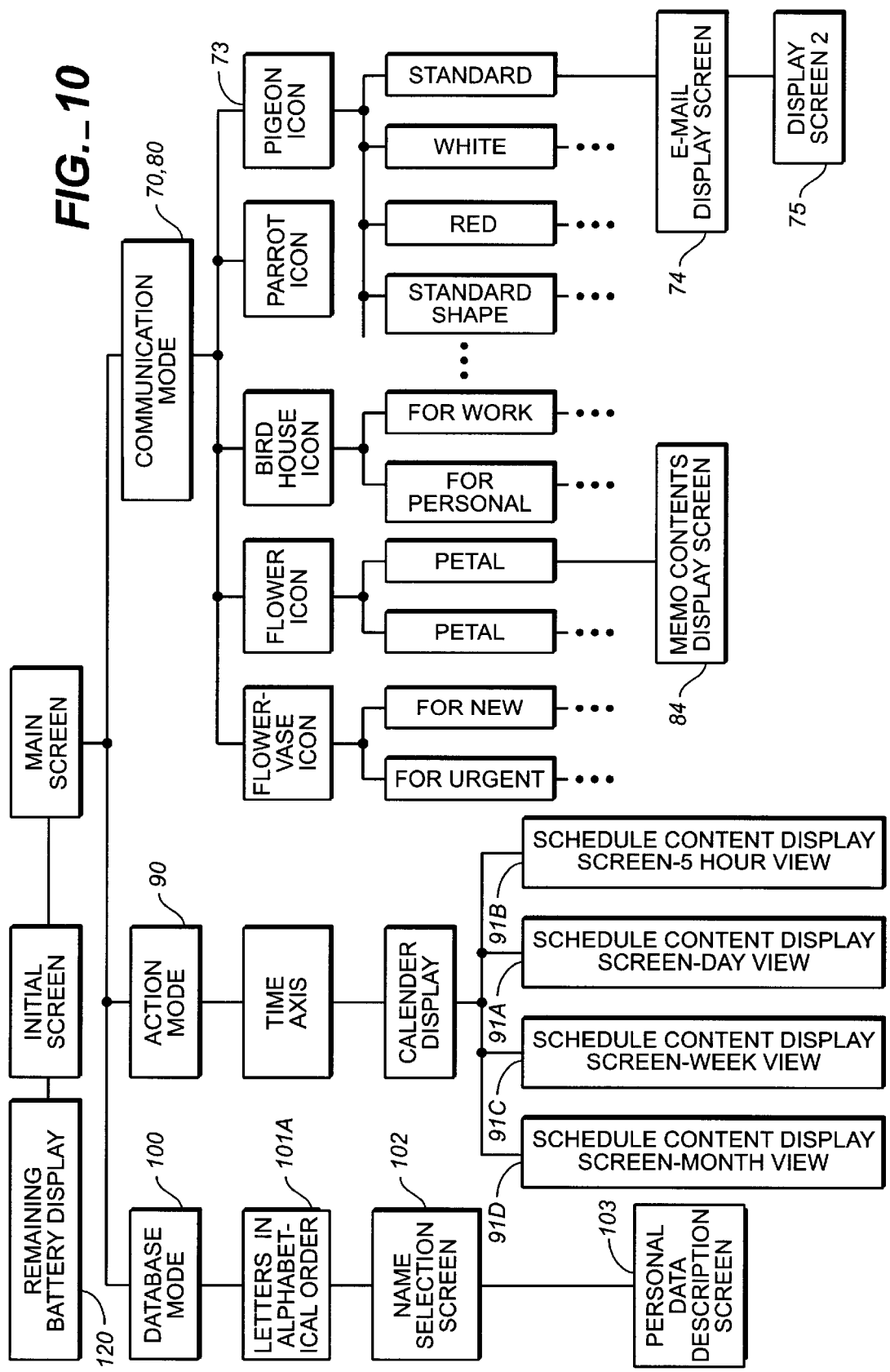
FIG._10

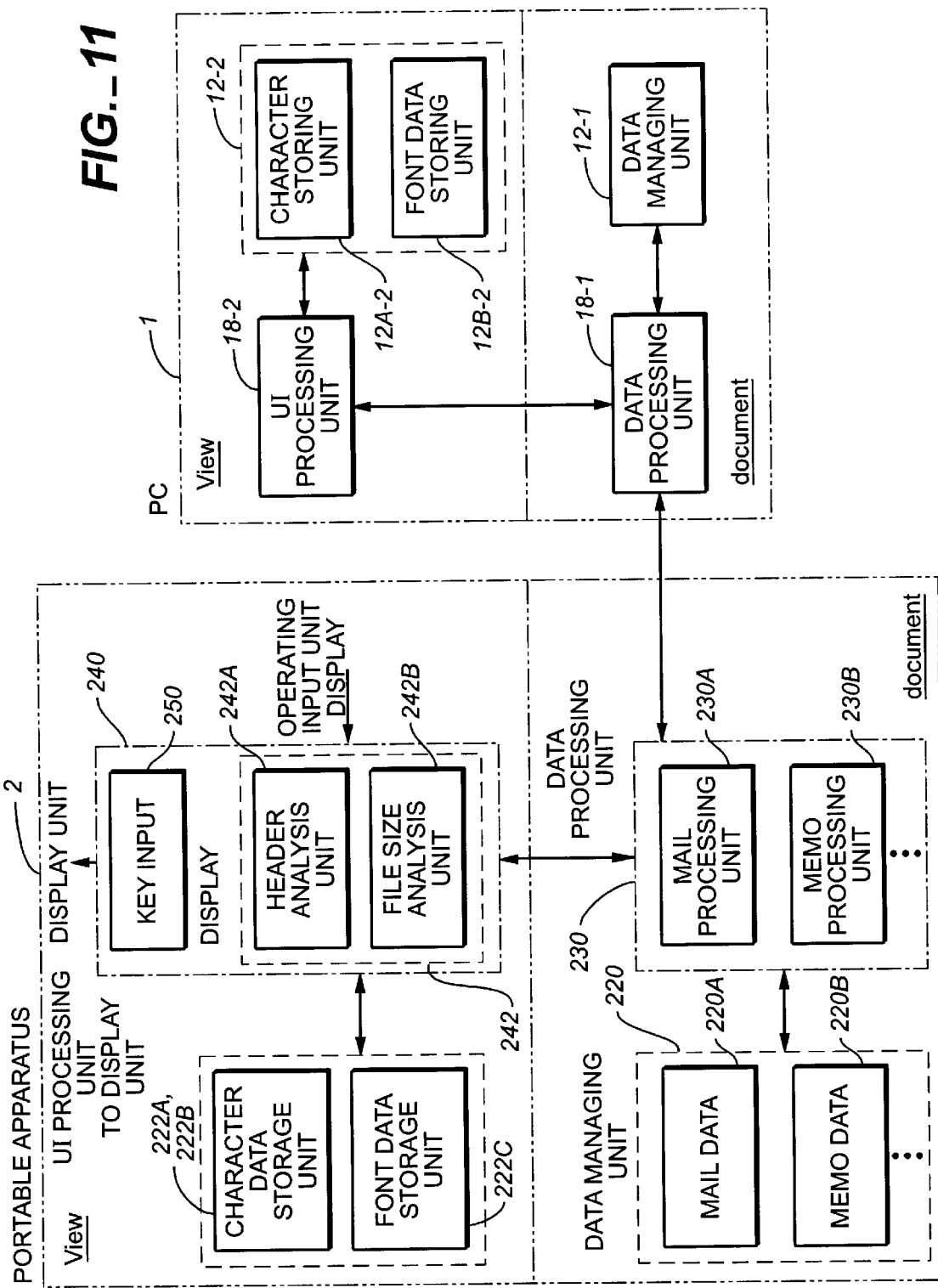

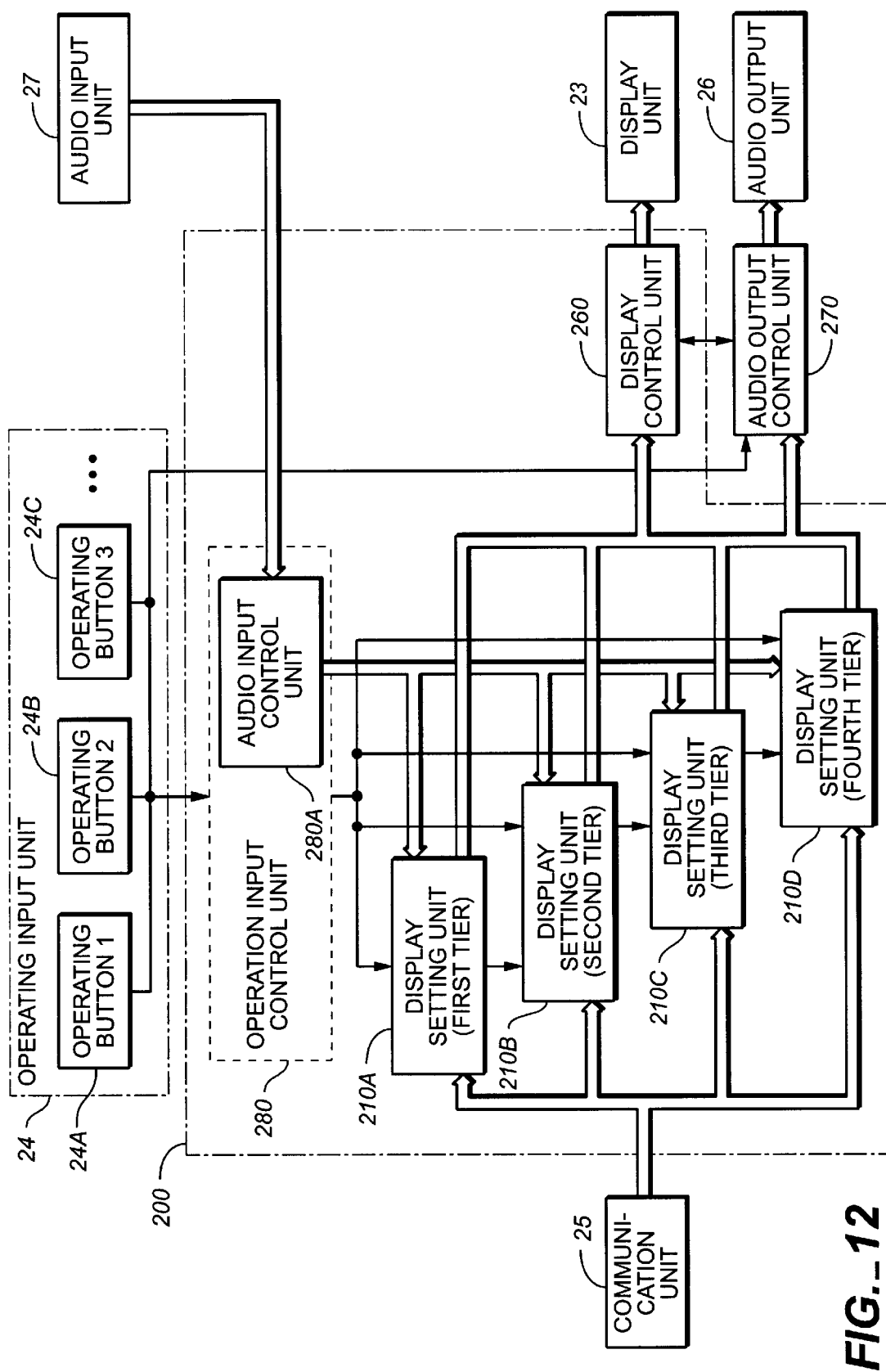
FIG._12

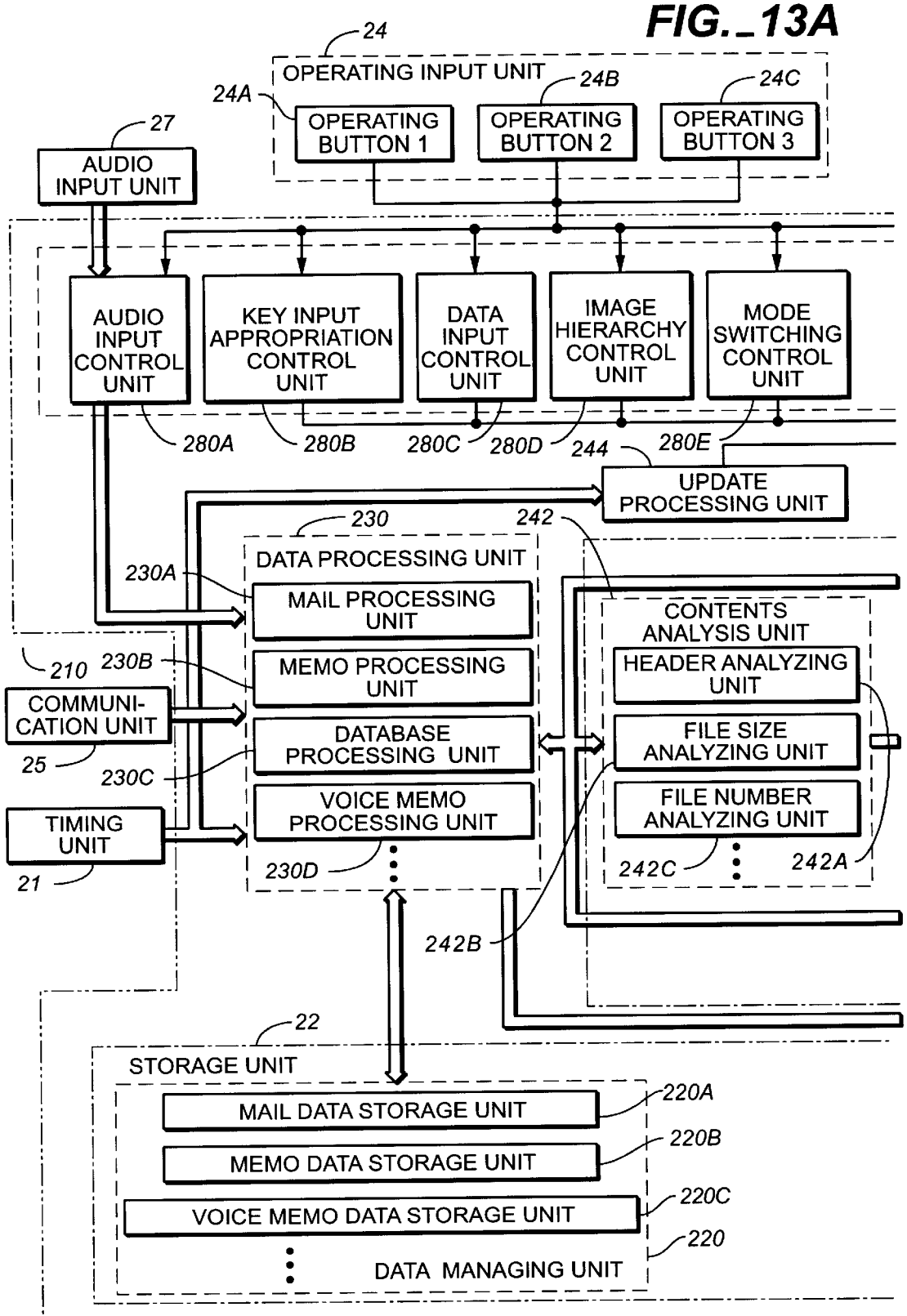
FIG._13A

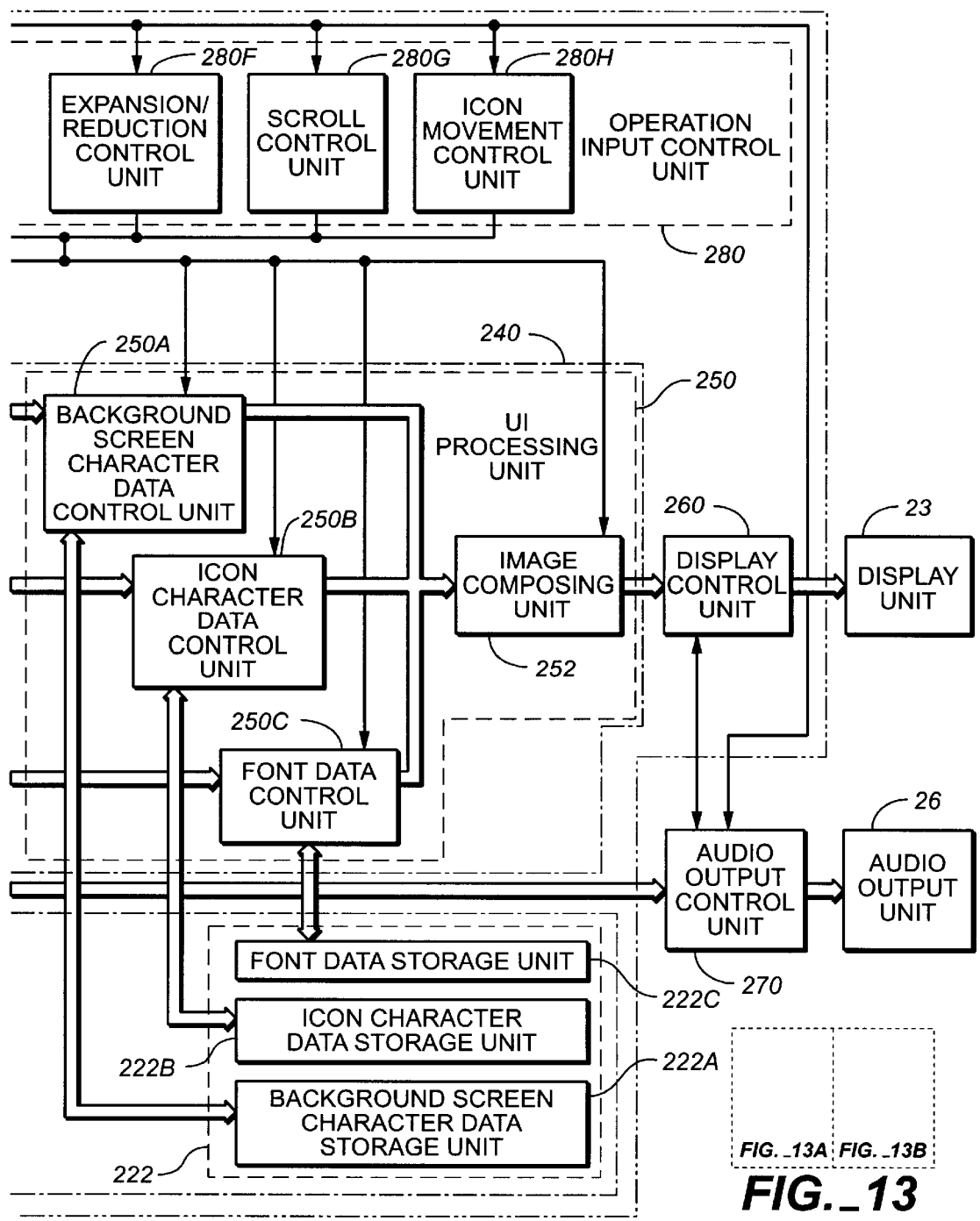
FIG._13B
FIG._13

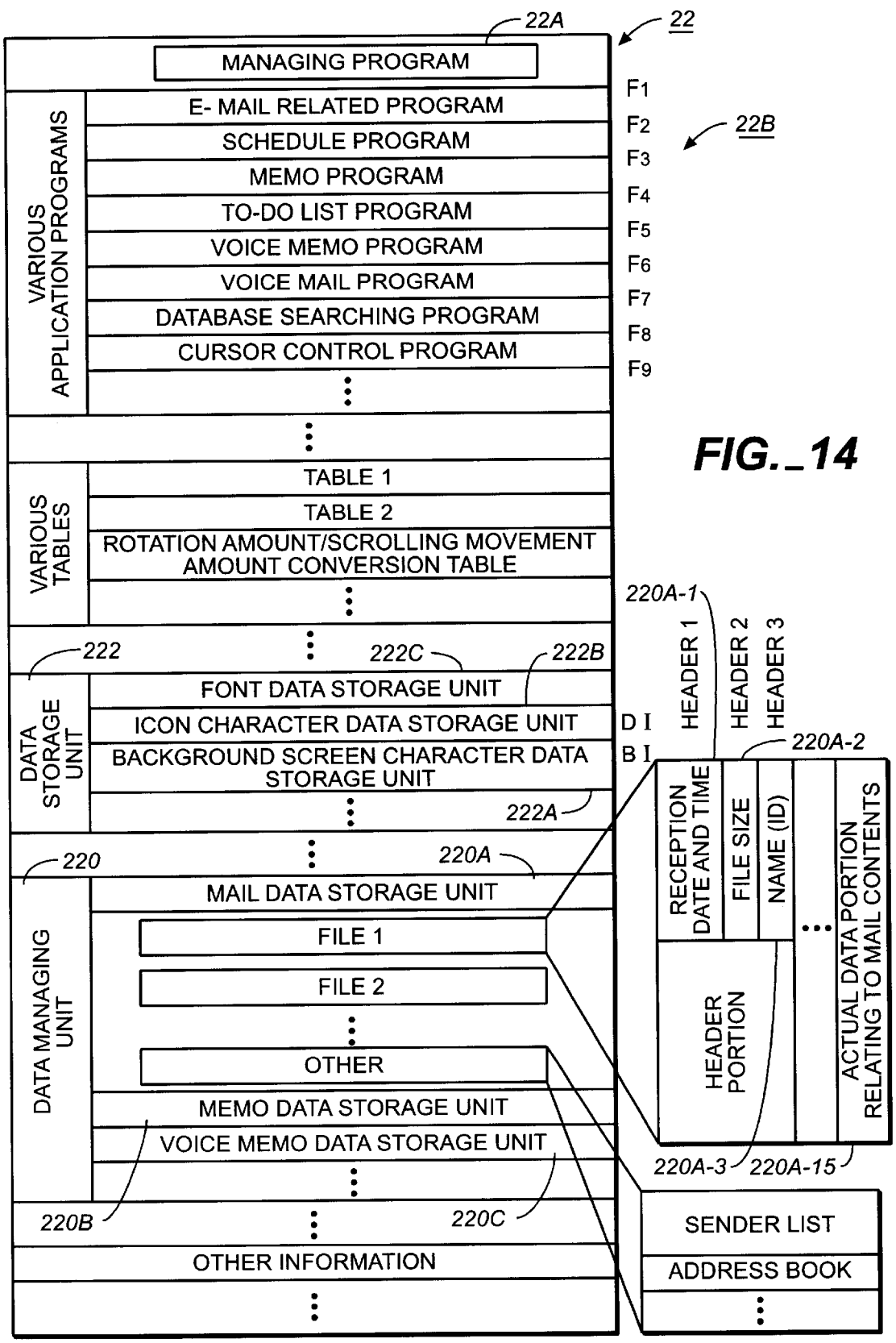
FIG._14

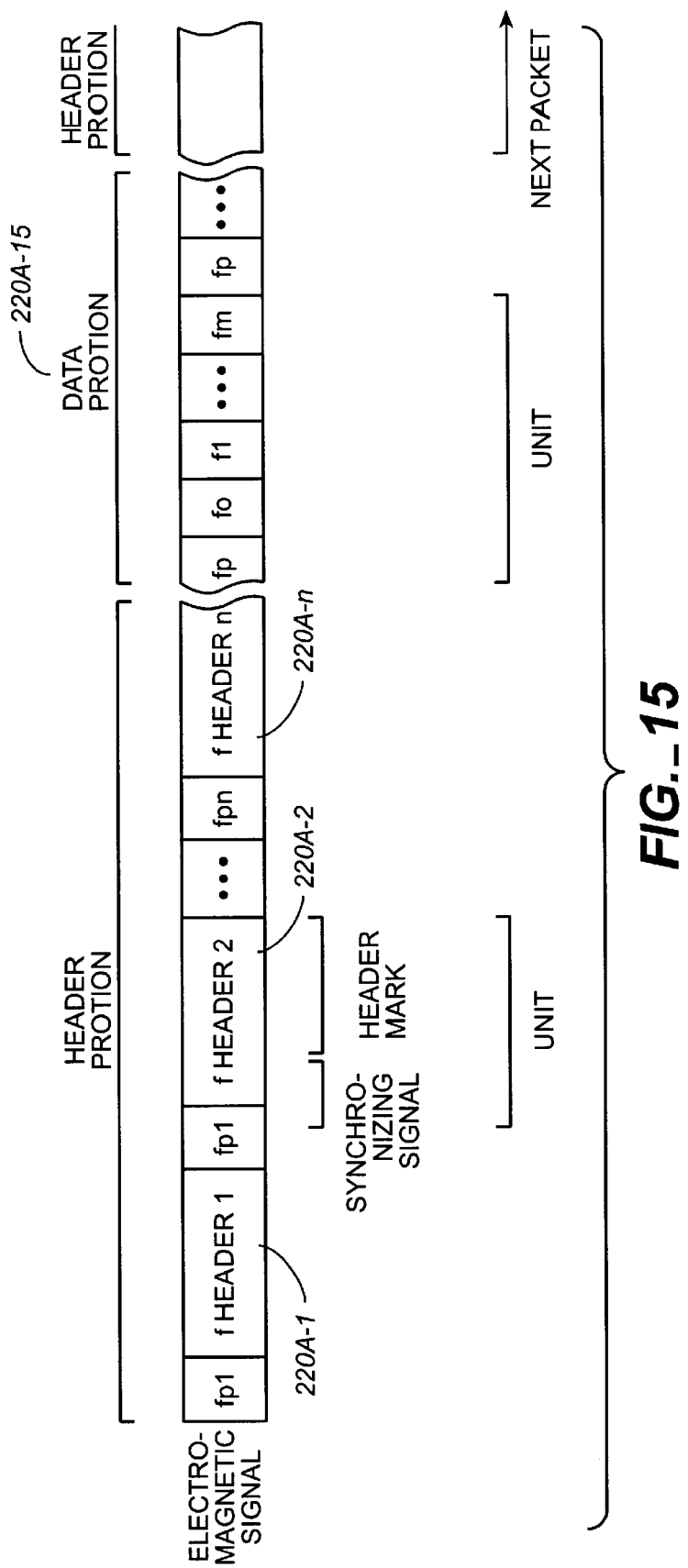
FIG._15

Table 1

| FUNCTION NAME | ICON CHARACTER DATA POINTER | FUNCTION PROGRAM POINTER |
|---|---|---|
| E-MAIL | DI1 | F1 |
| E-MAIL | DI2 | F1 |
| E-MAIL | DI3 | F1 |
| VOICE MAIL | DI4 | F6 |
| VOICE MEMO | DI5 | F5 |
| HANDWRITING MEMO | DI6 | F3 |
| VOICE MEMO | DI7 | F5 |
| SCHEDULE | DI9 | F2 |
| SCHEDULE | DI10 | F2 |
| CURSOR CONTROL | DI11 | F8 |
| ... | ... | ... |

*FIG._16A*

Table 2

| MENU NAME | | MENU FORMAT | BACKGROUND SCREEN CHARACTER DATA POINTER | ICON DISPLAY POSITION |
|---|---|---|---|---|
| INITIAL SCREEN | | FULL-SCREEN | BI1 | |
| MAIN SCREEN | COMMUNICATION AREA | E-MAIL | BI2 | ELECTRONIC MAIL (X1,Y1) MEMO (X2,Y2) |
| | SCHEDULE AREA | E-MAIL | BI3 | |
| | DATABASE AREA | E-MAIL | BI4 | |
| E-MAIL DISPLAY AREA | | POP-UP | BI5 | |
| MEMO DISPLAY SCREEN | | POP-UP | BI6 | |
| SCHEDULE MODE (INCREMENT OF DAYS) | | FULL-SCREEN SCHEDULE | BI7 | SCHEDULE (X3,Y3) |
| DATABASE MODE (NAME SELECTION) | | POP-UP | BI8 | |
| ... | | ... | ... | ... |

FIG._16B

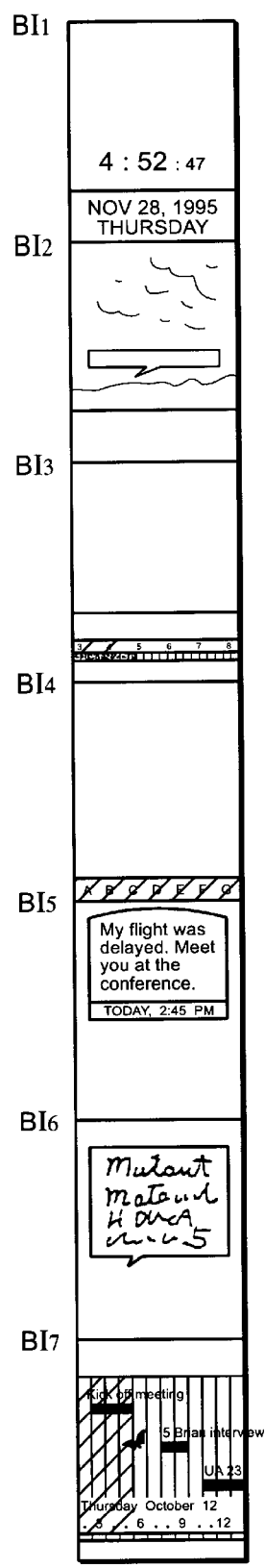
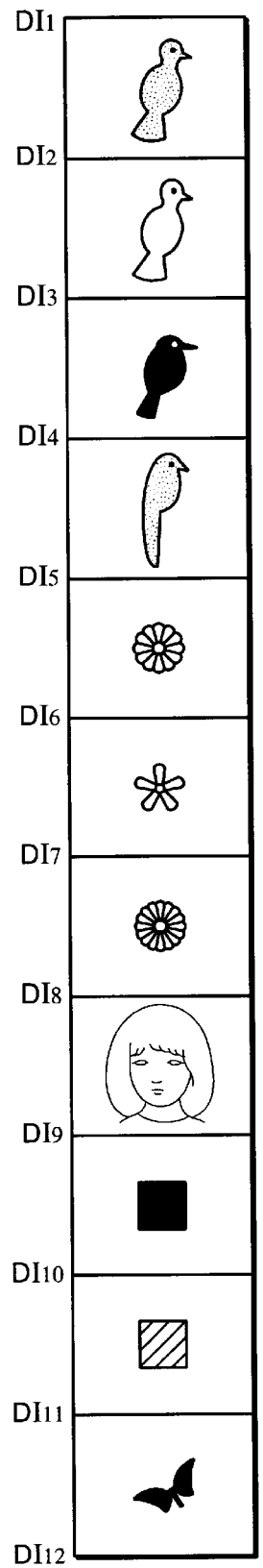
FIG._17A  FIG._17B

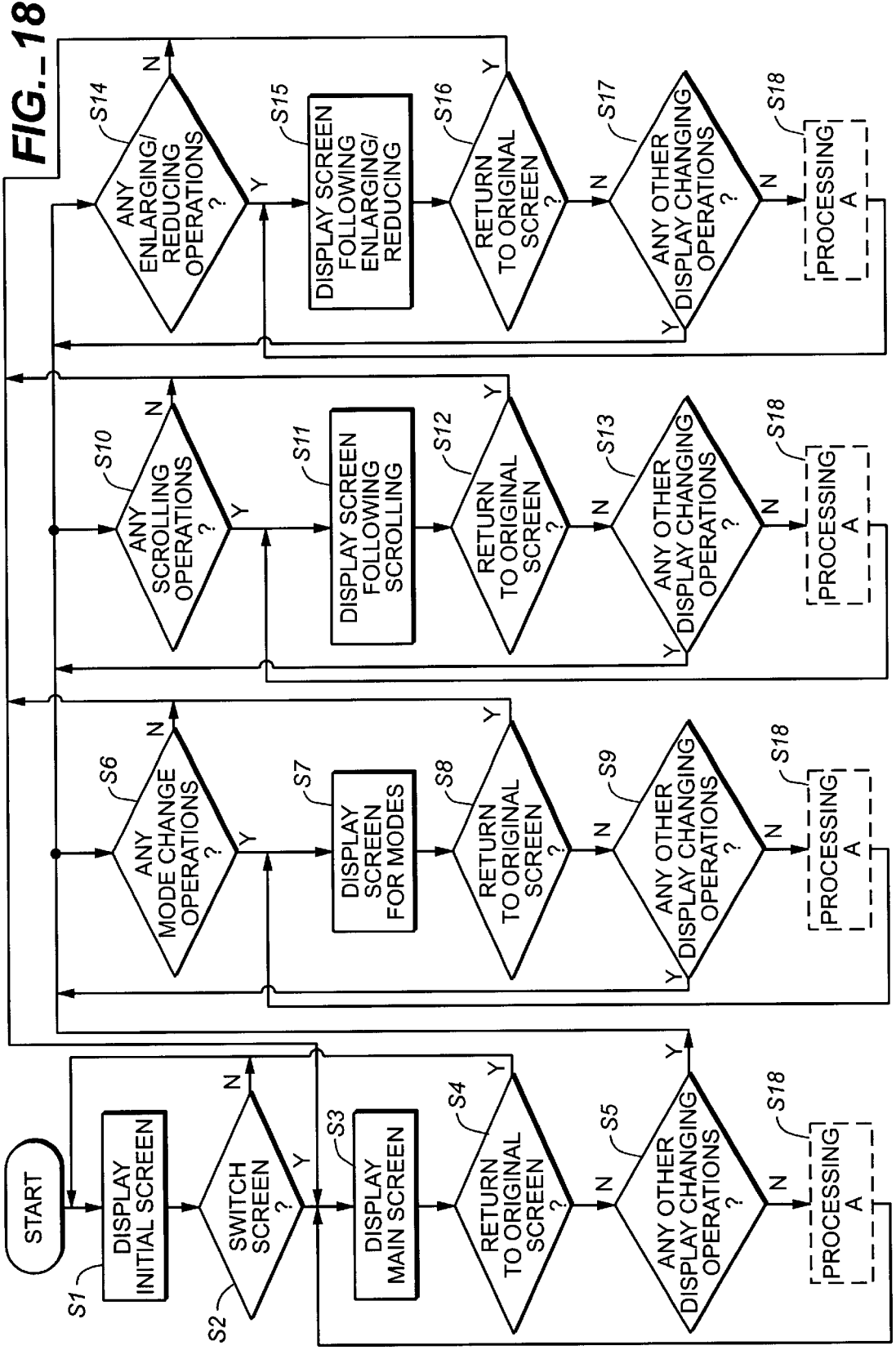
FIG._18

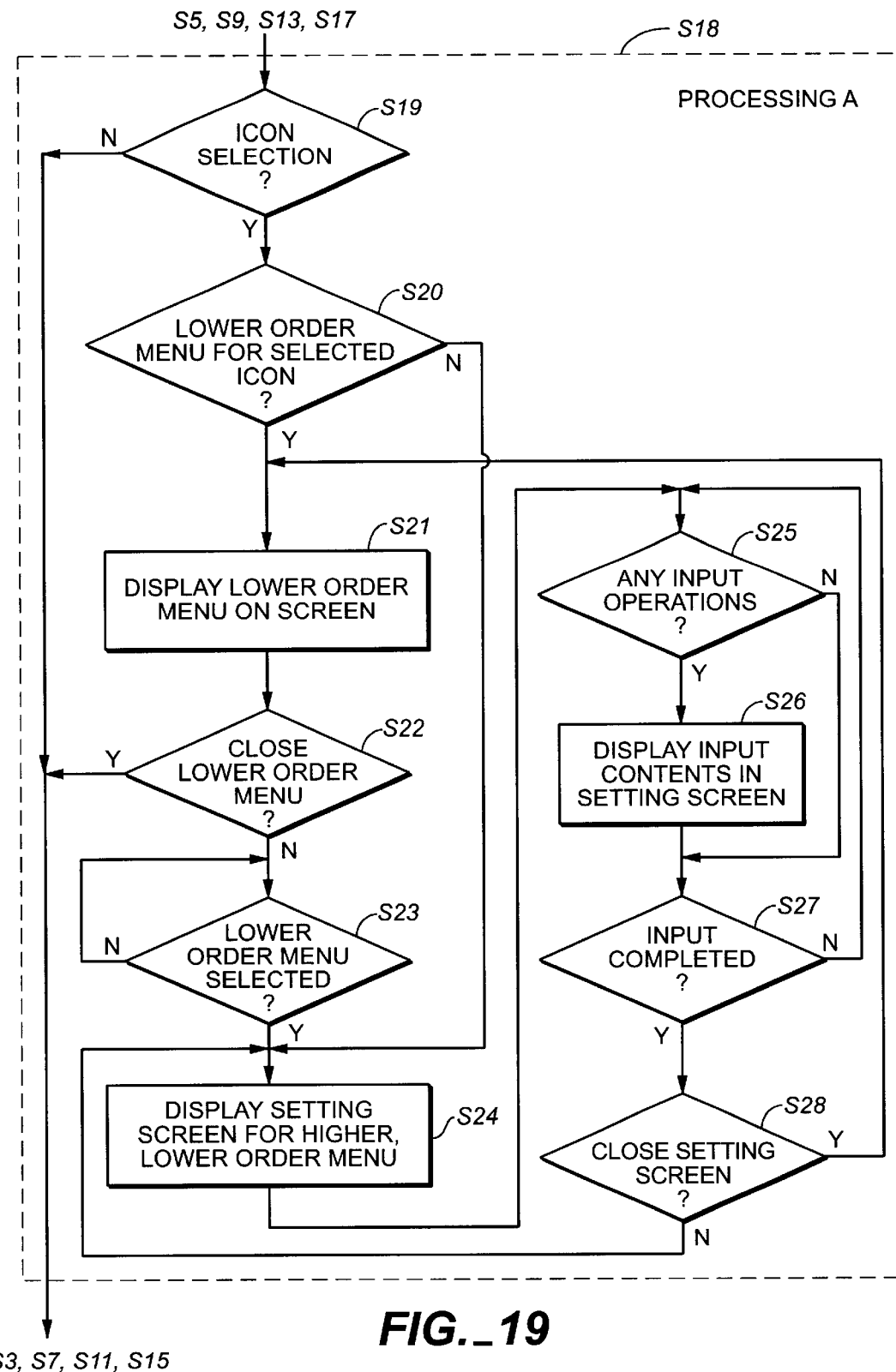
FIG._19

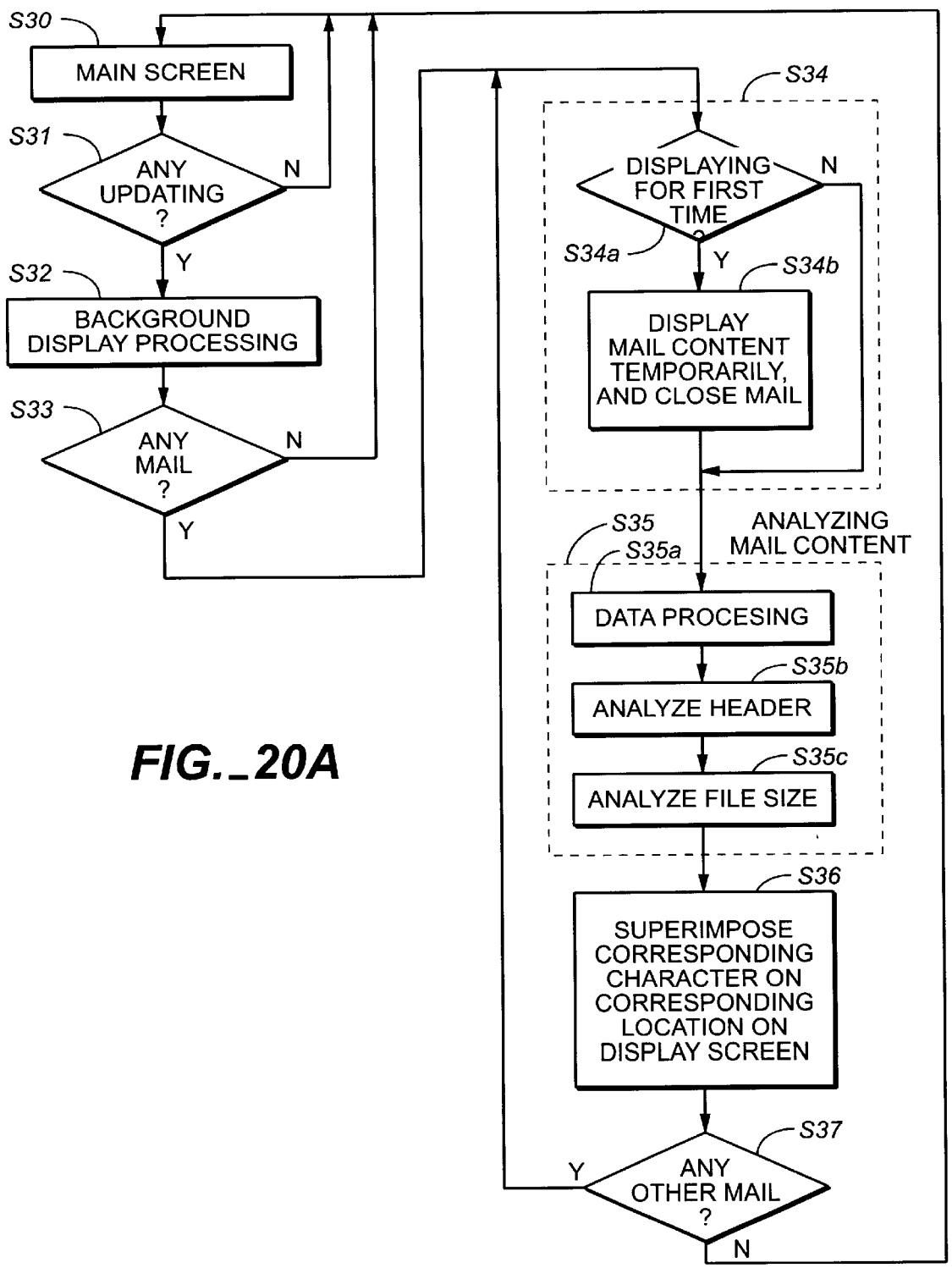
FIG._20A

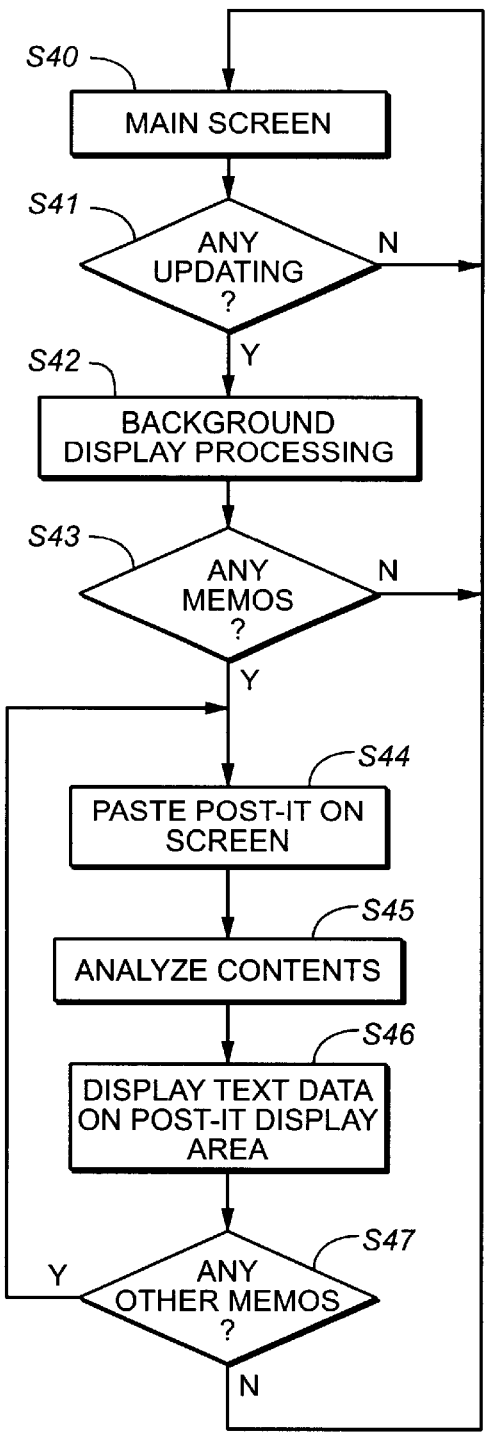
FIG._20B
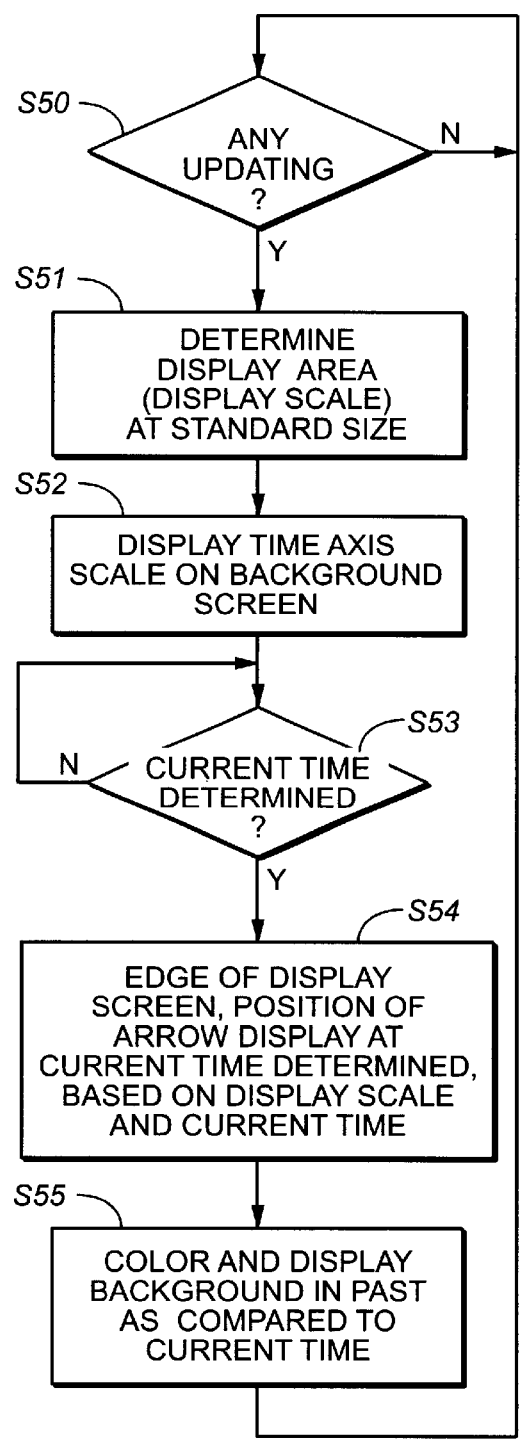
FIG._21A

BACKGROUND DISPLAY PROCESSING FOLLOWING
SUPERIMPOSED DISPLAY OF CORRESPONDING CHARACTER
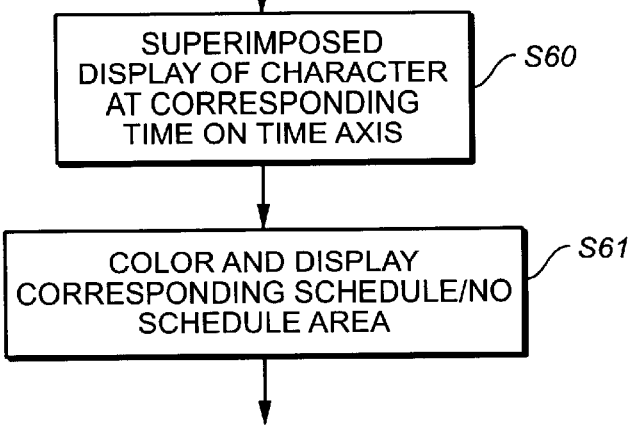
FIG._21B
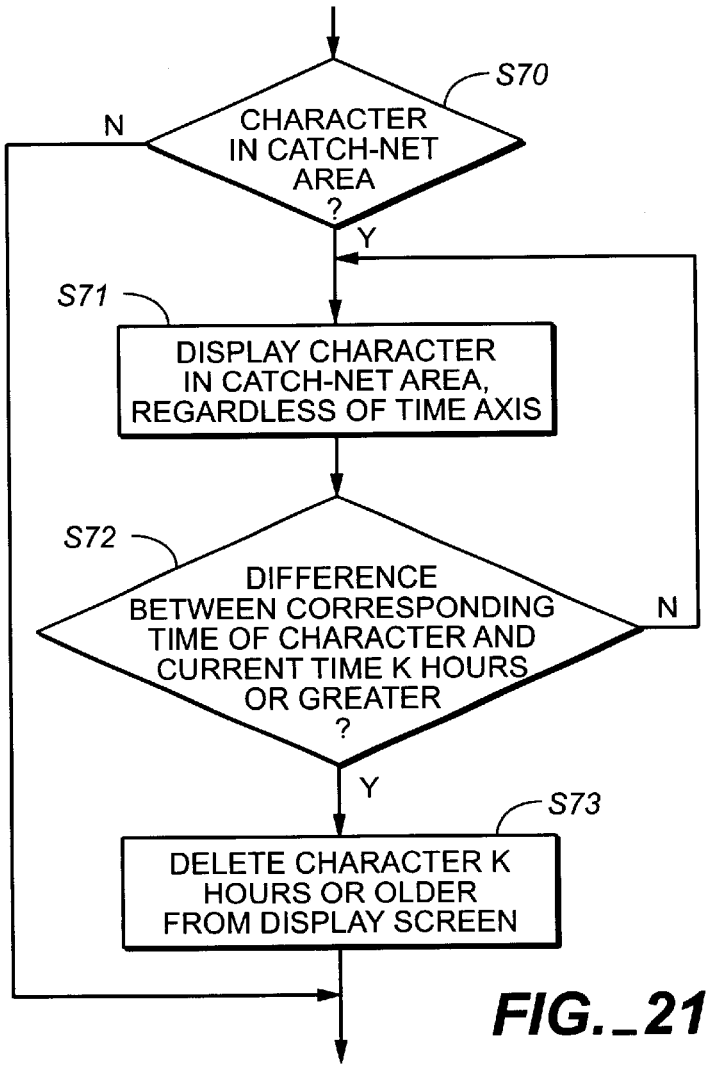
FIG._21C

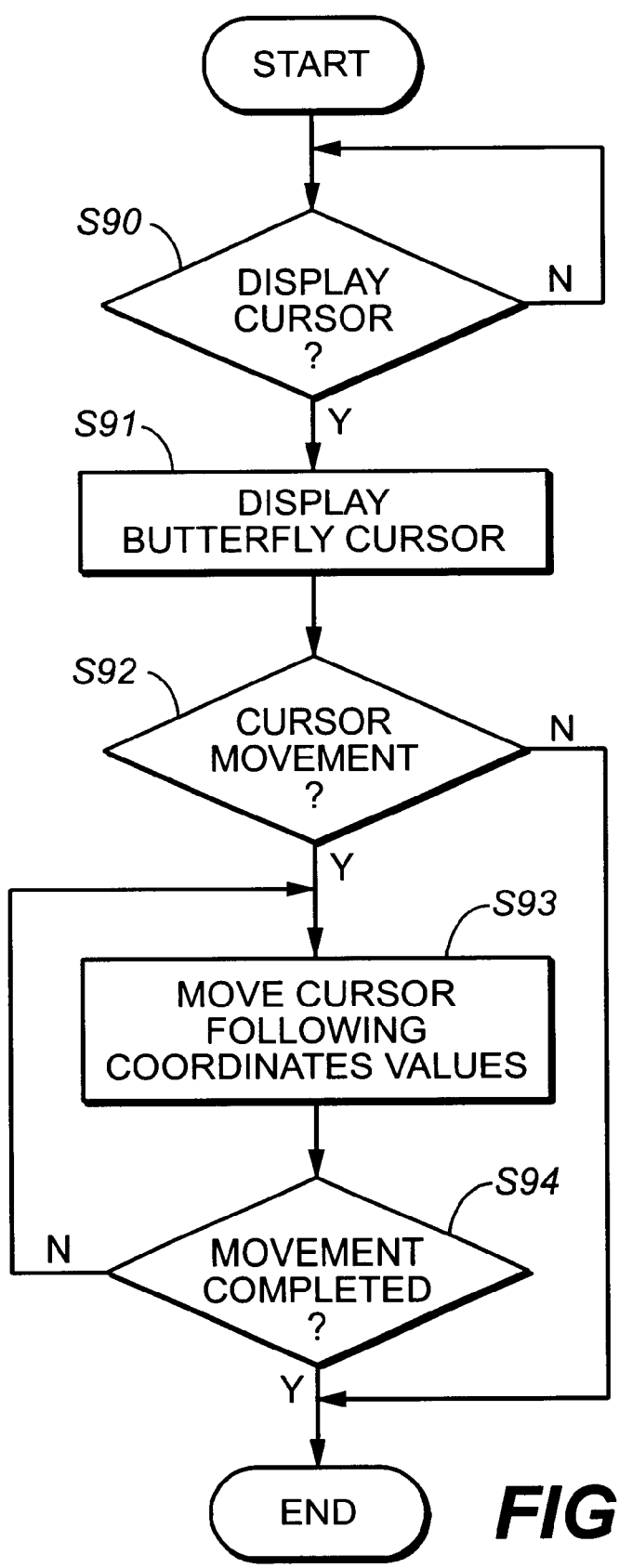
FIG._22

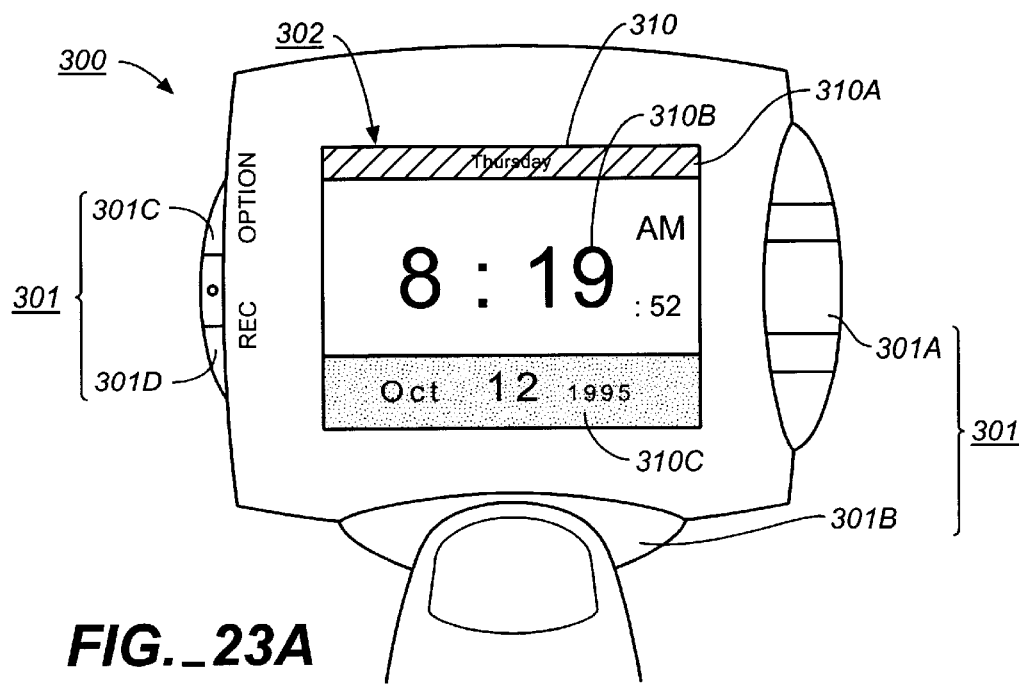
FIG._23A
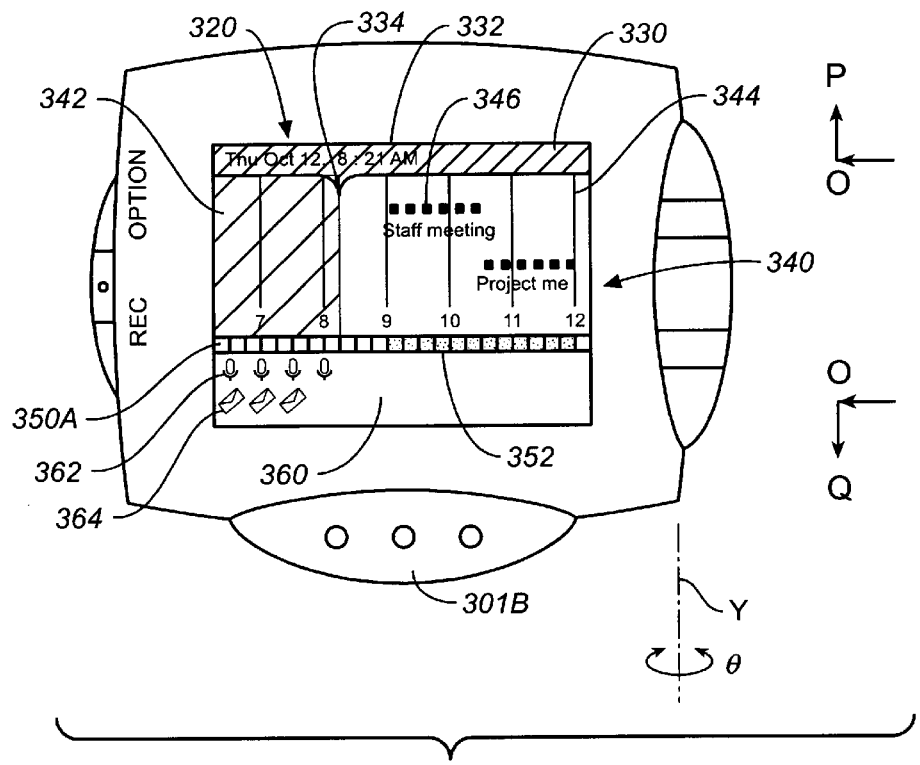
FIG._23B

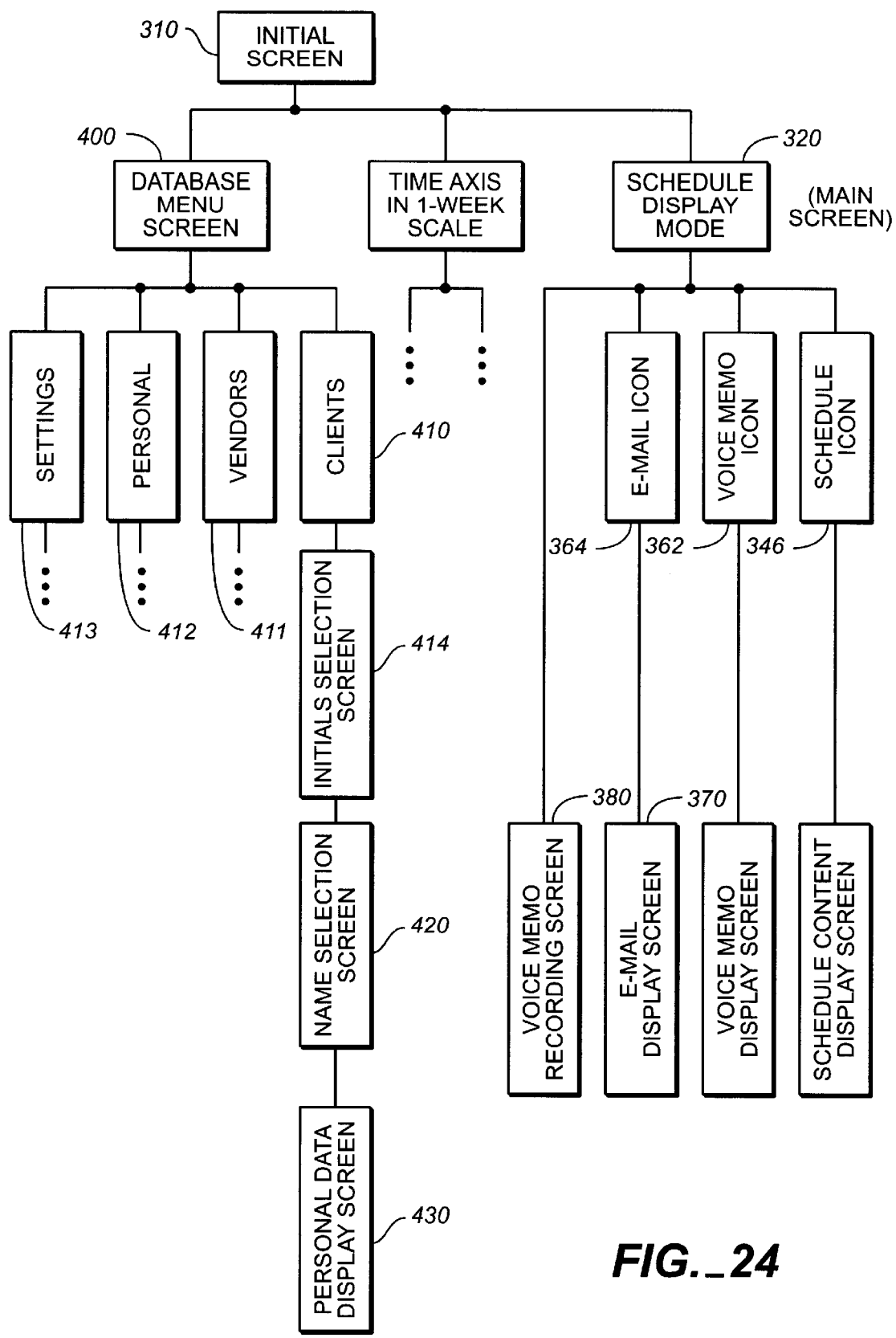
FIG._24

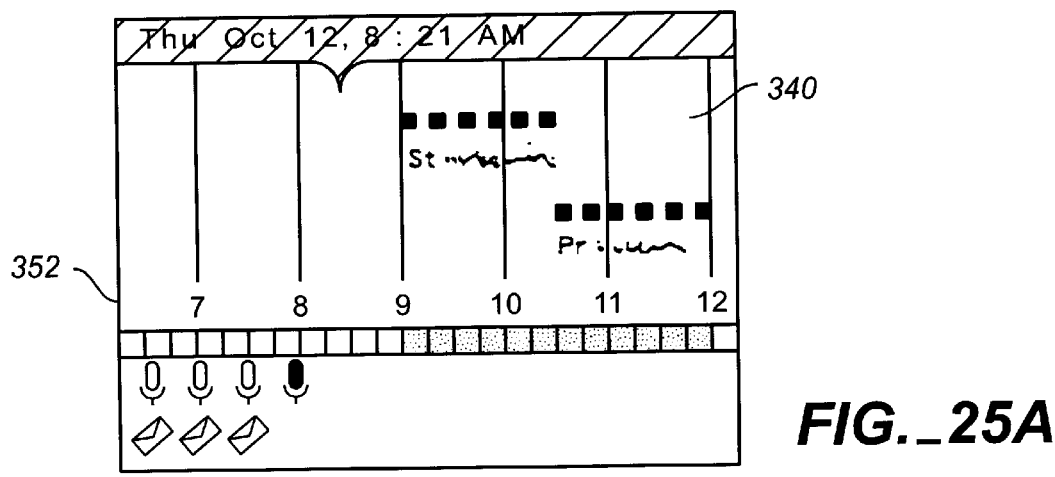
FIG._25A
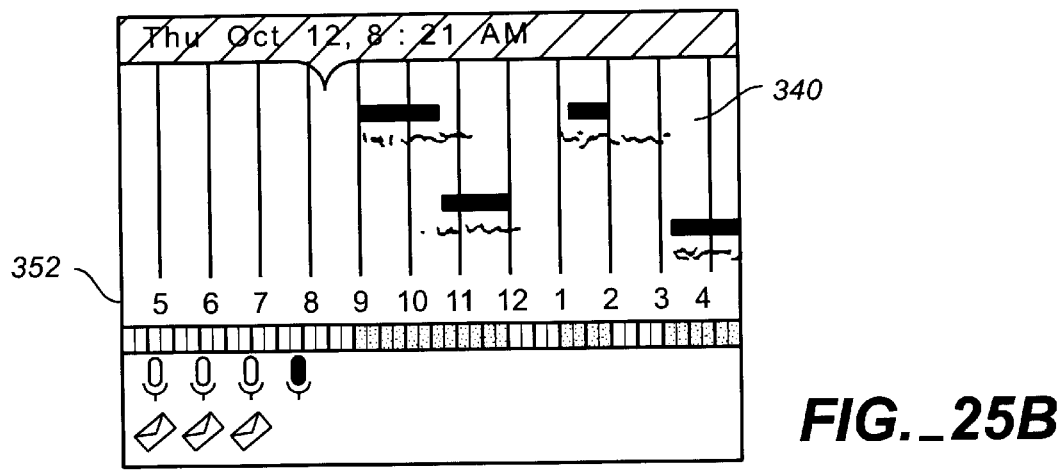
FIG._25B
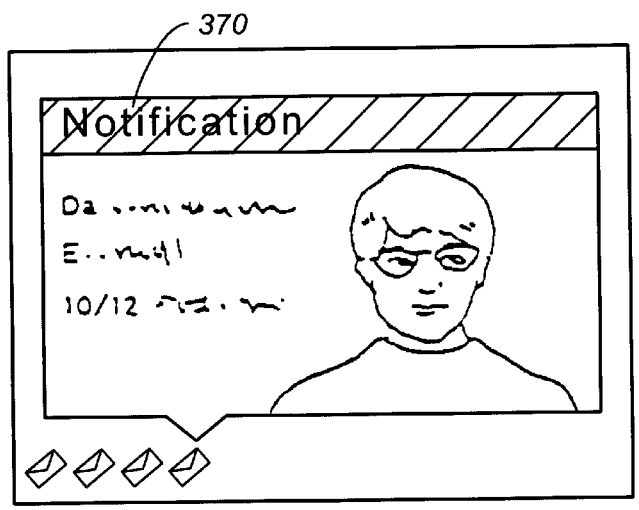
FIG._25C

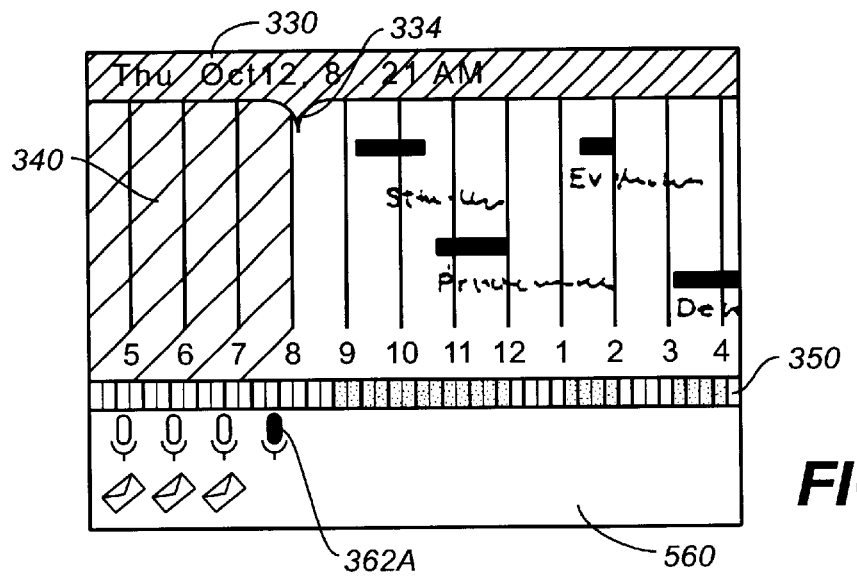
FIG._26A
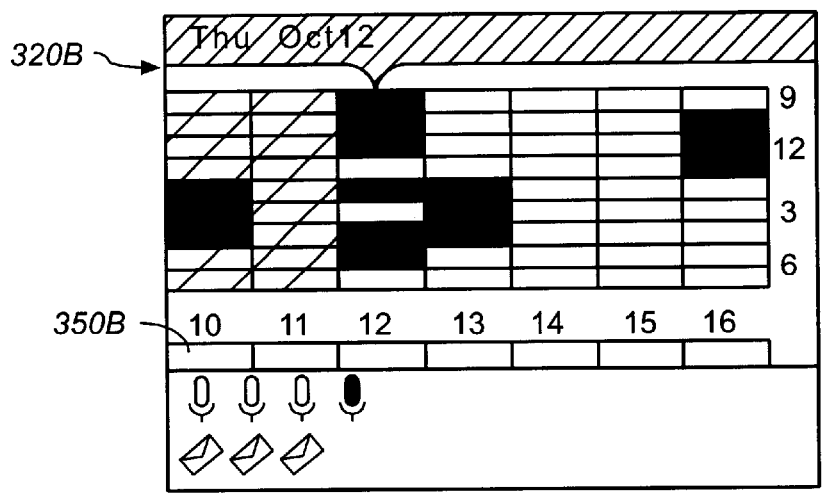
FIG._26B

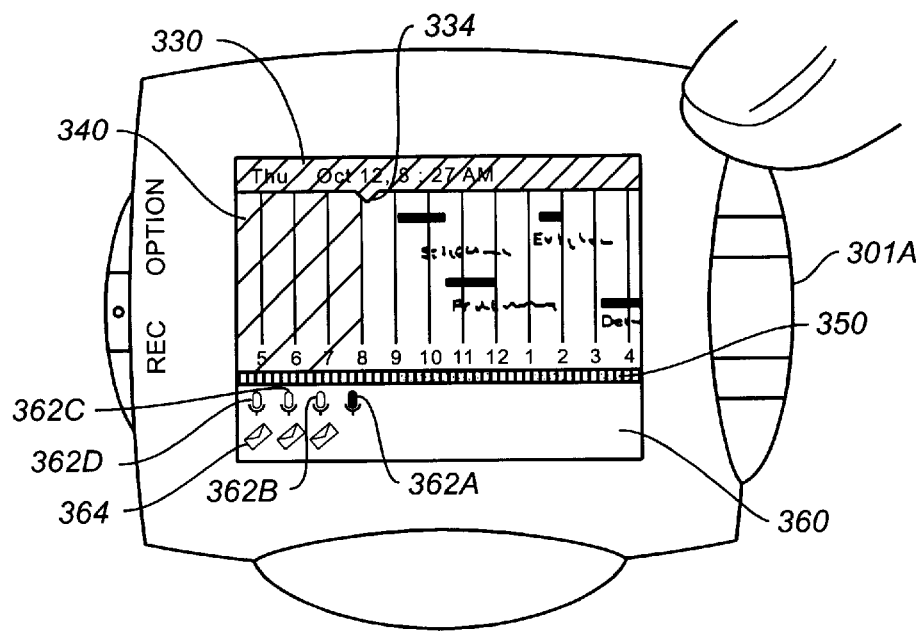
FIG._27A
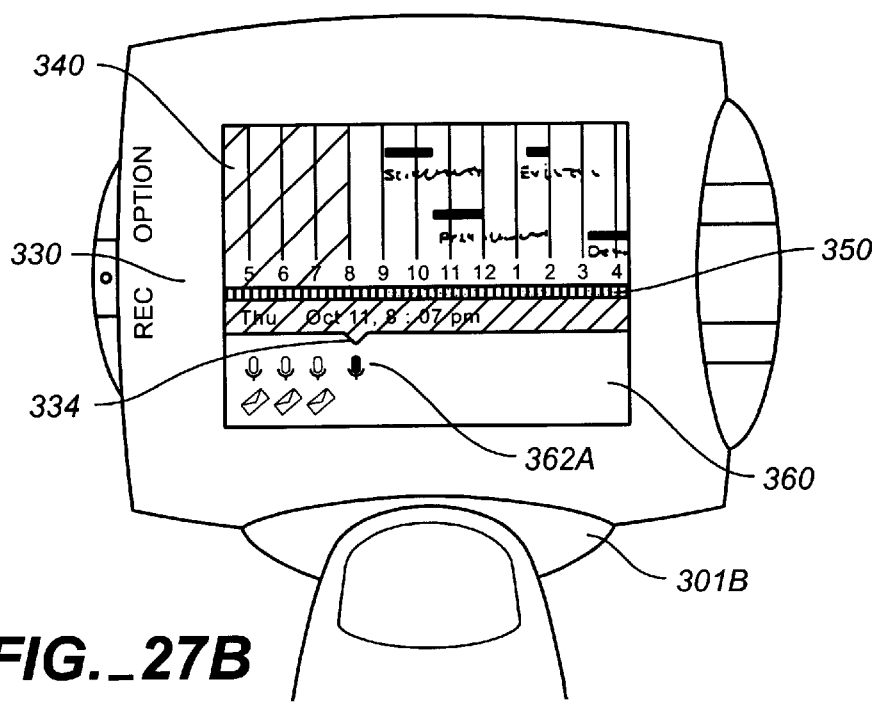
FIG._27B

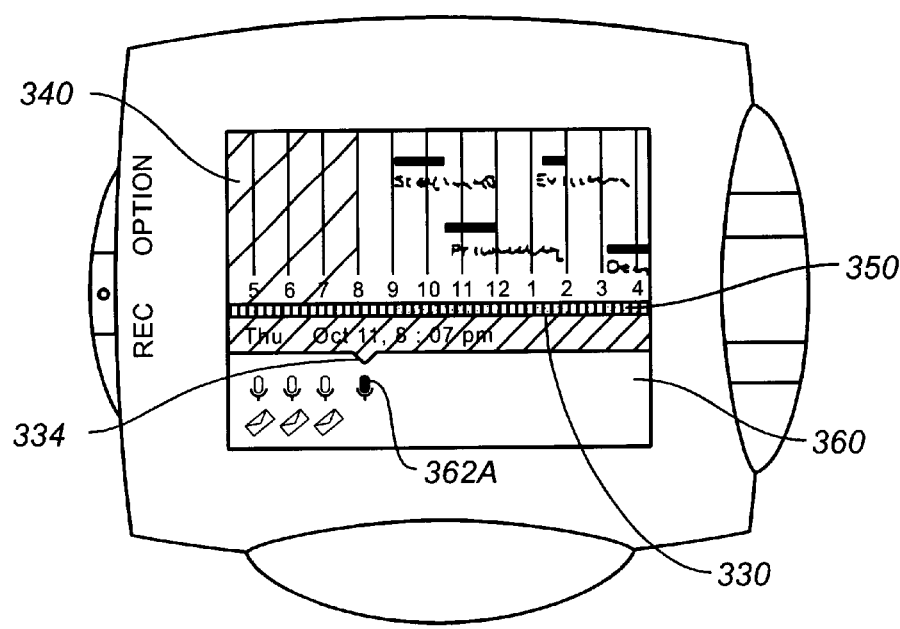
FIG._27C
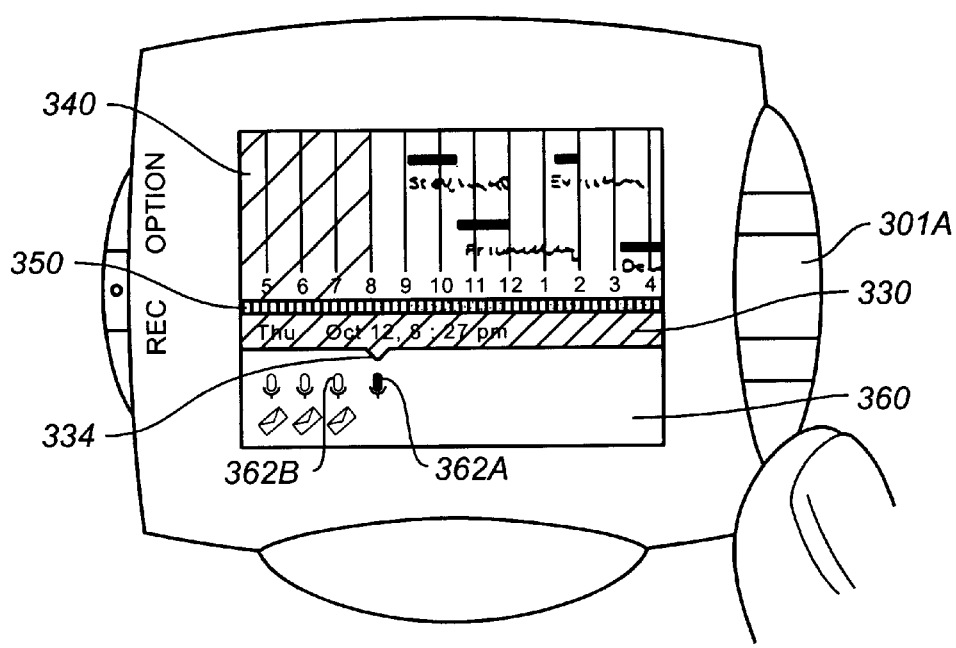
FIG._28A

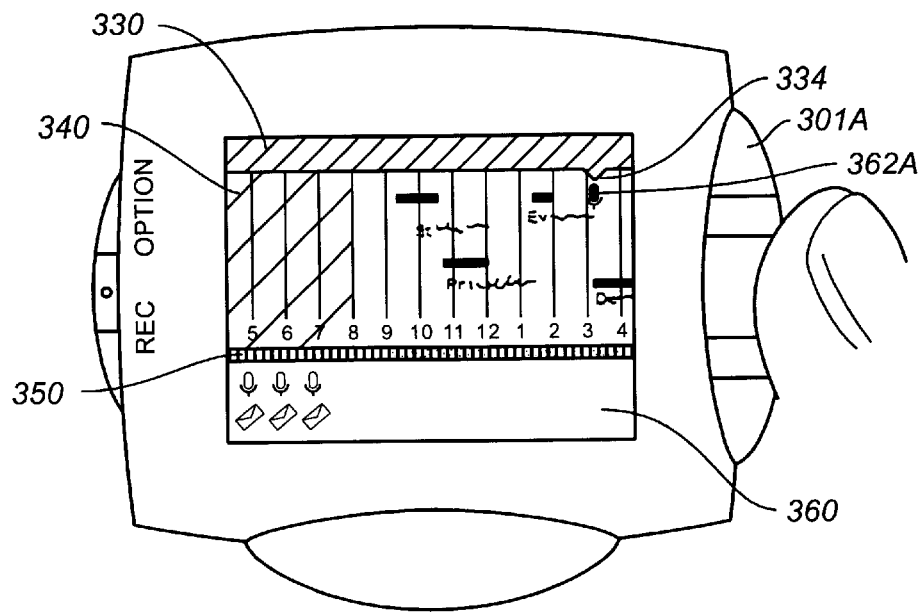
FIG._28B
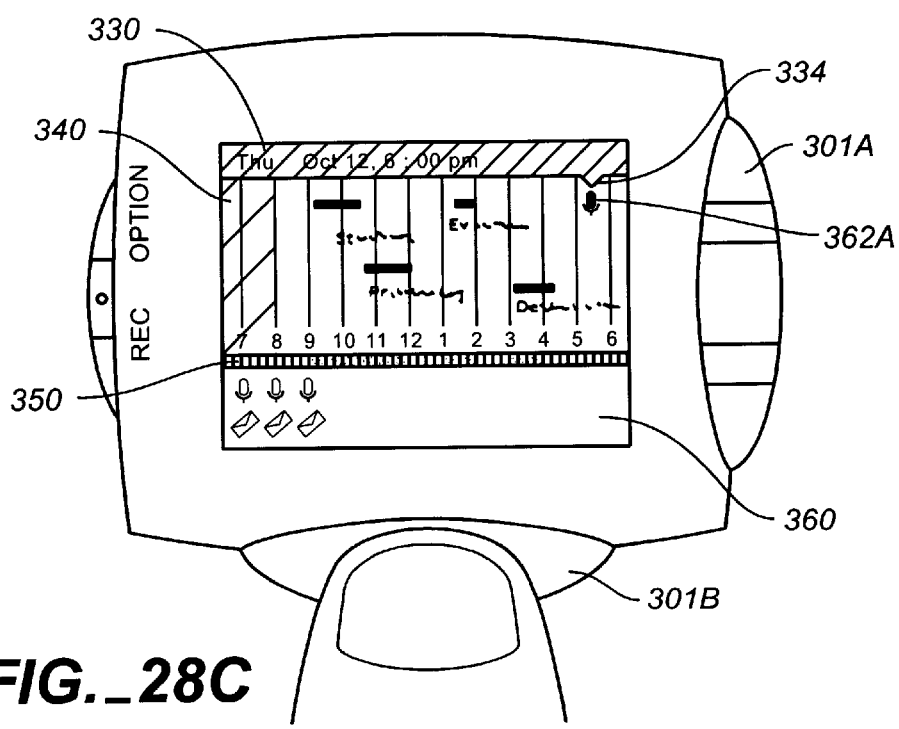
FIG._28C

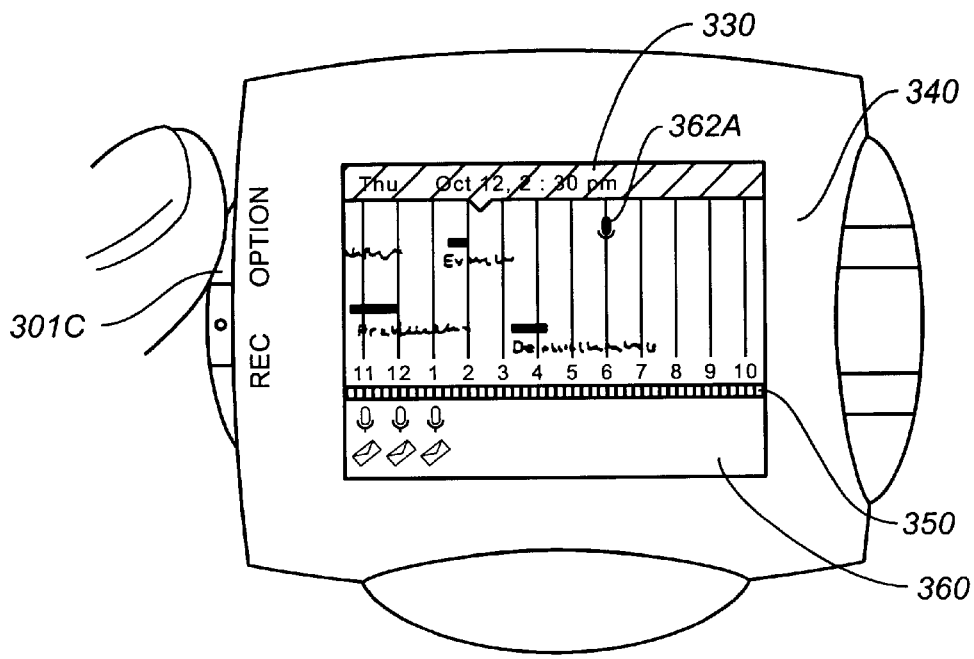
FIG._29A
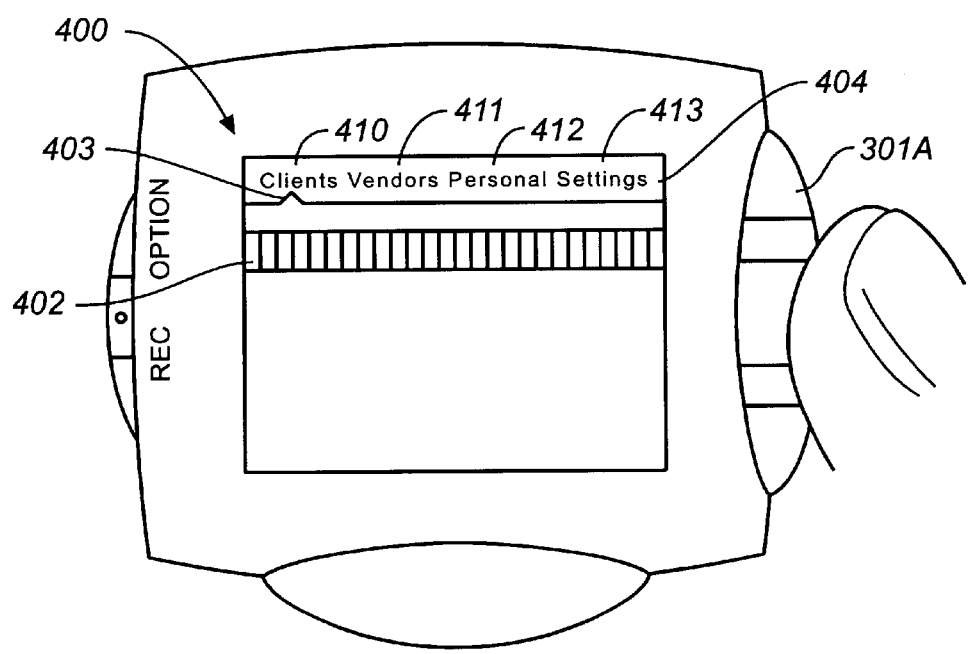
FIG._29B

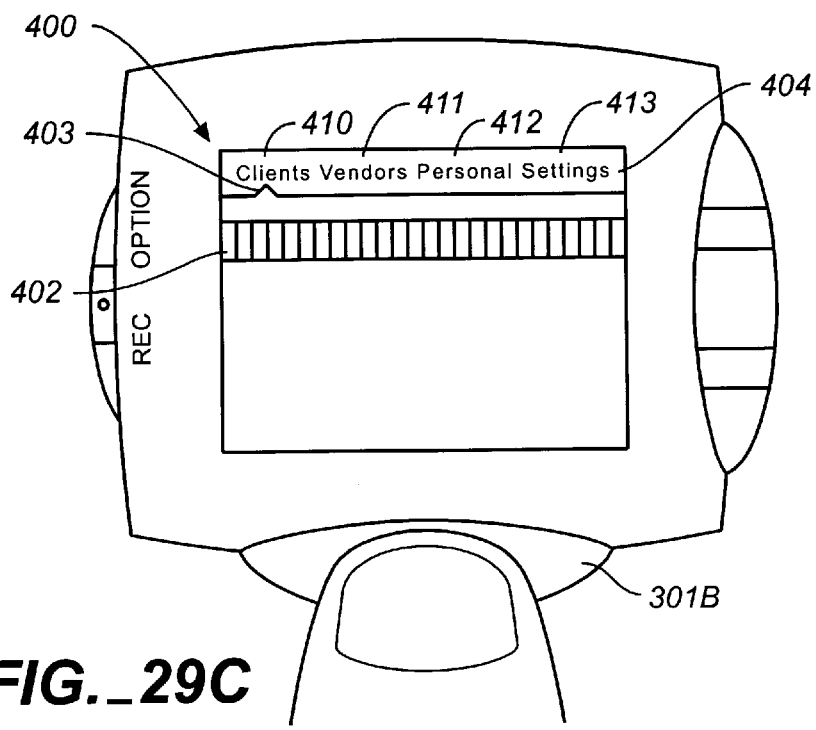
FIG._29C
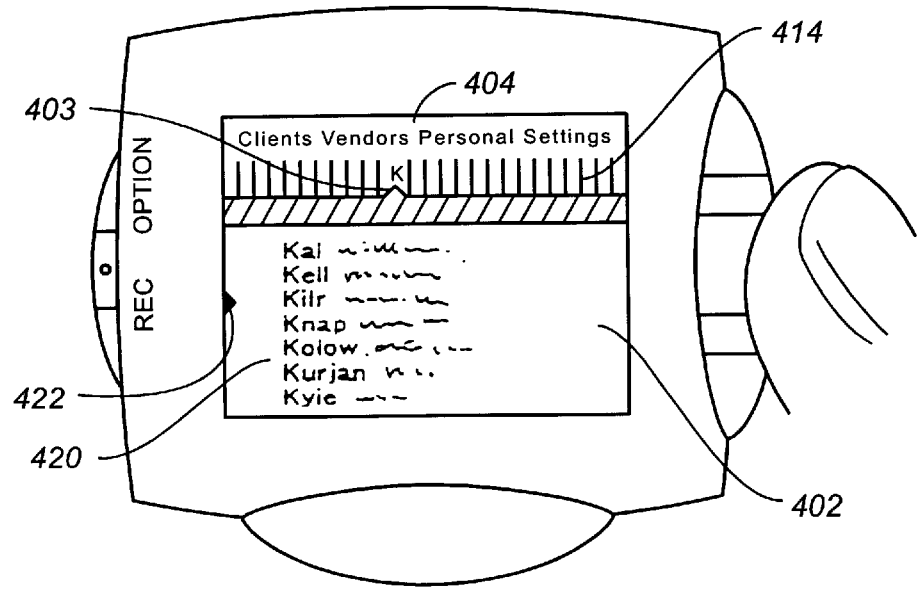
FIG._30A

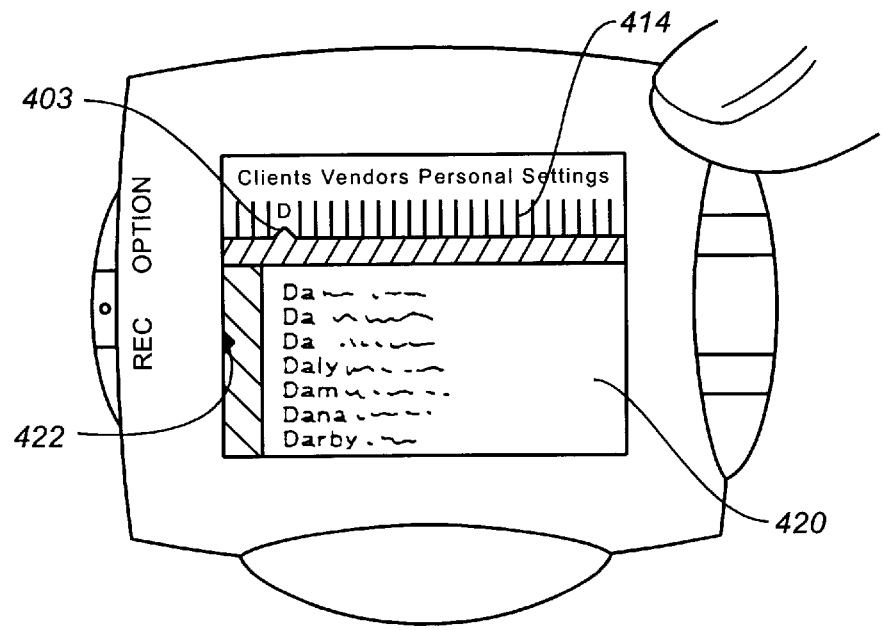
FIG._30B
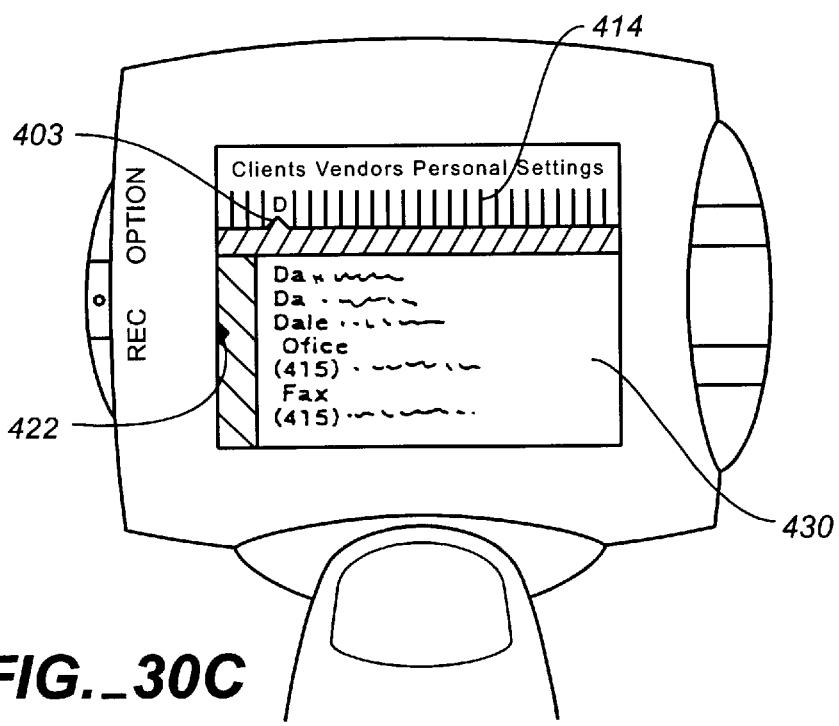
FIG._30C

FIG._31
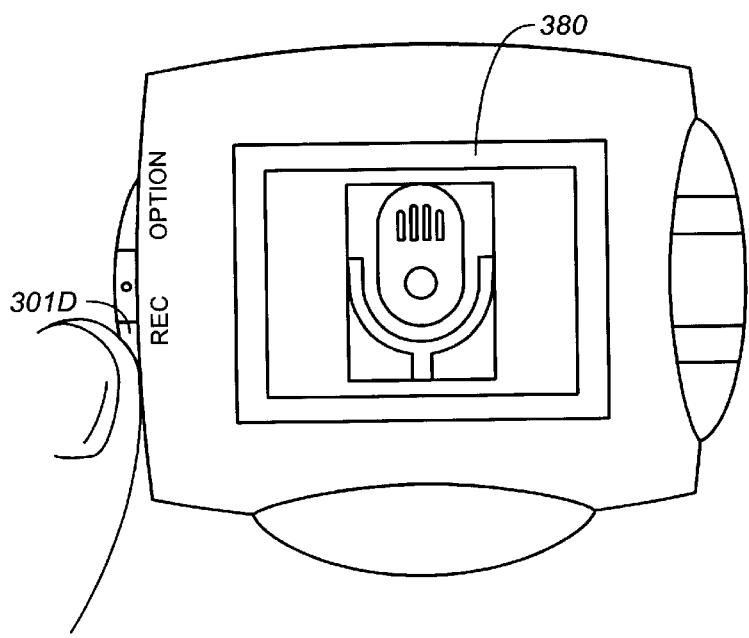
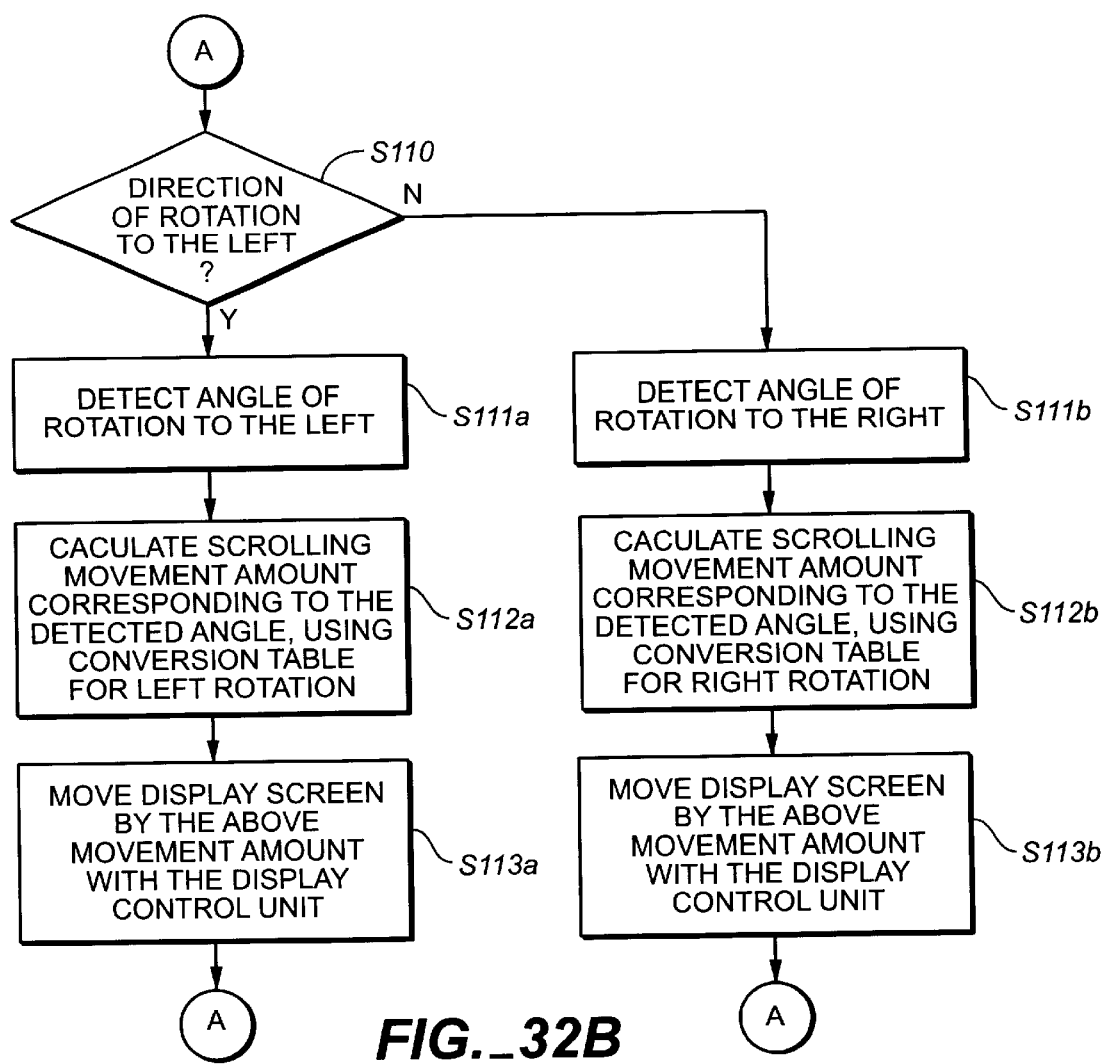
FIG._32B

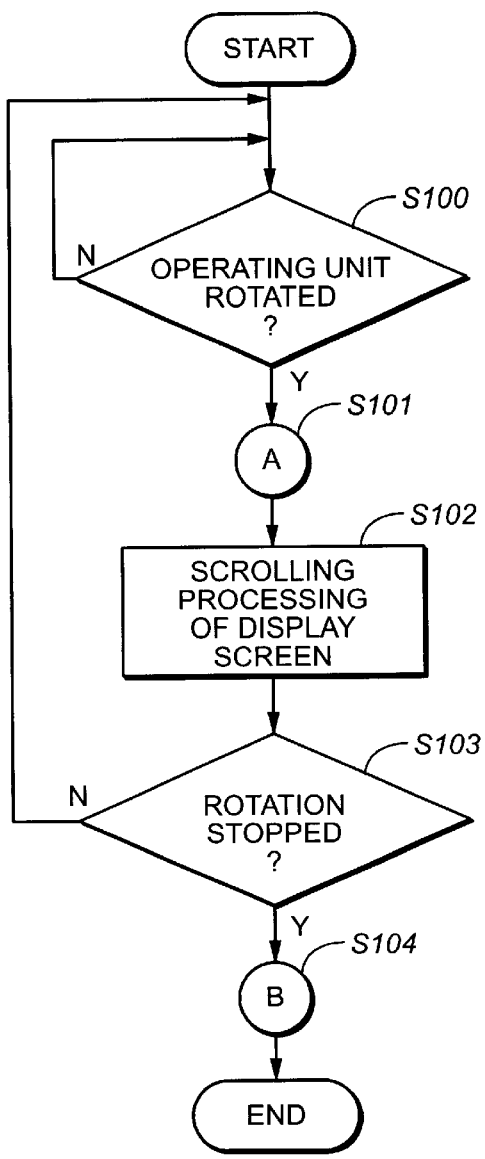
FIG._32A
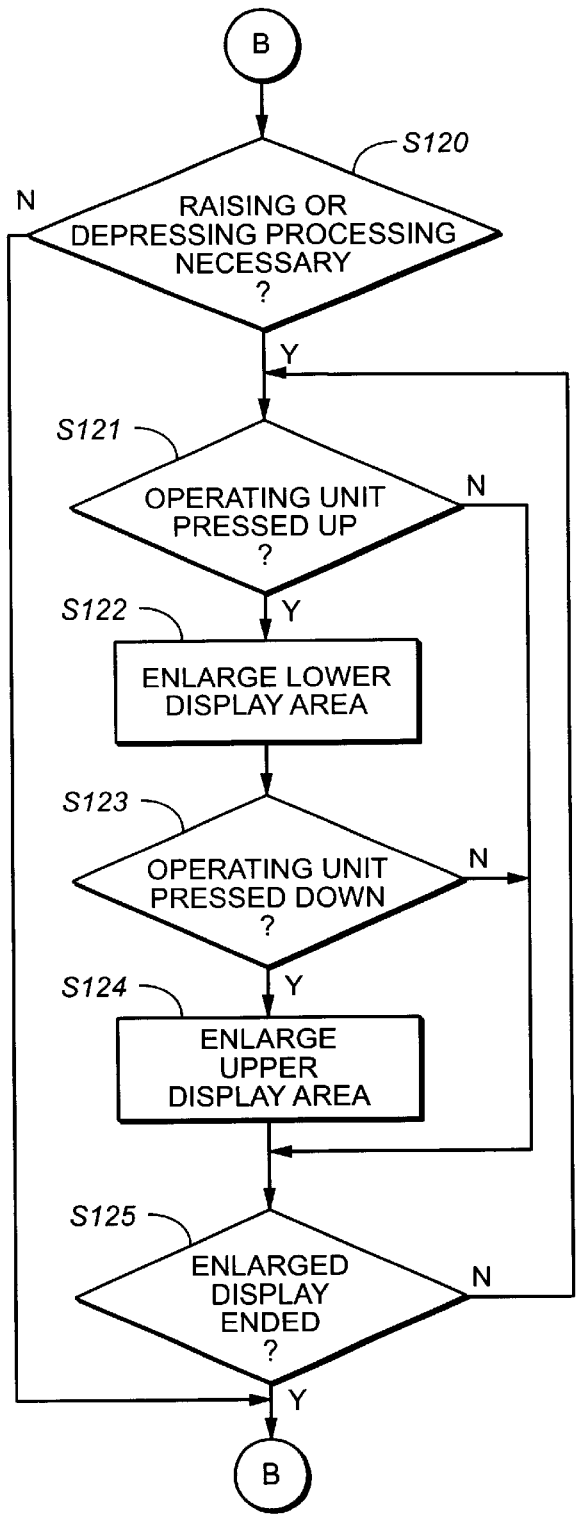
FIG._32C

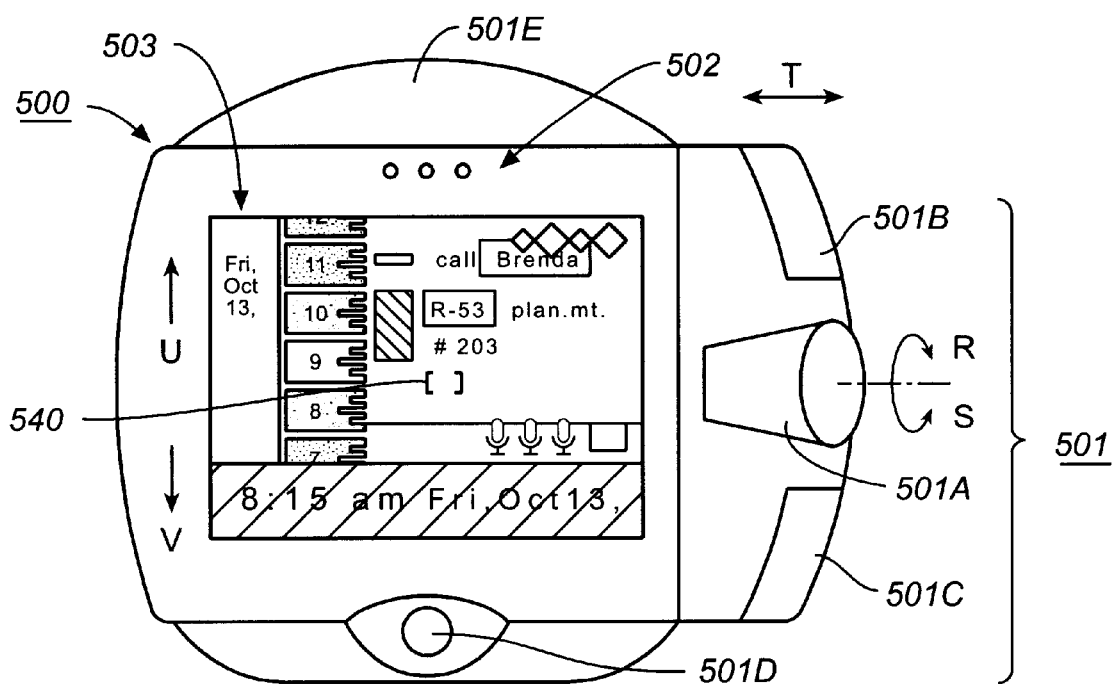
FIG._33A
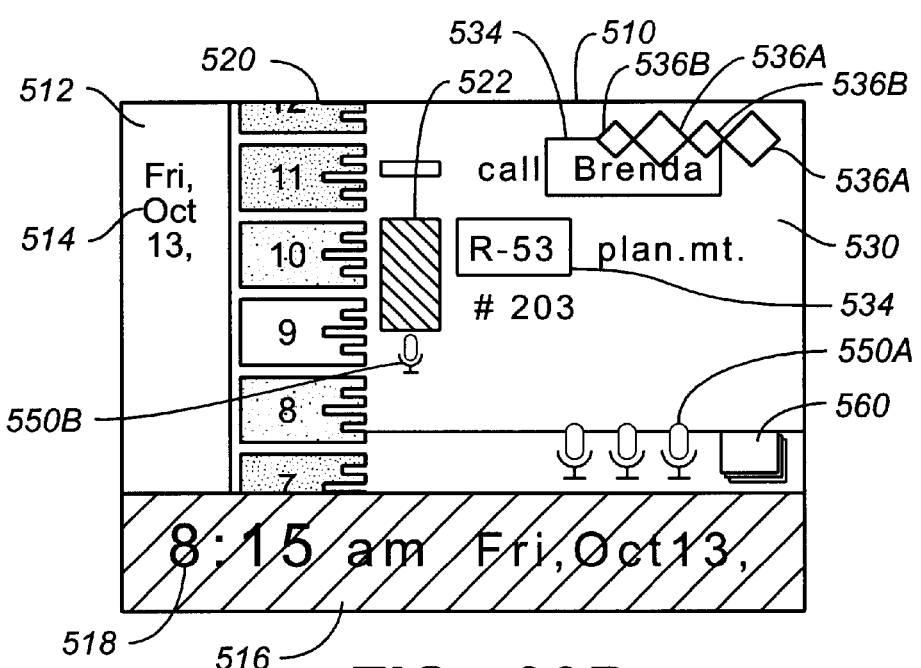
FIG._33B

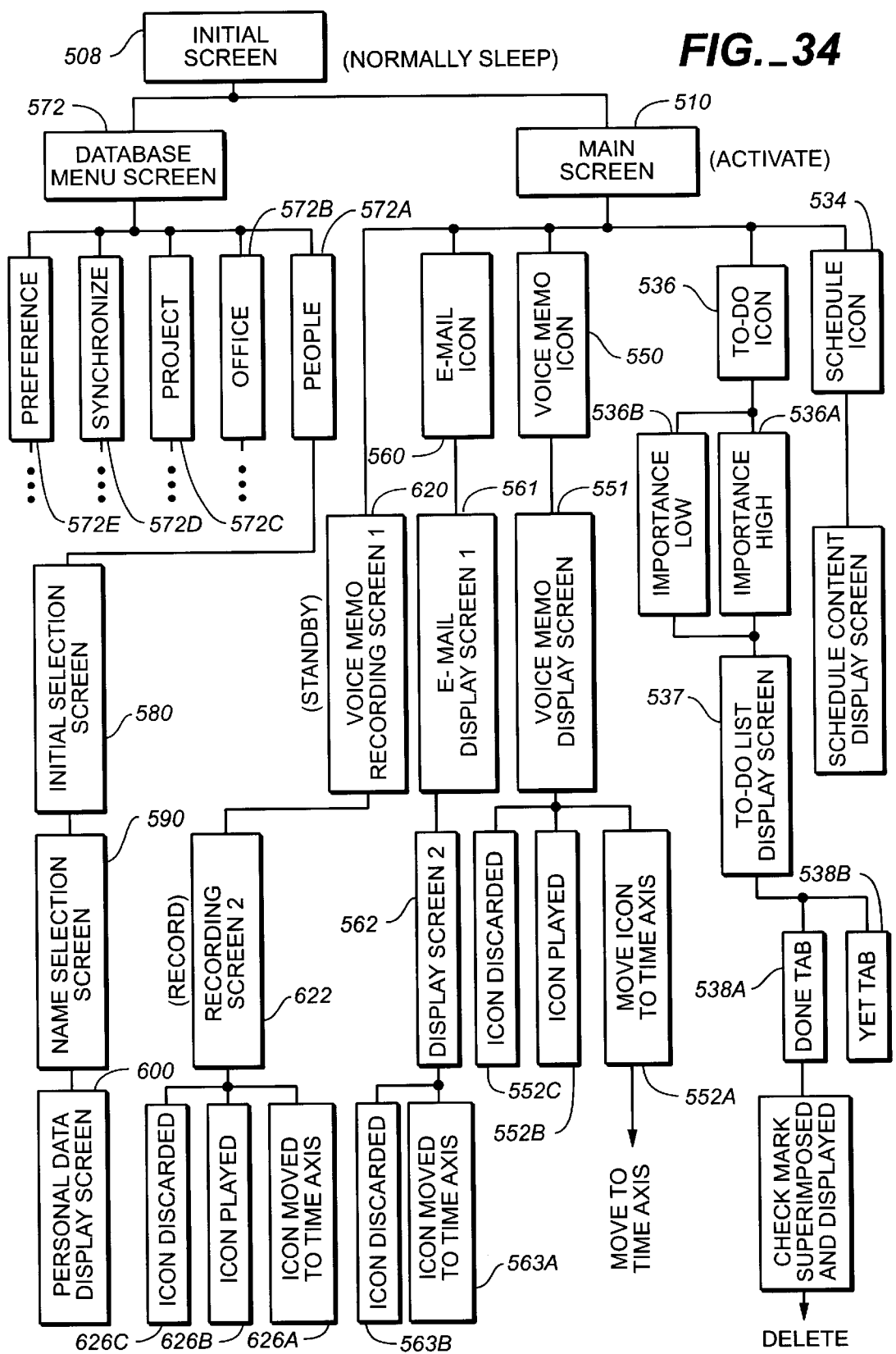
FIG._34

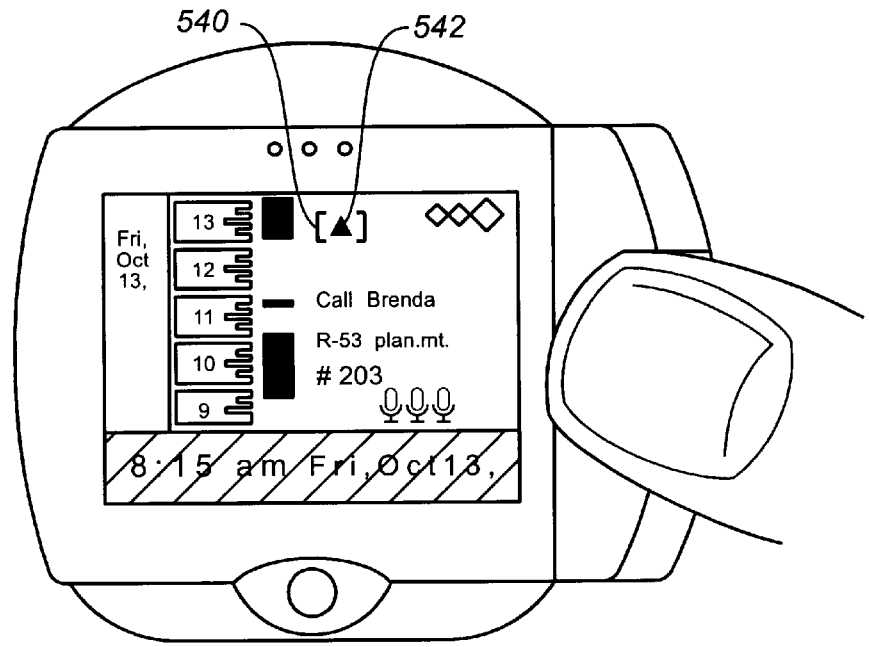
FIG._35
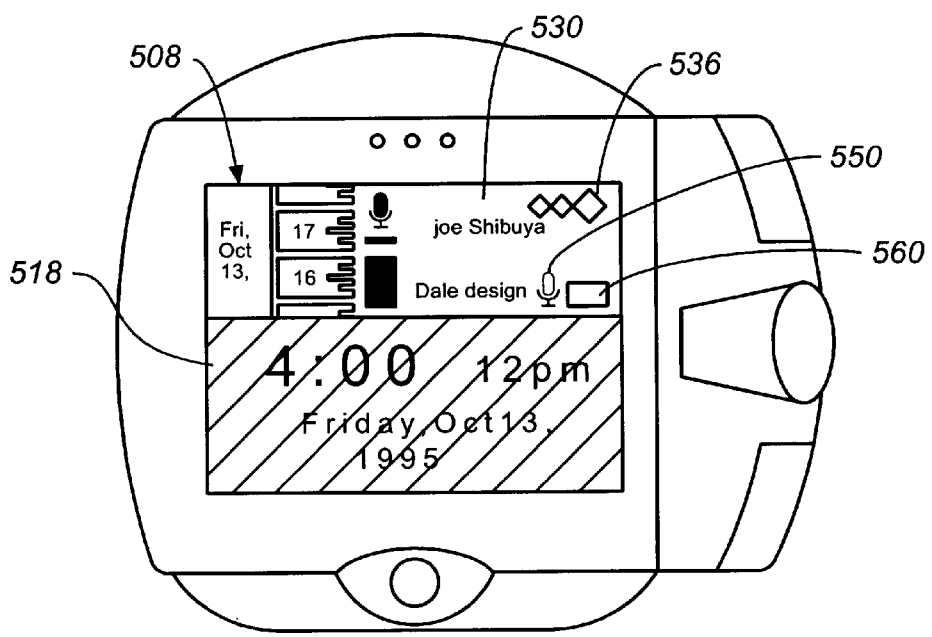
FIG._38

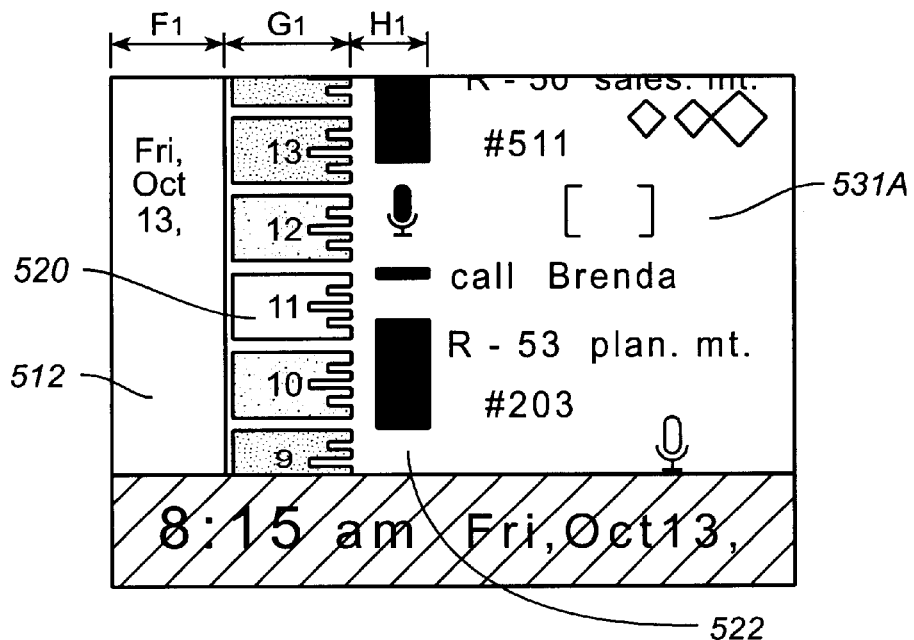
FIG._36A
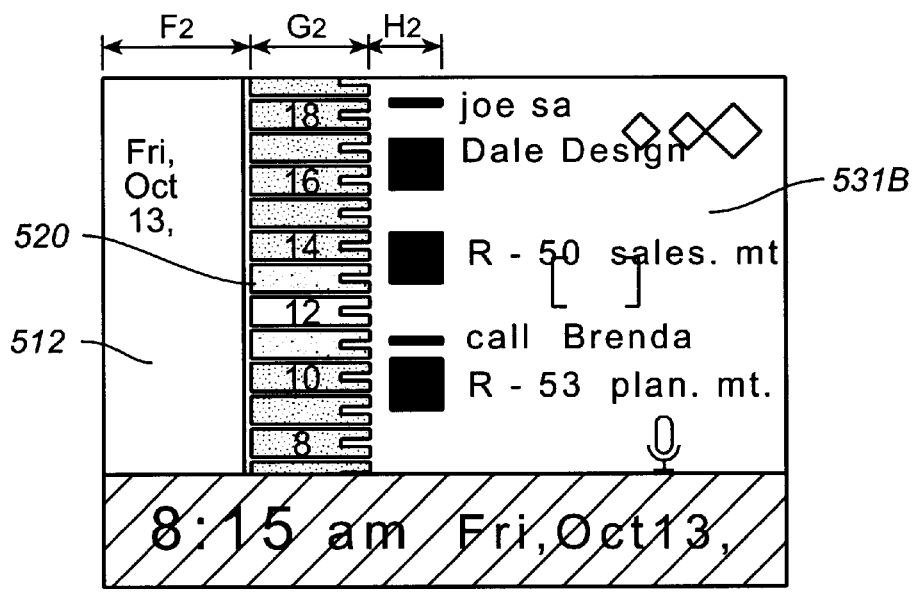
FIG._36B

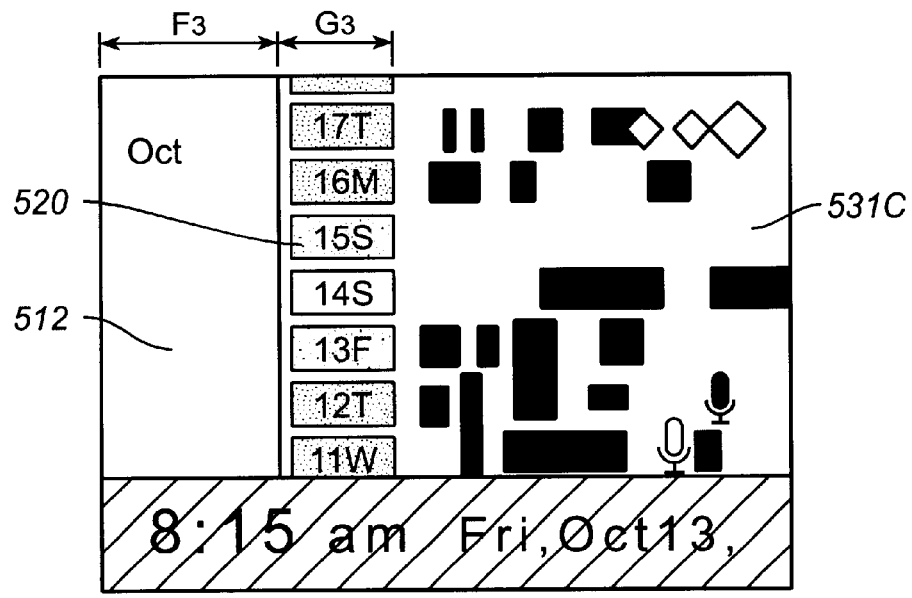
FIG._36C
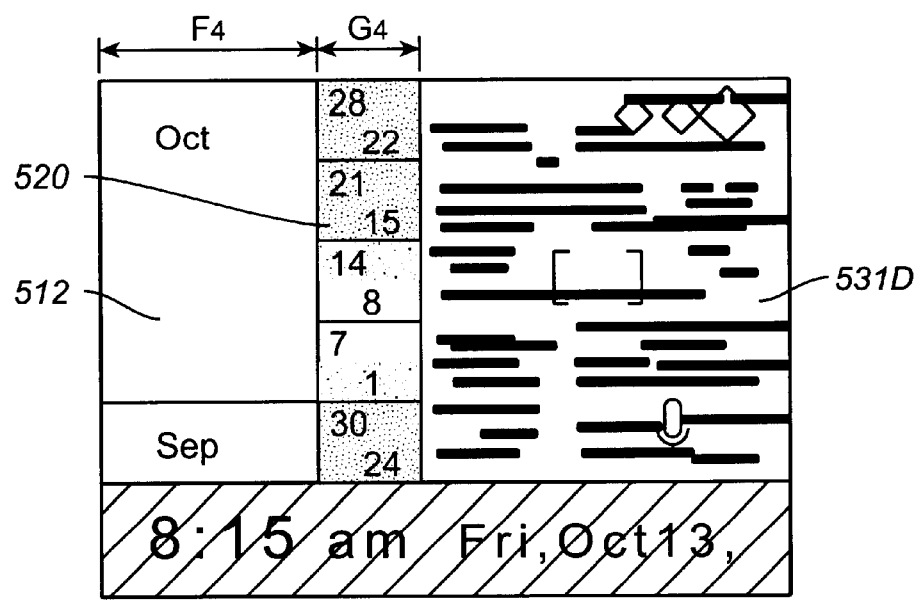
FIG._36D

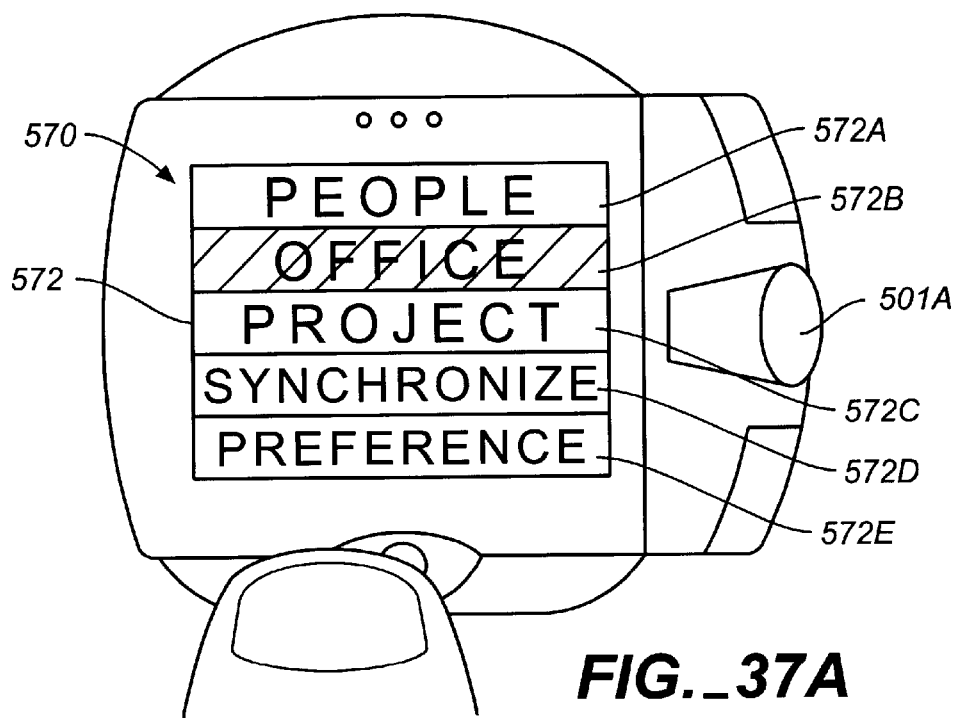
FIG._37A
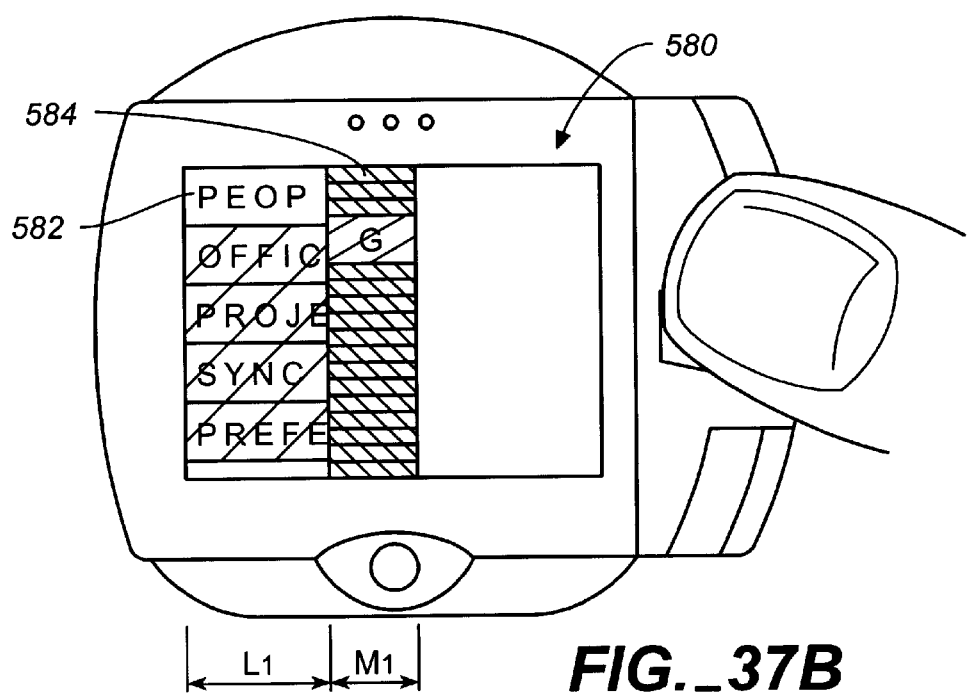
FIG._37B

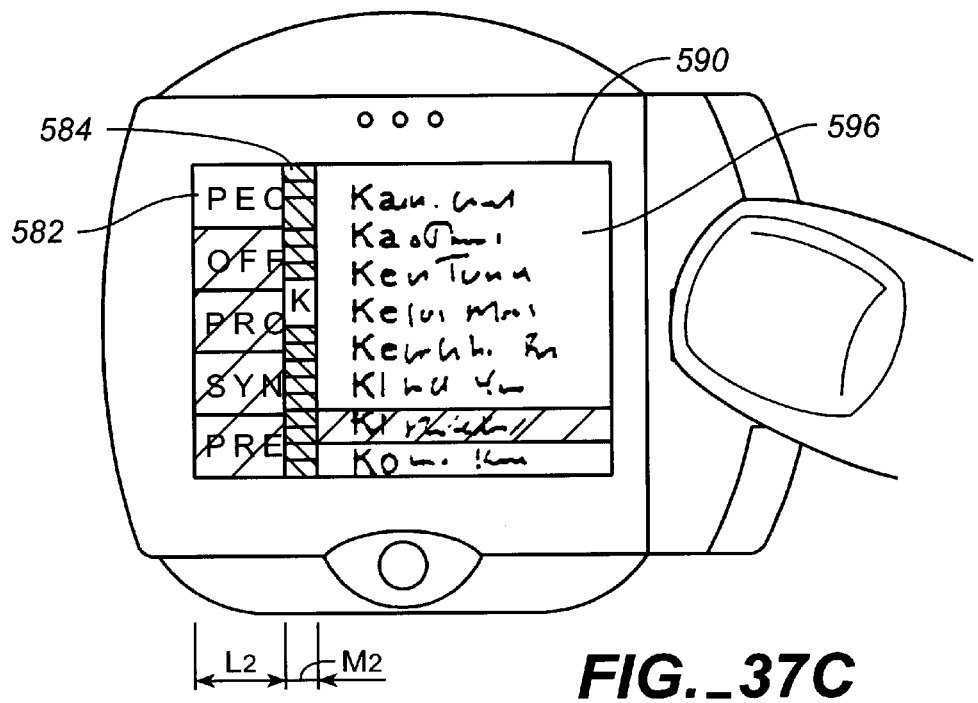
FIG._37C
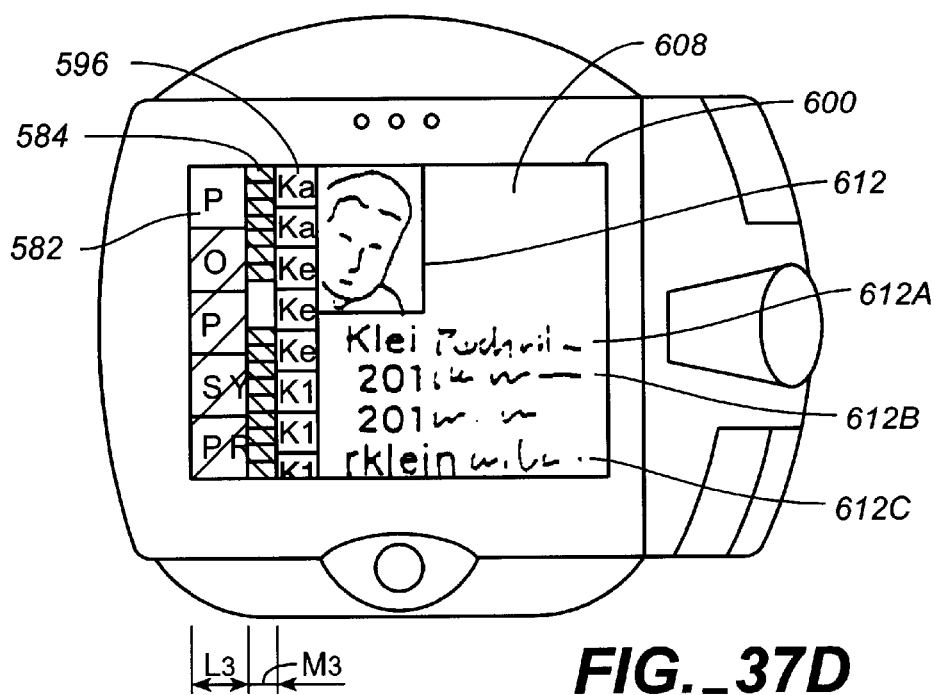
FIG._37D

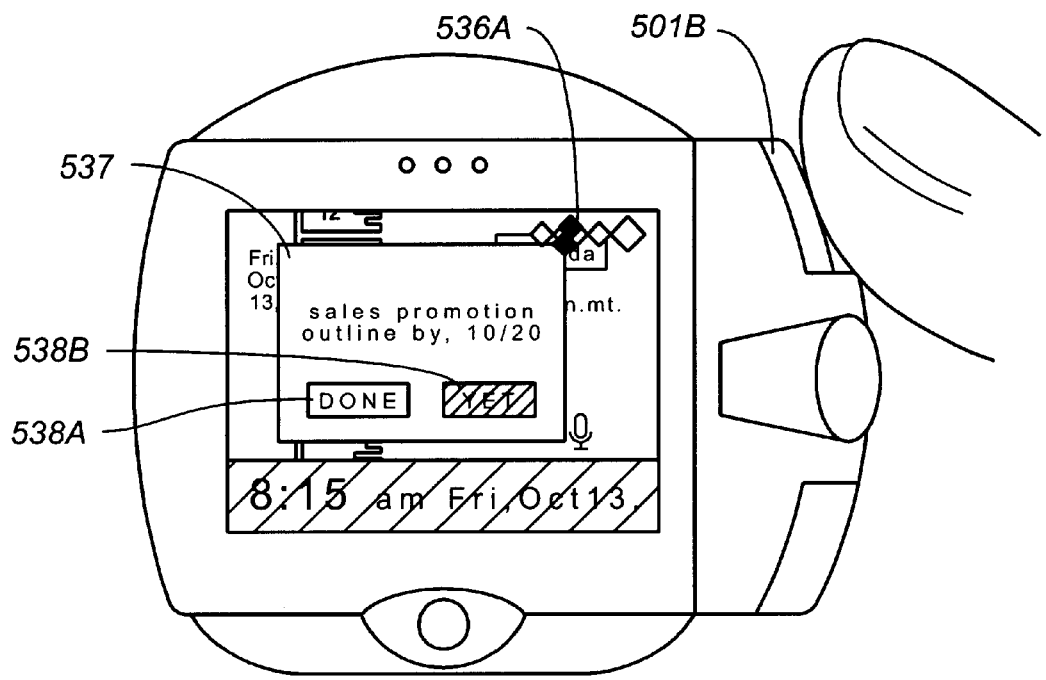
FIG._39A
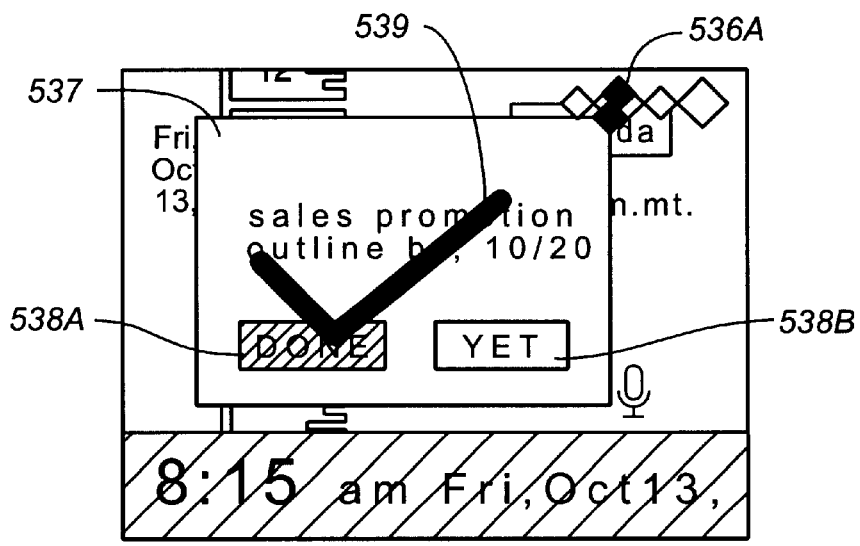
FIG._39B

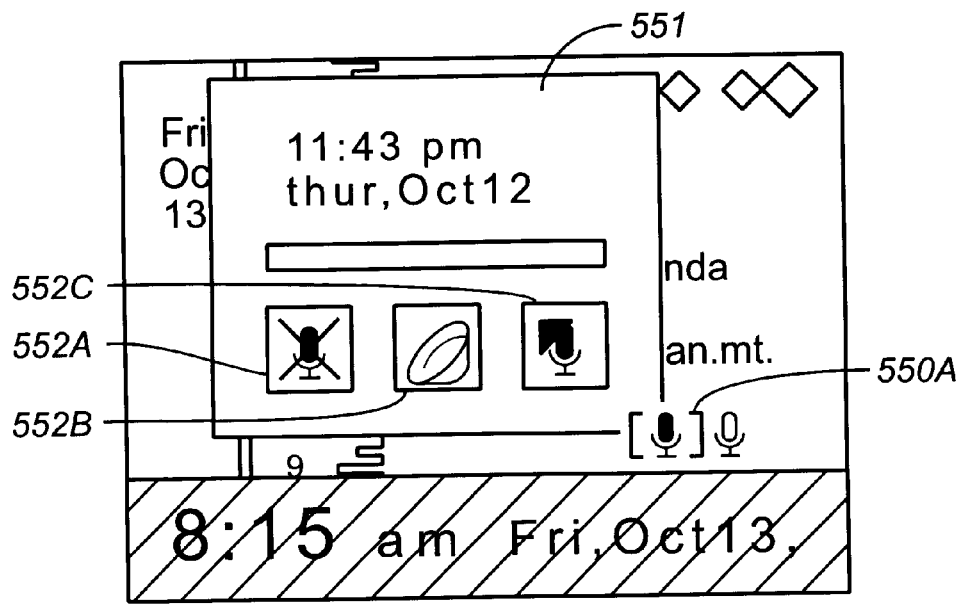
FIG._40A
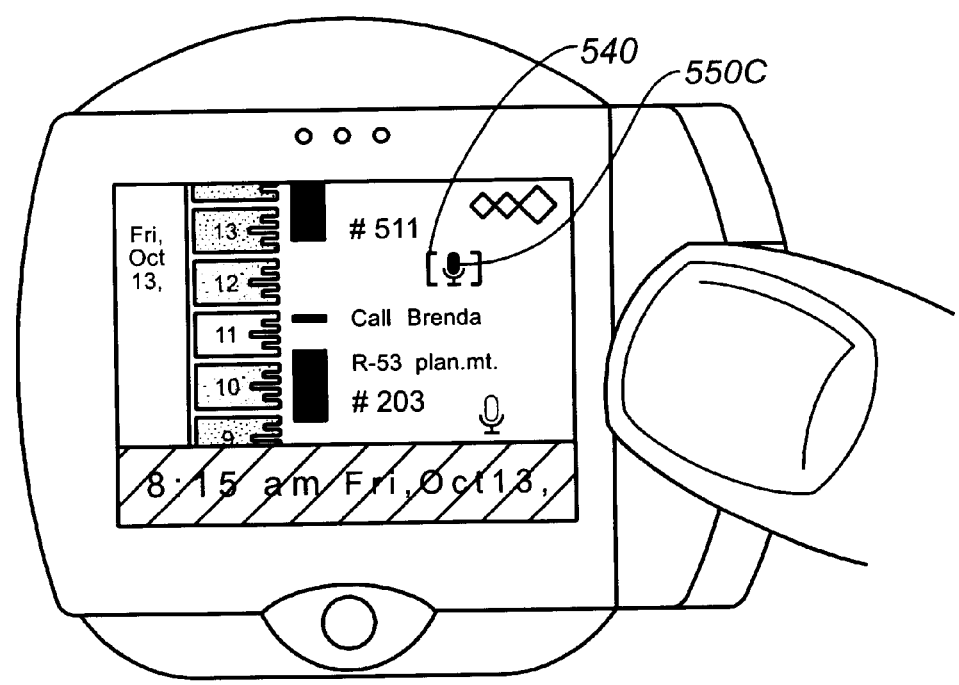
FIG._40B

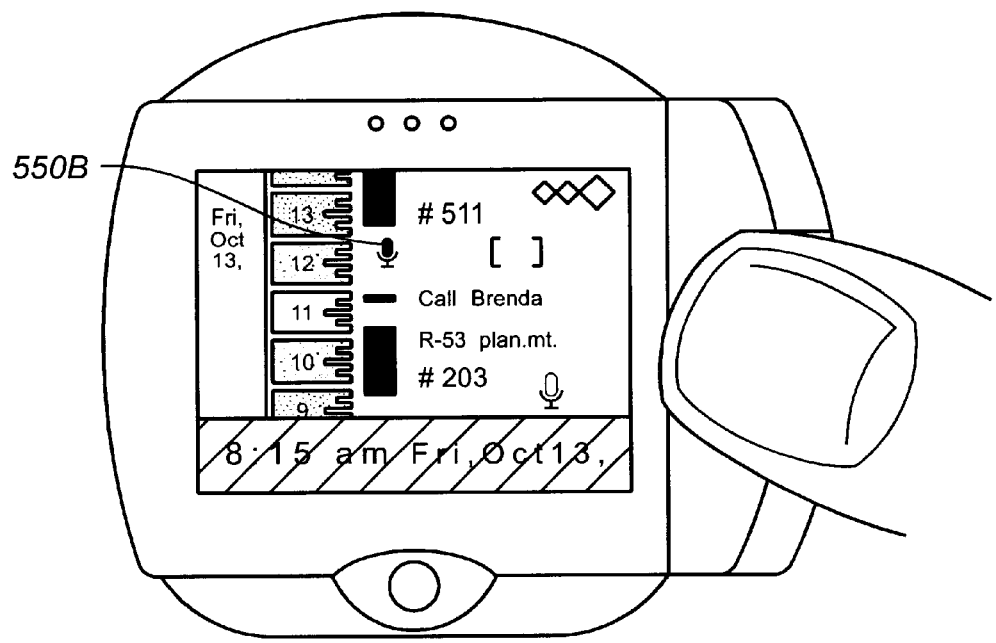
FIG._40C
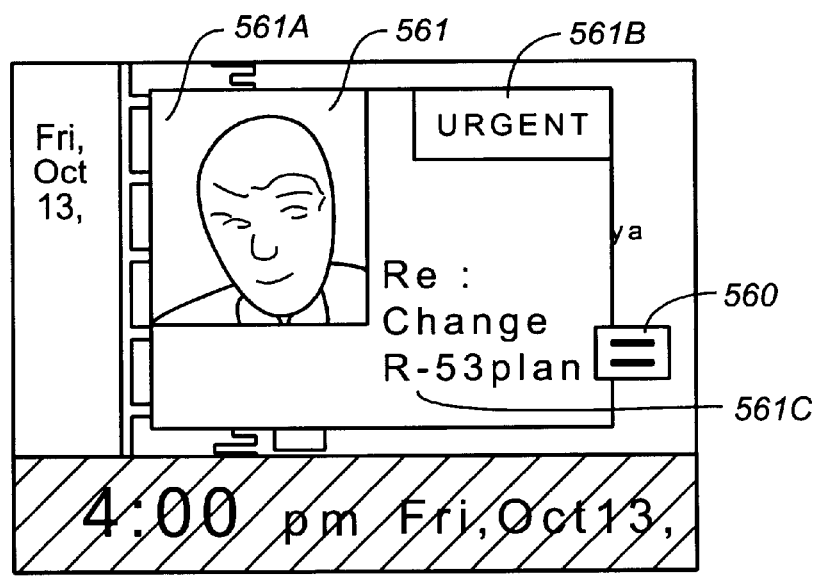
FIG._41A

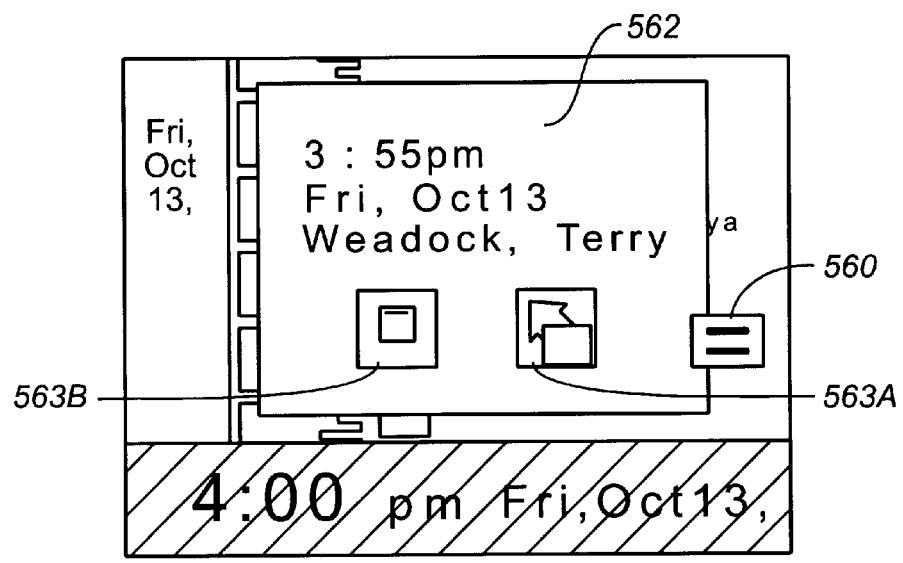
FIG._41B
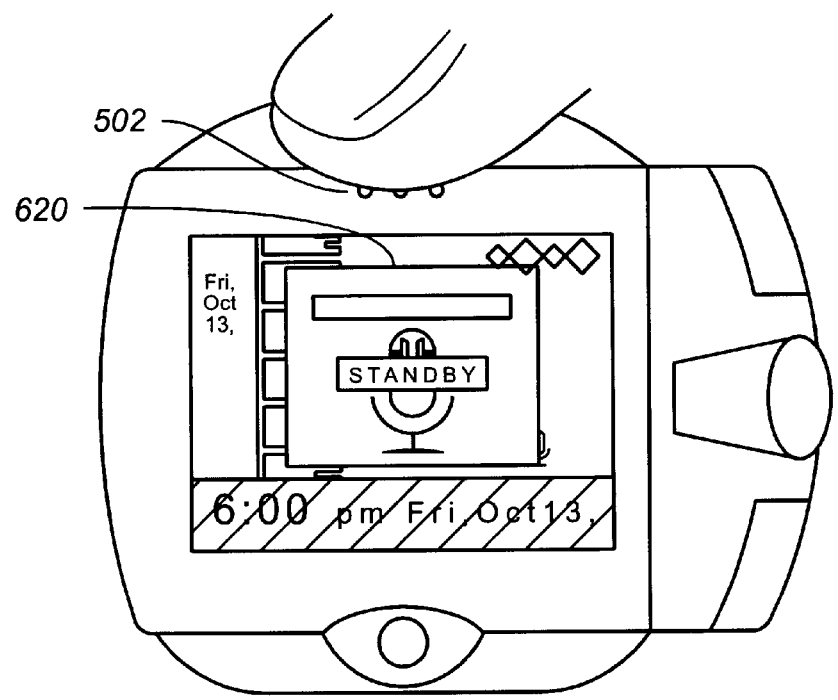
FIG._42A

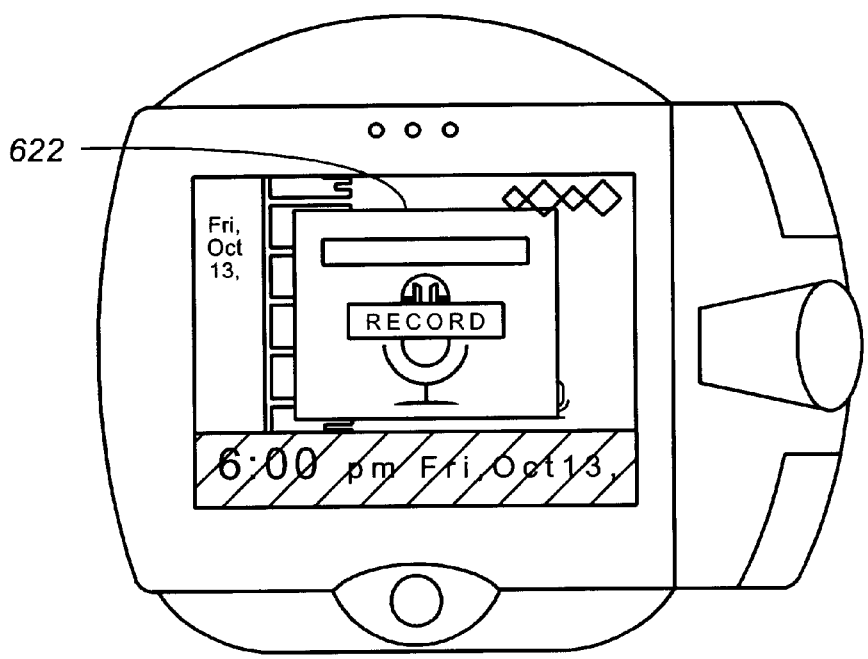
FIG._42B
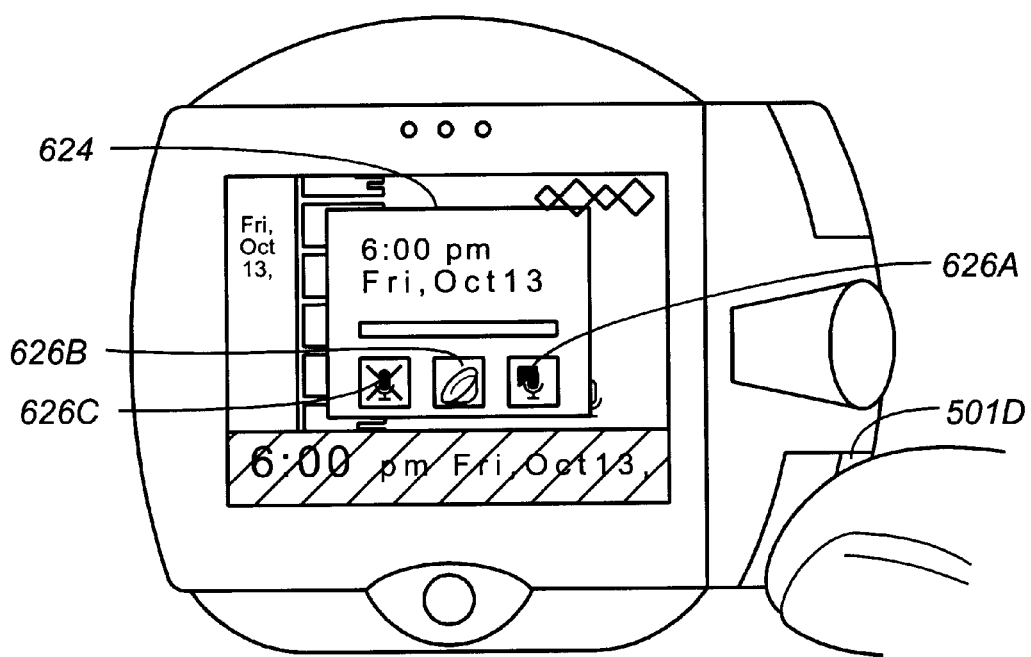
FIG._42C

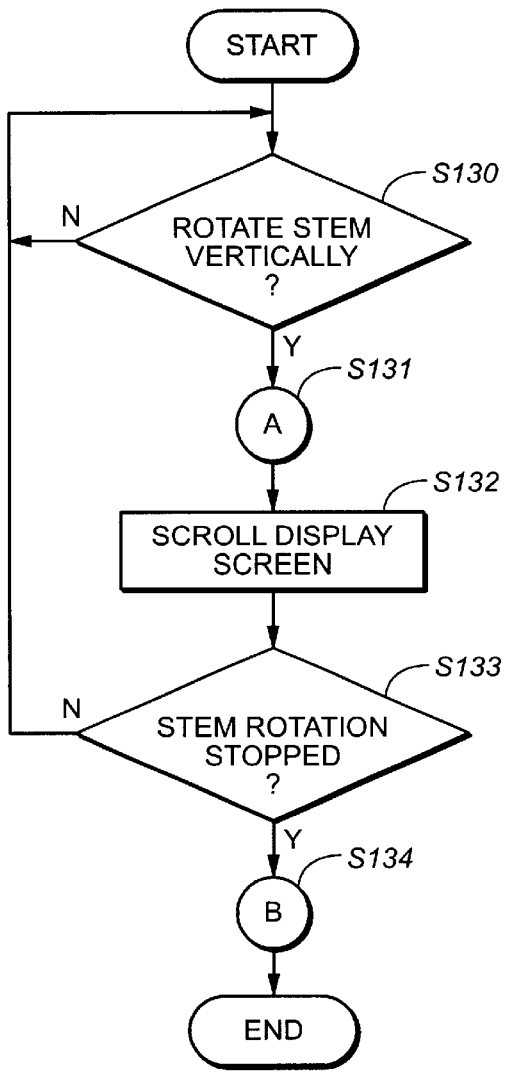
FIG._43A
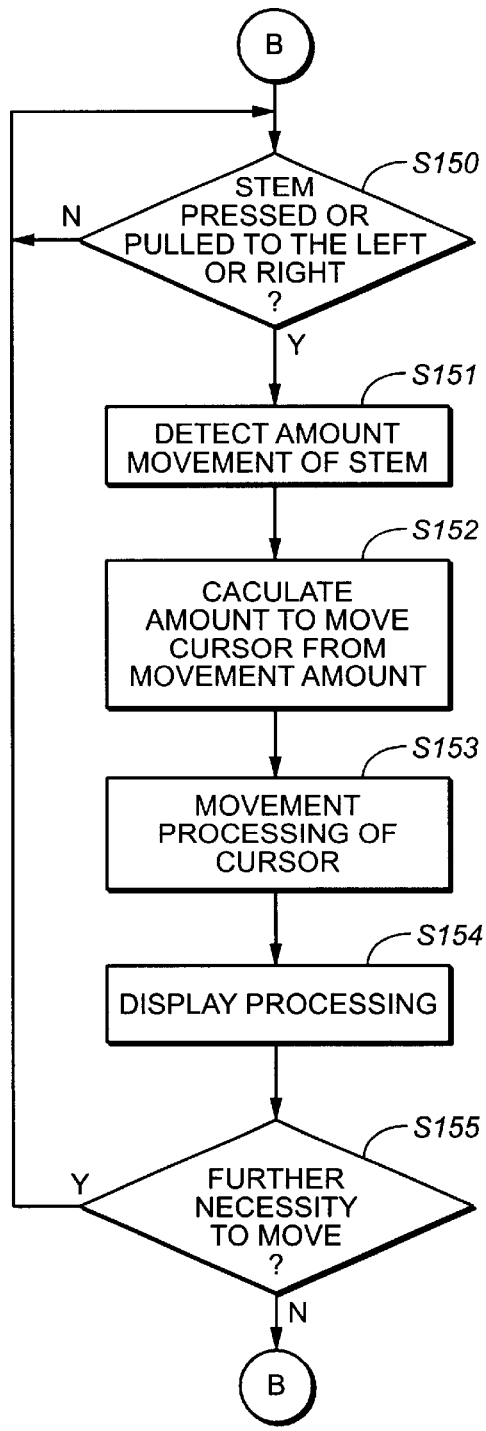
FIG._43C

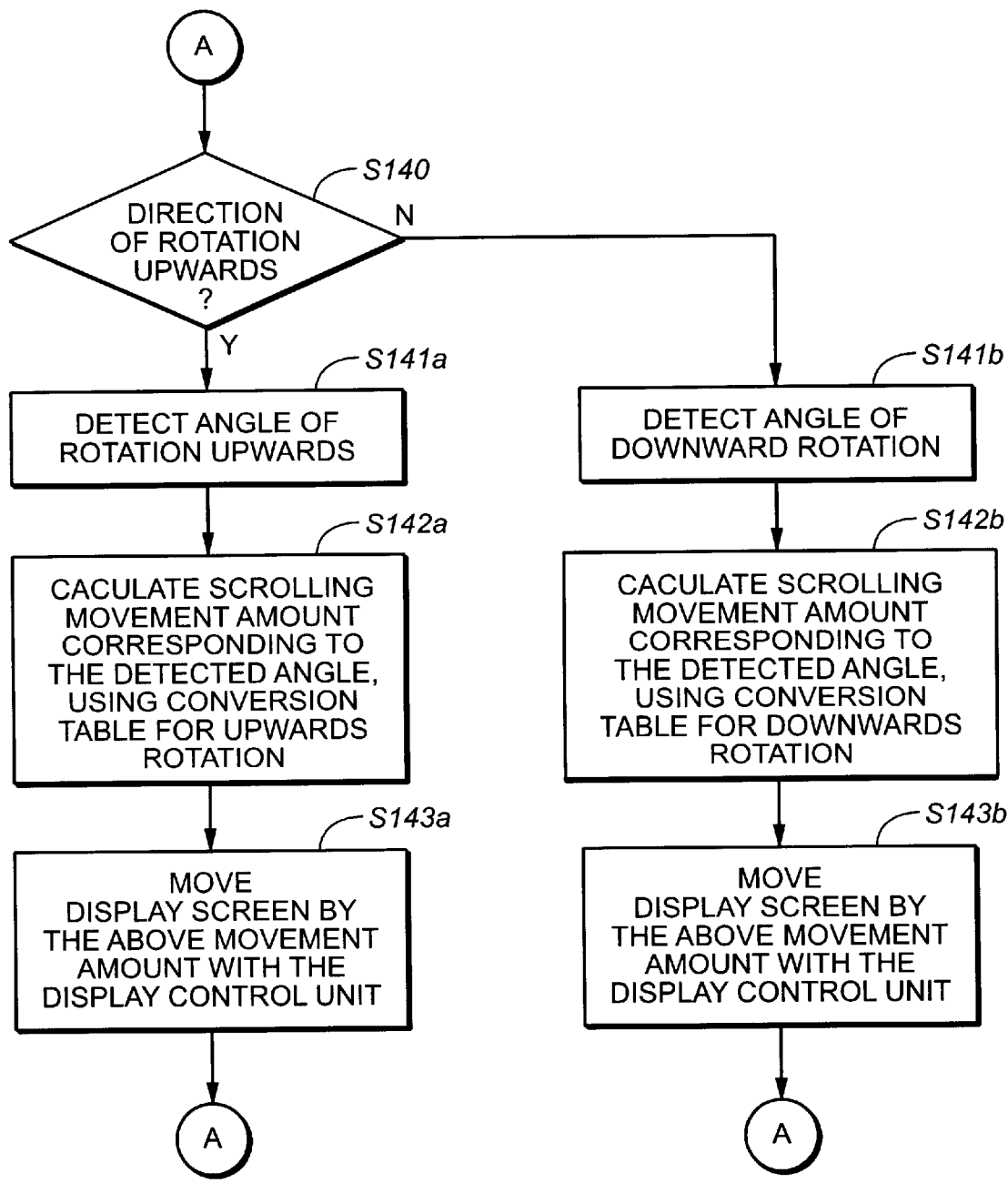
FIG._43B

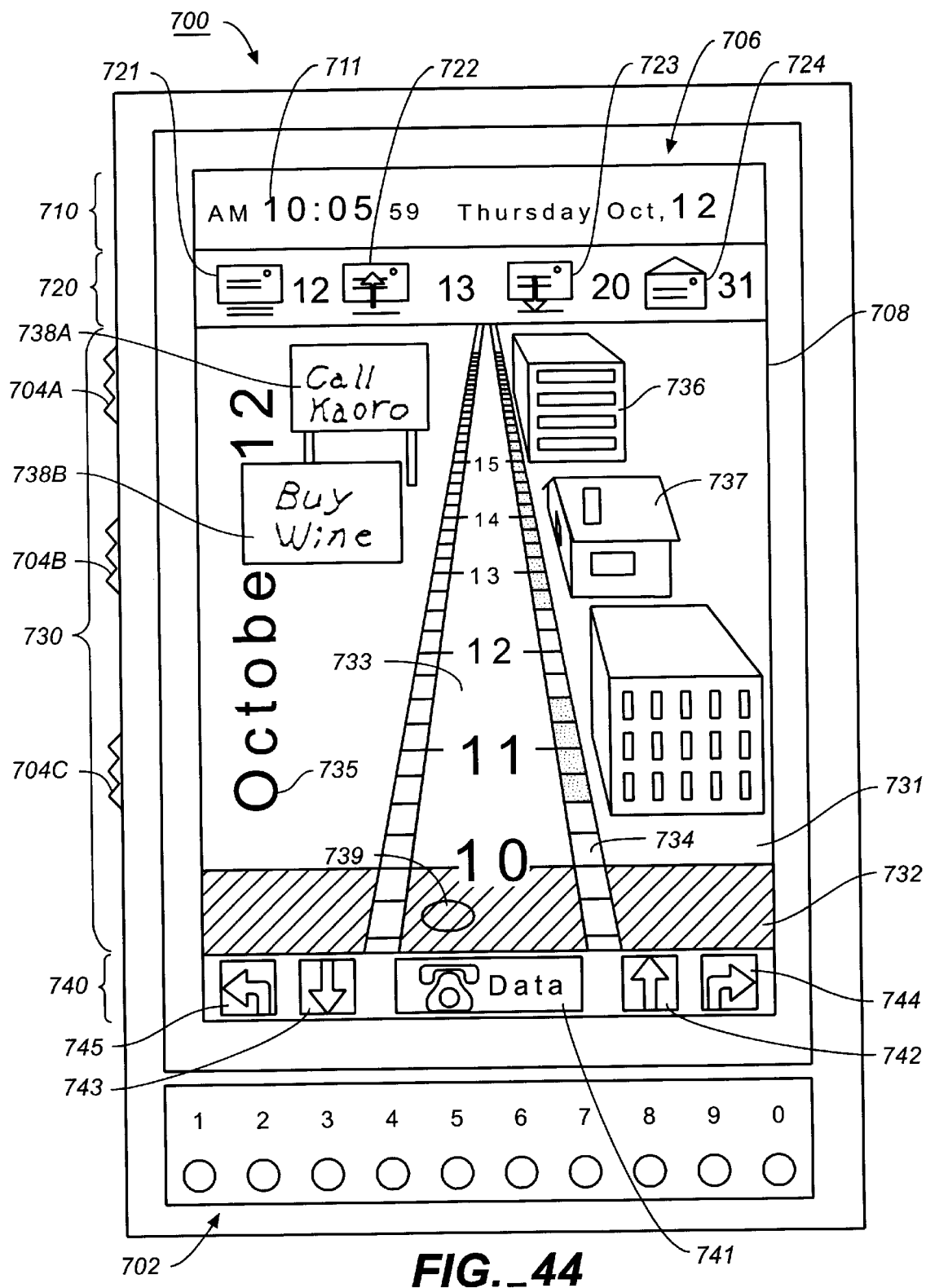
FIG._44

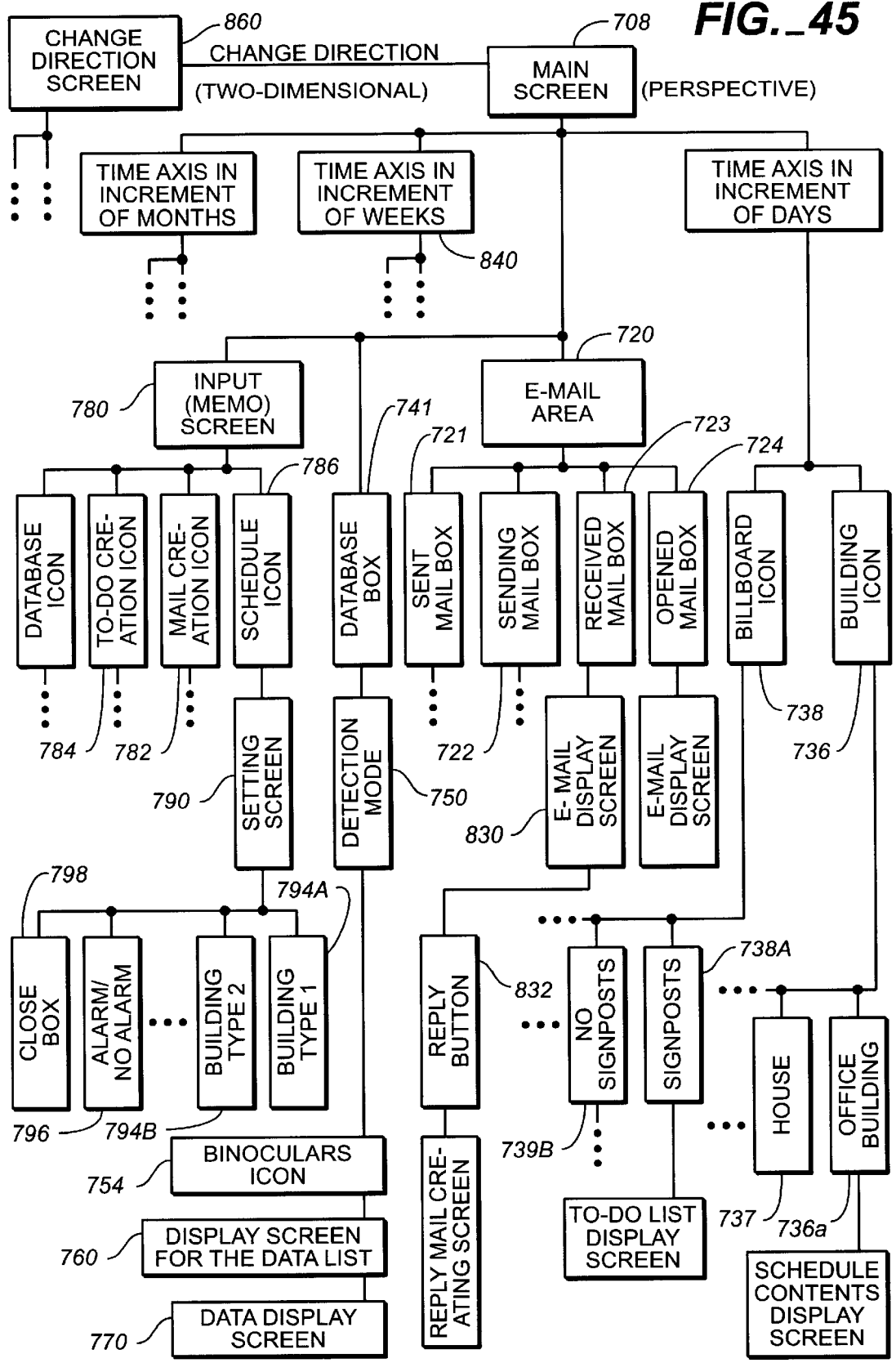
FIG._45

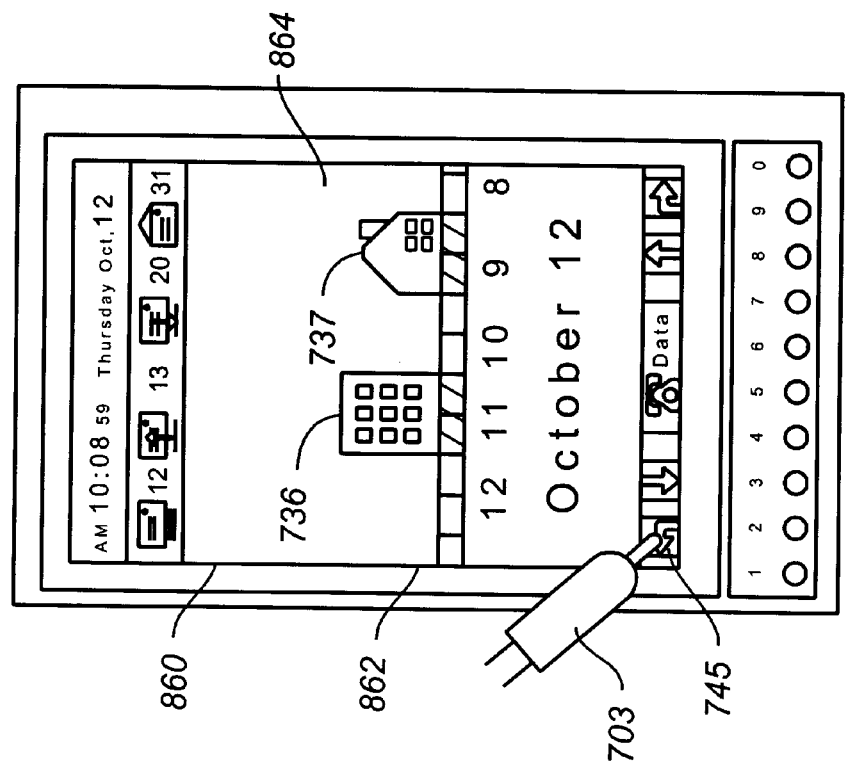
FIG._46B
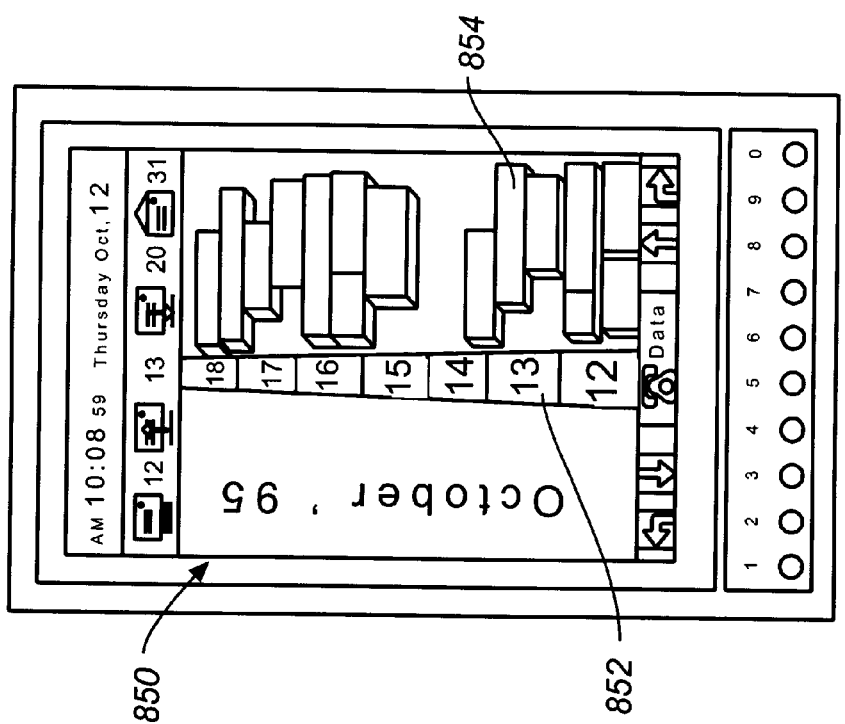
FIG._46A

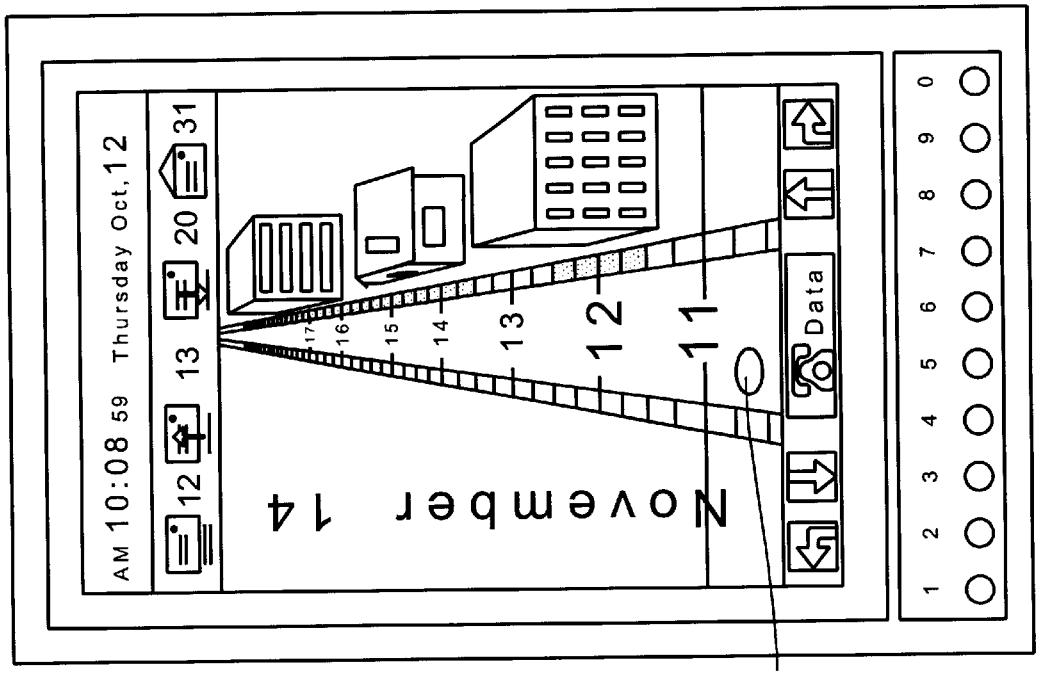
FIG._47B
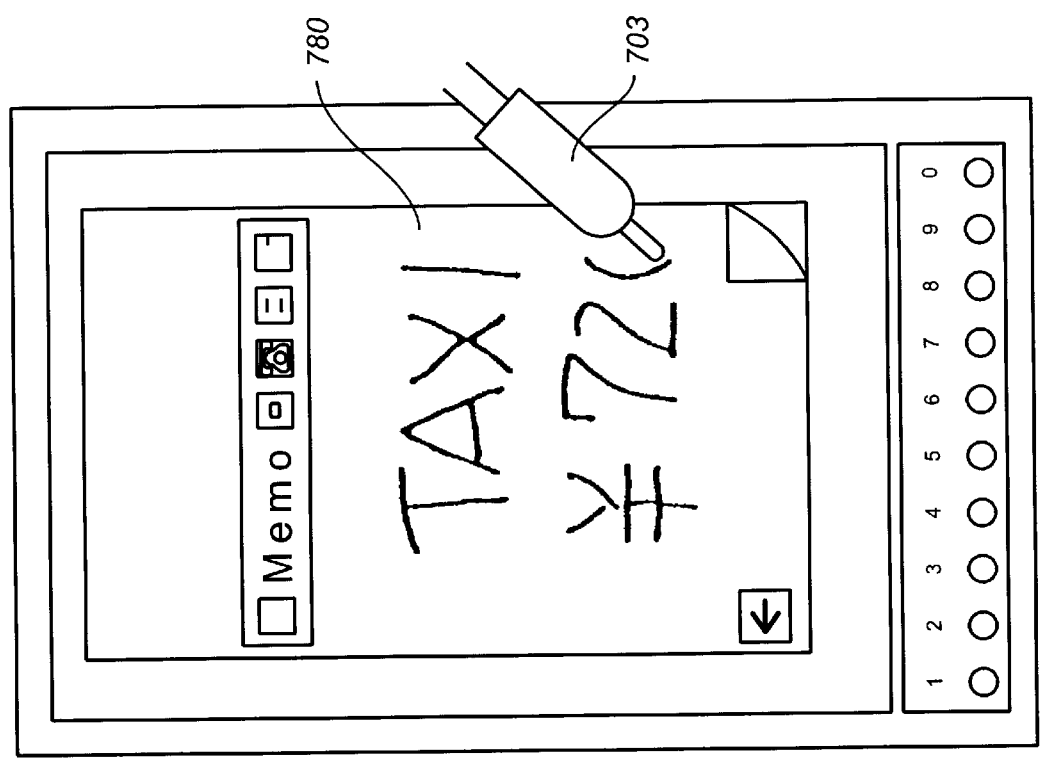
FIG._47A

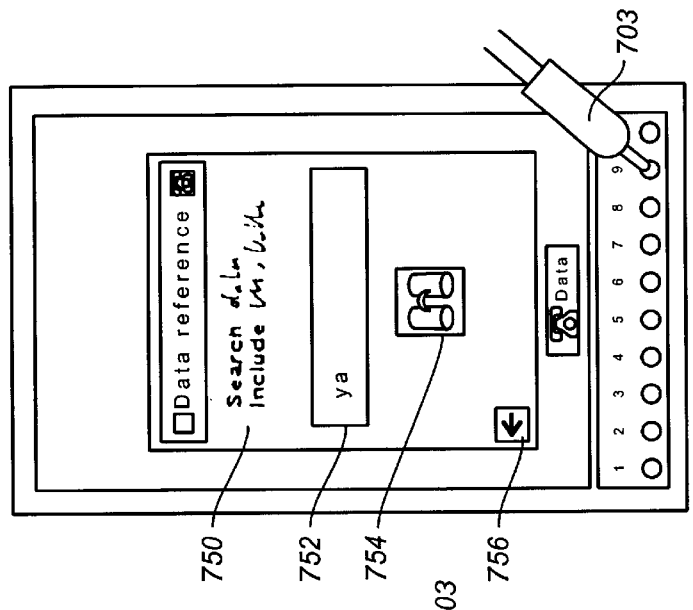
FIG._48C
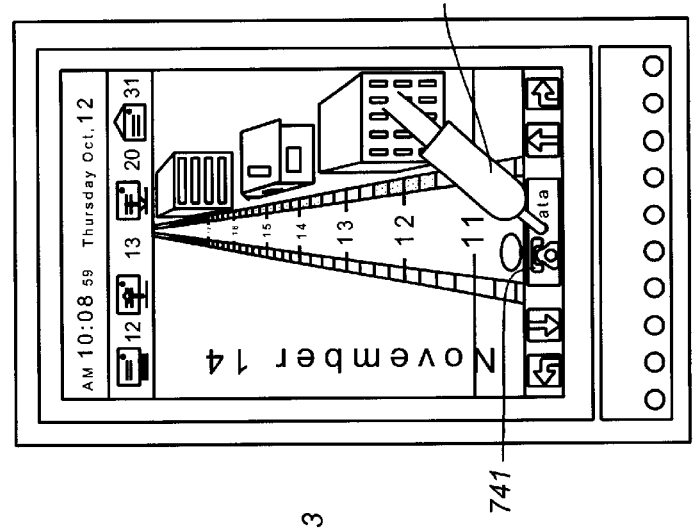
FIG._48B
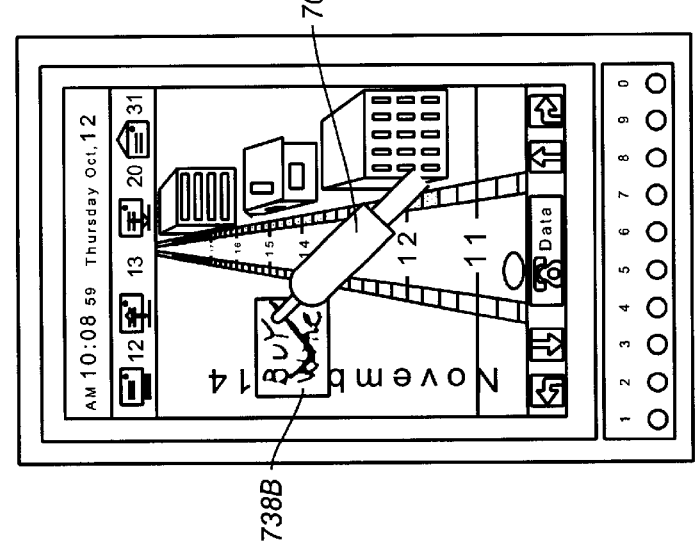
FIG._48A

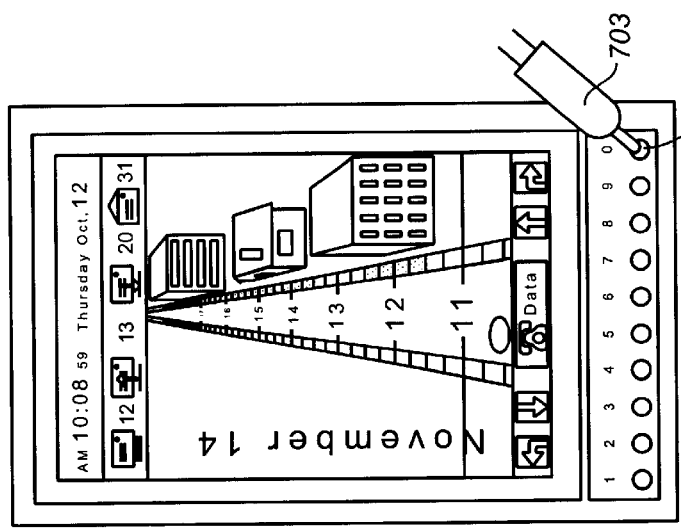
FIG._48F
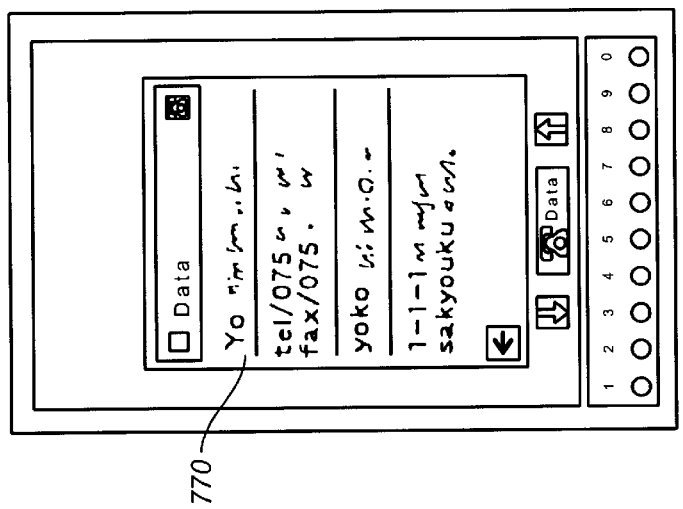
FIG._48E
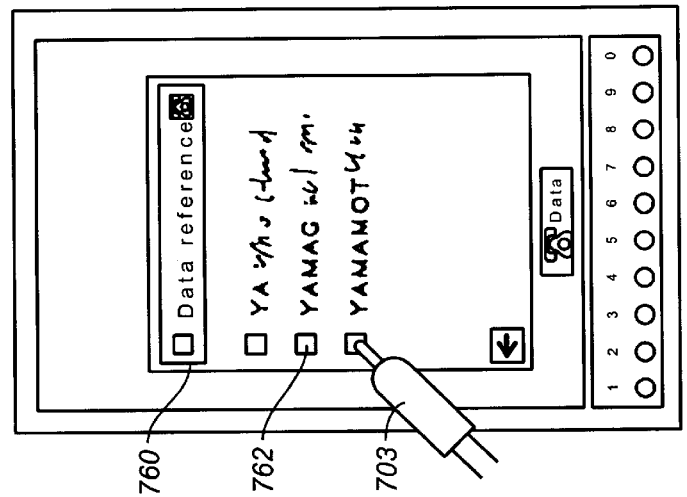
FIG._48D

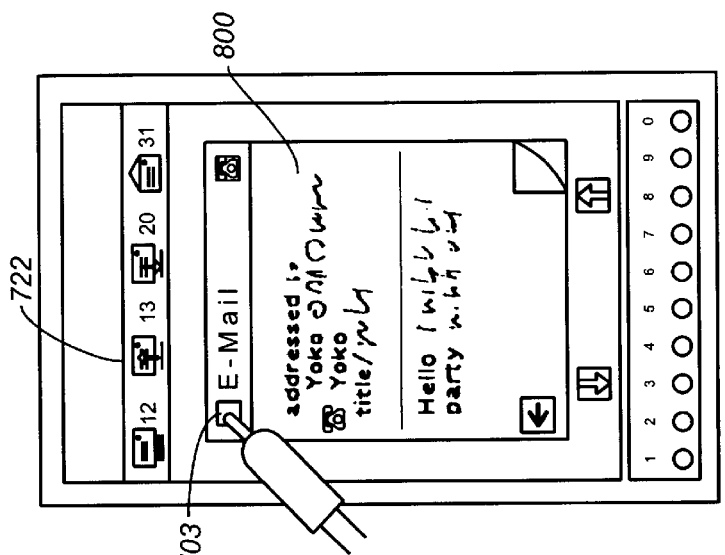
FIG._49C
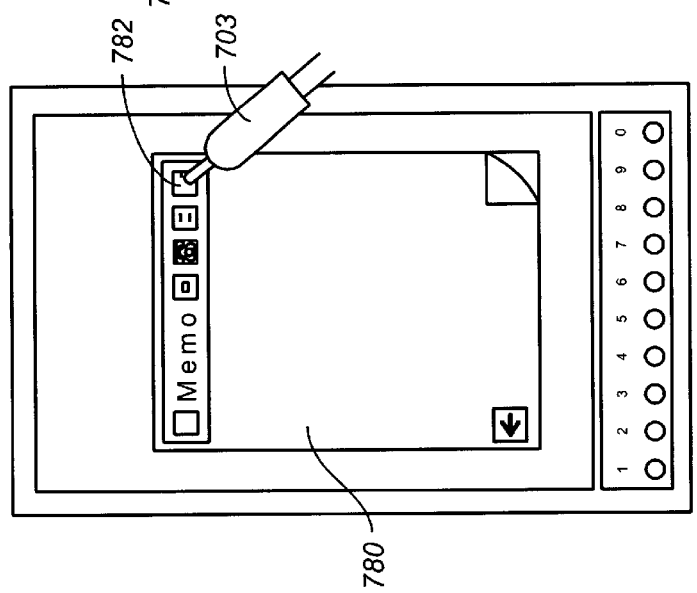
FIG._49B
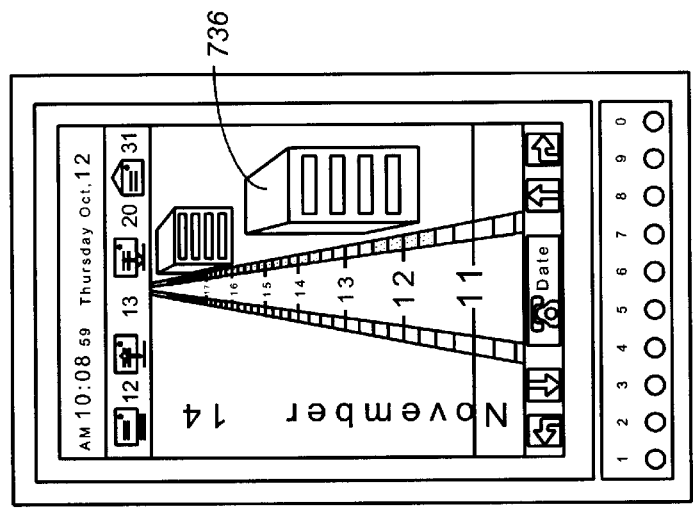
FIG._49A

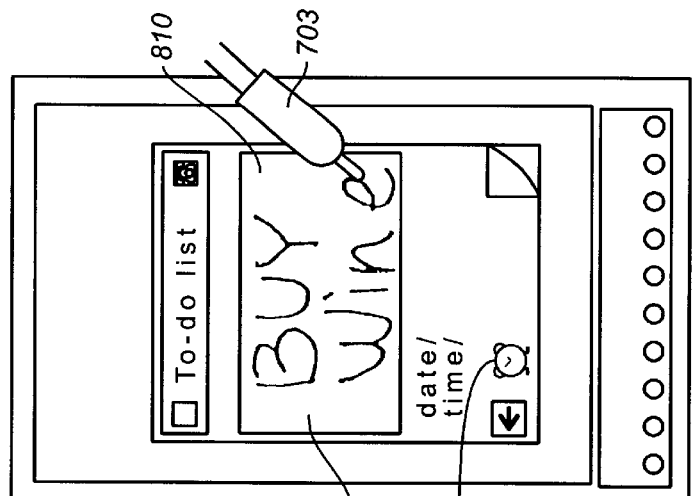
FIG._49F
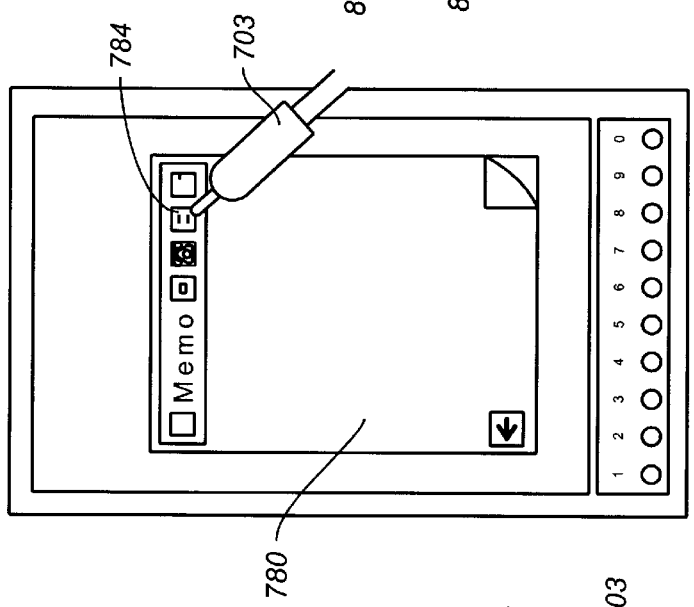
FIG._49E
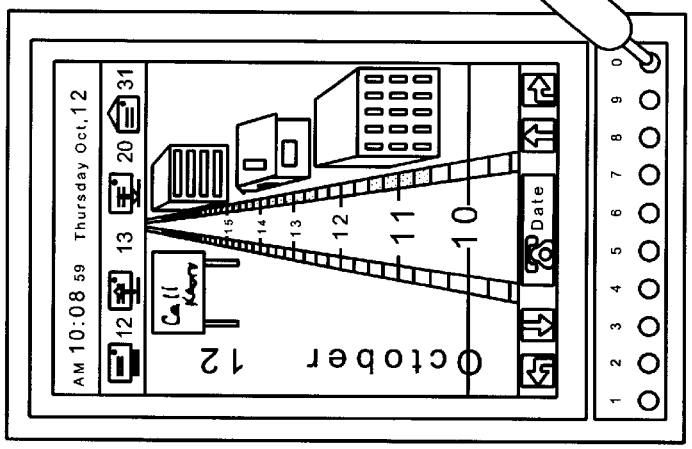
FIG._49D

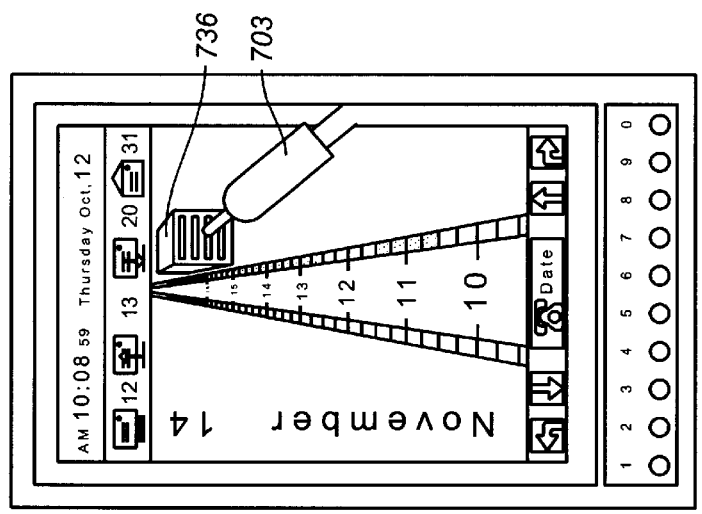
FIG._50C
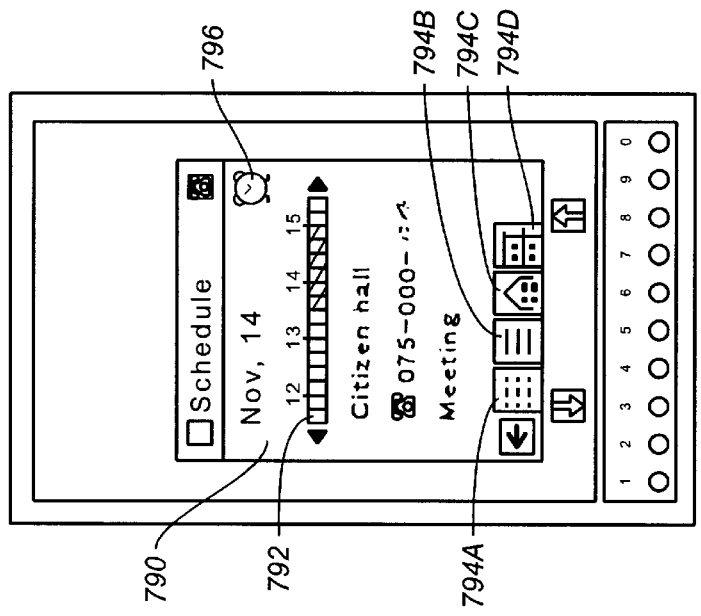
FIG._50B
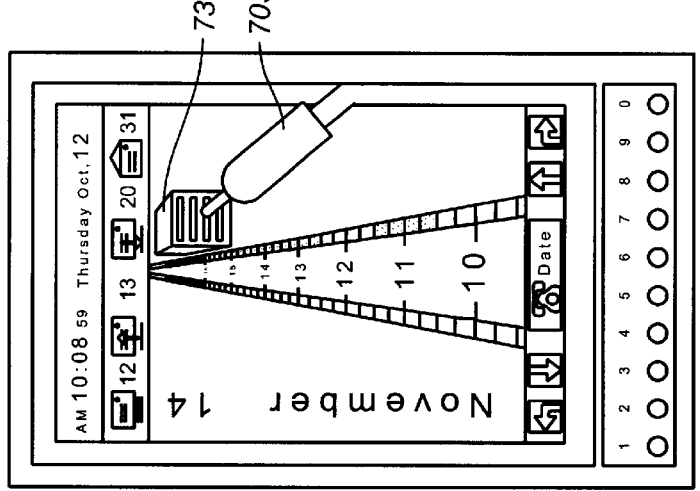
FIG._50A

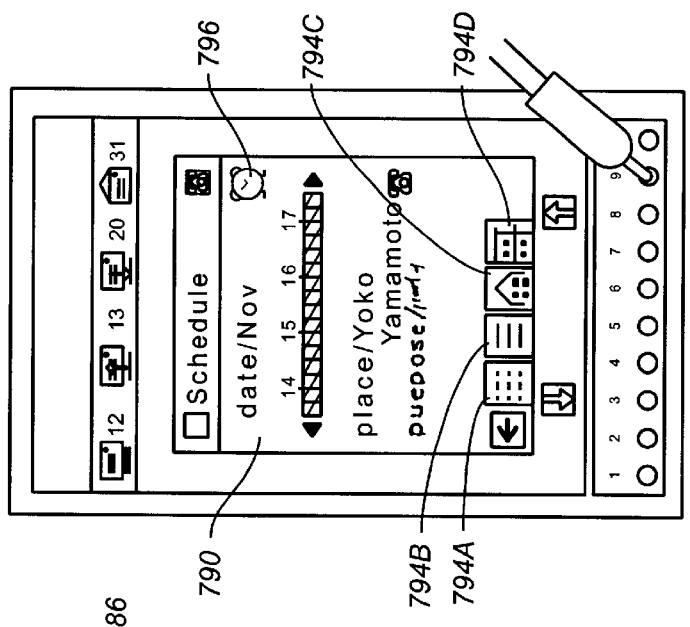
FIG._50F
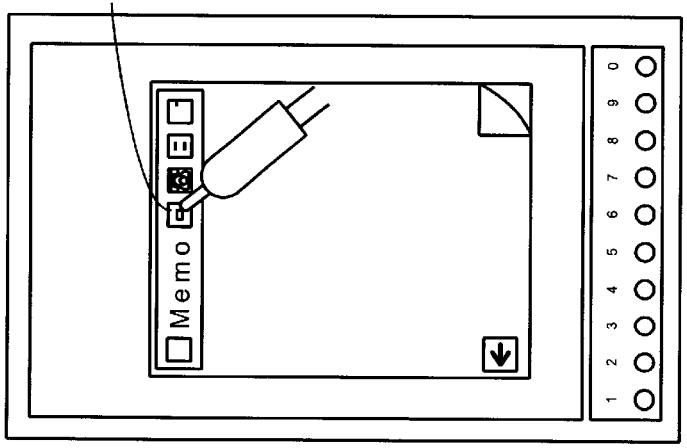
FIG._50E
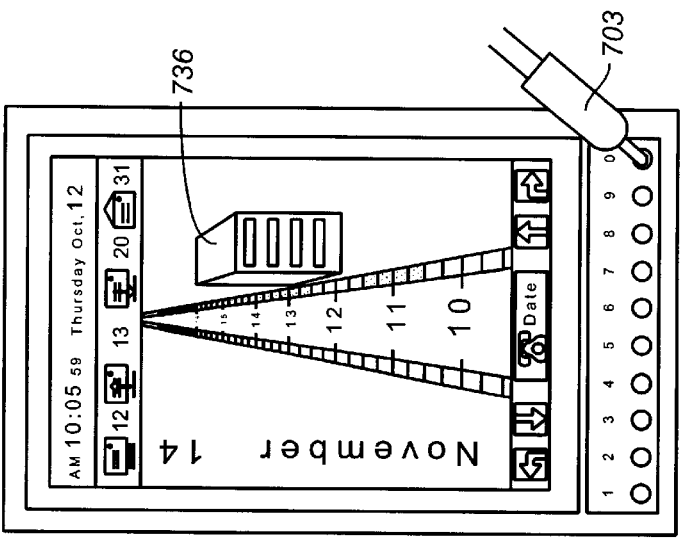
FIG._50D

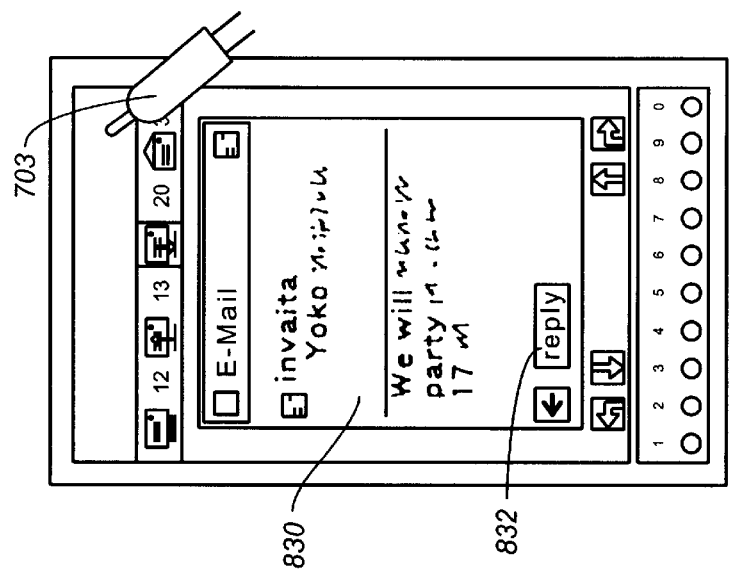
*FIG._51C*
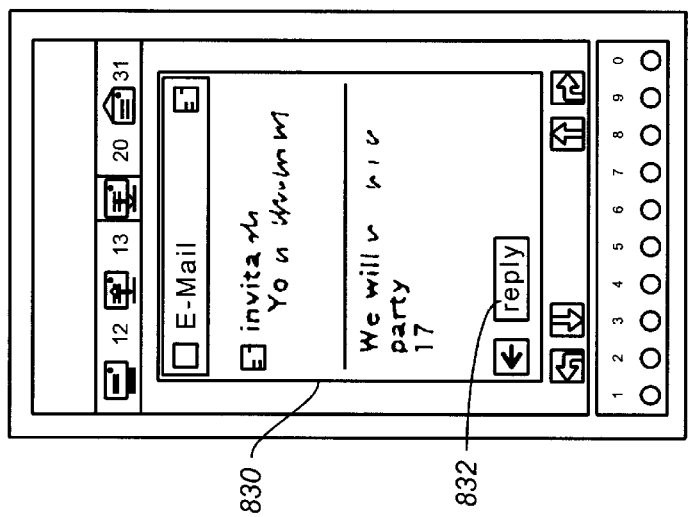
*FIG._51B*
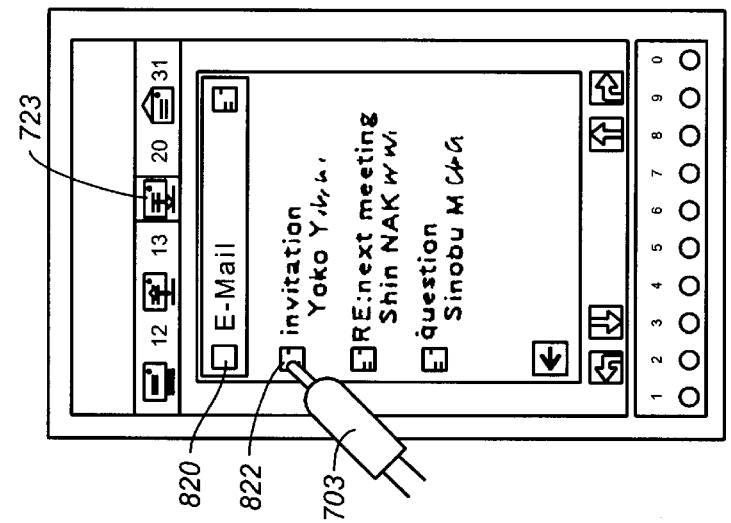
*FIG._51A*

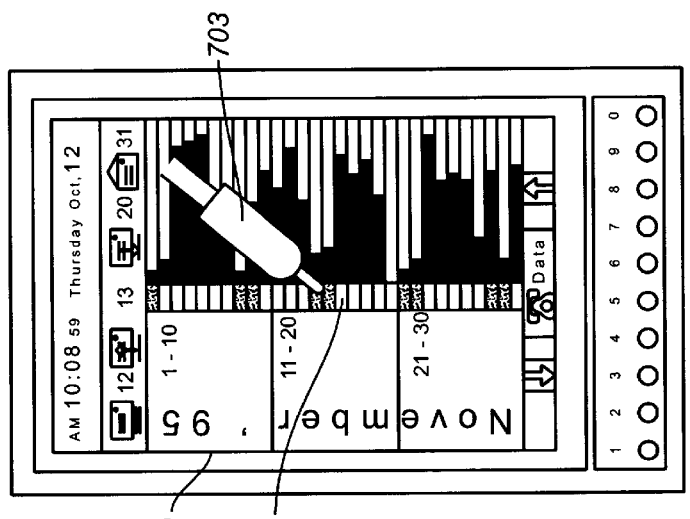
FIG._51F
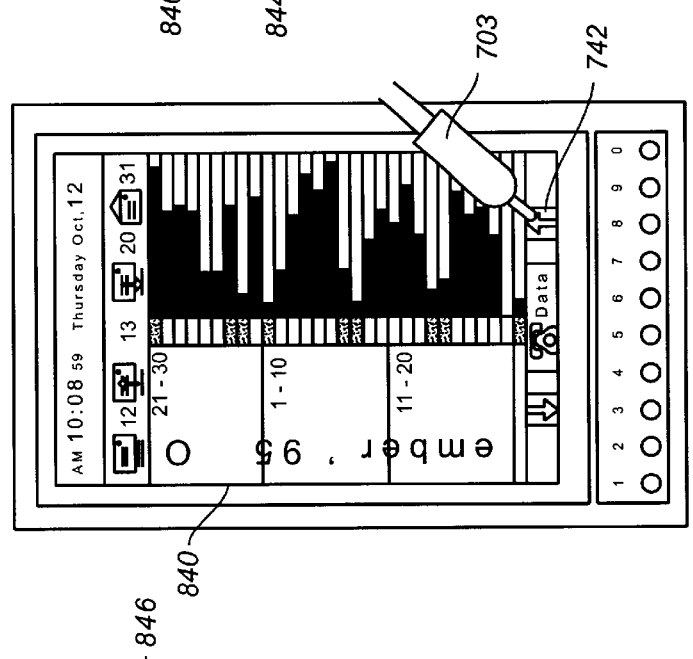
FIG._51E
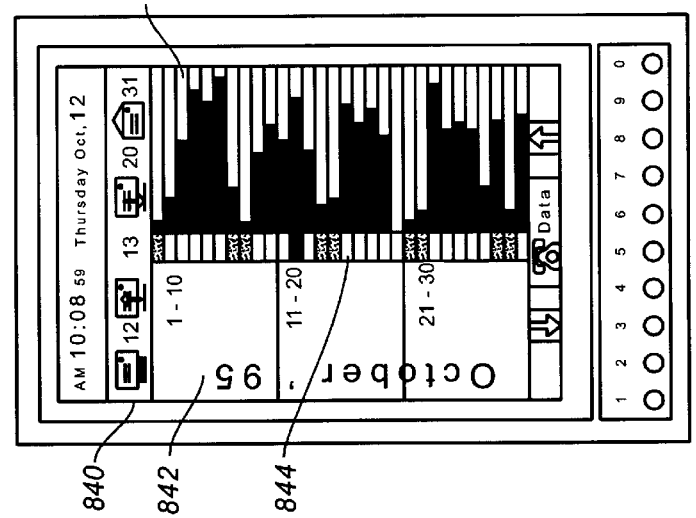
FIG._51D

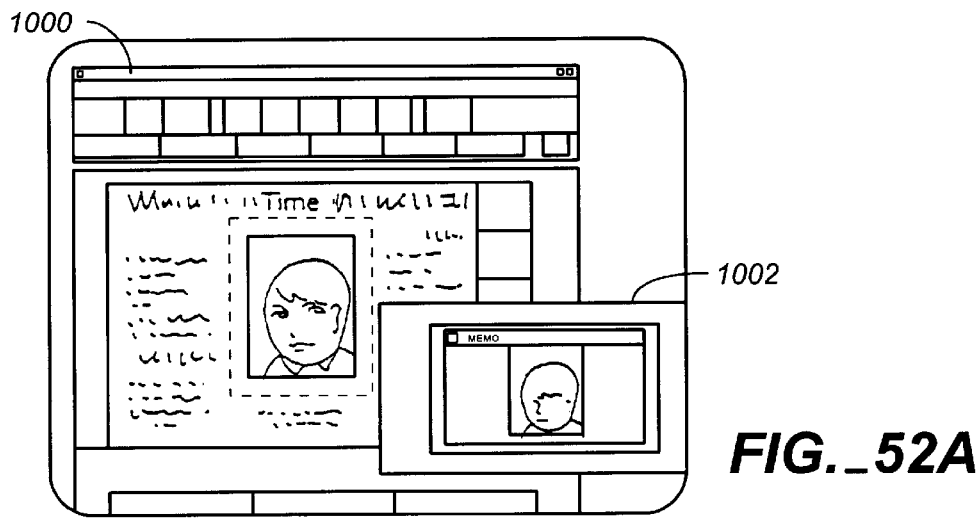
FIG._52A
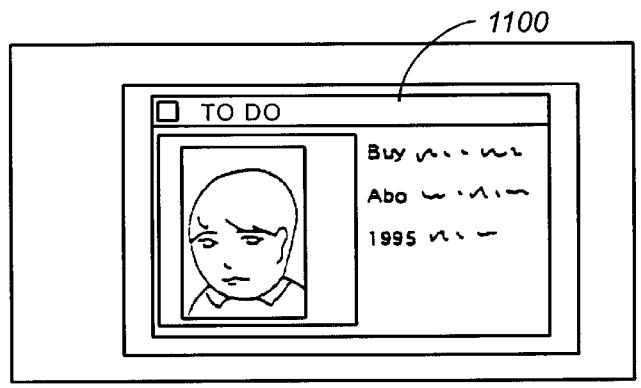
FIG._52B
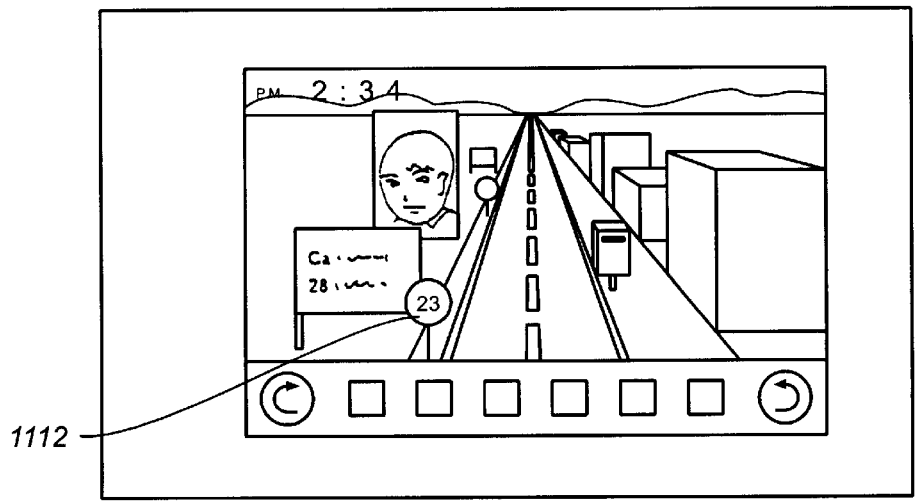
FIG._52C

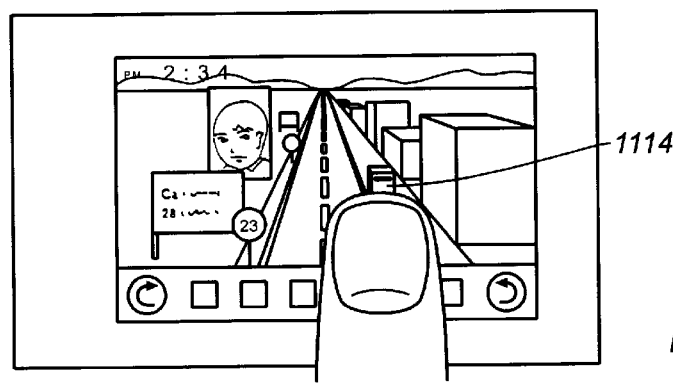
FIG._53A
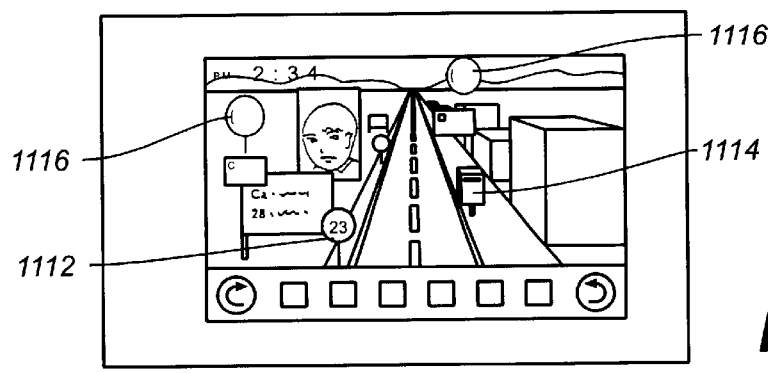
FIG._53B
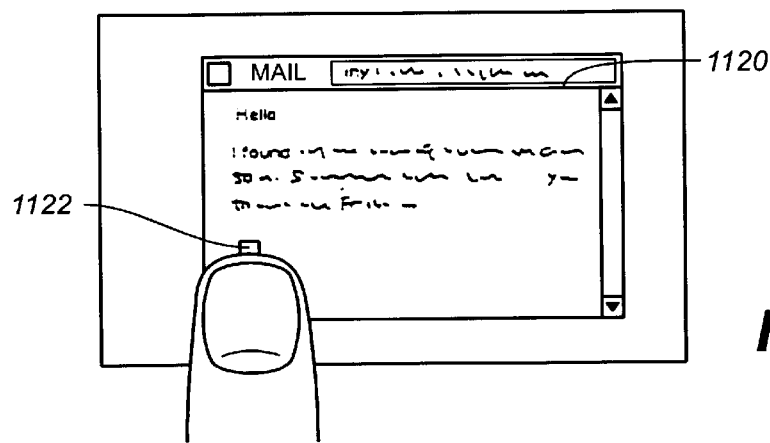
FIG._53C
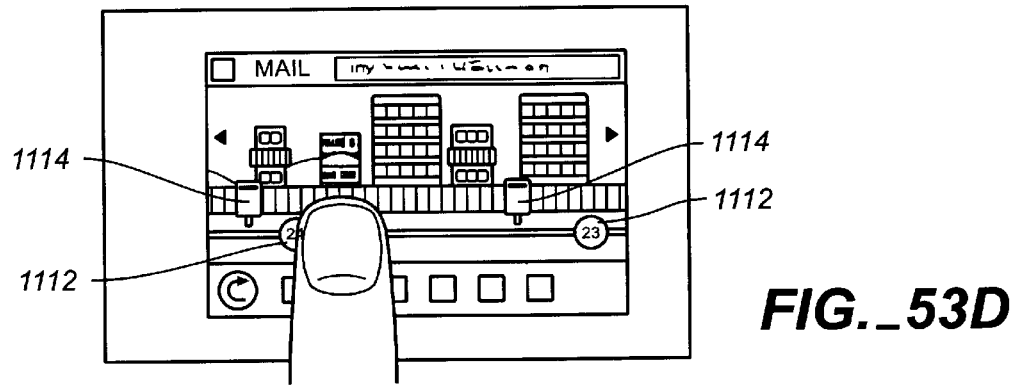
FIG._53D

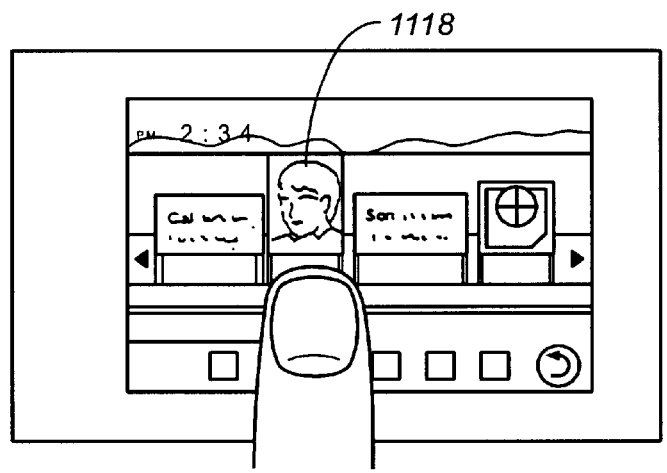
FIG._54A
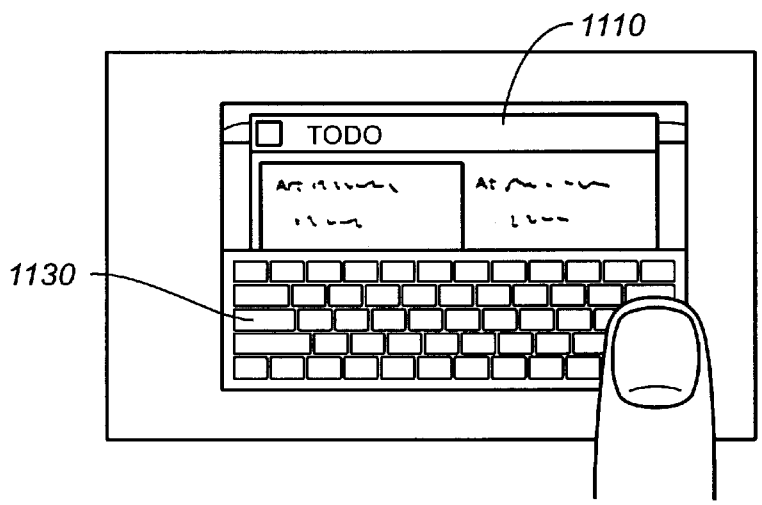
FIG._54B
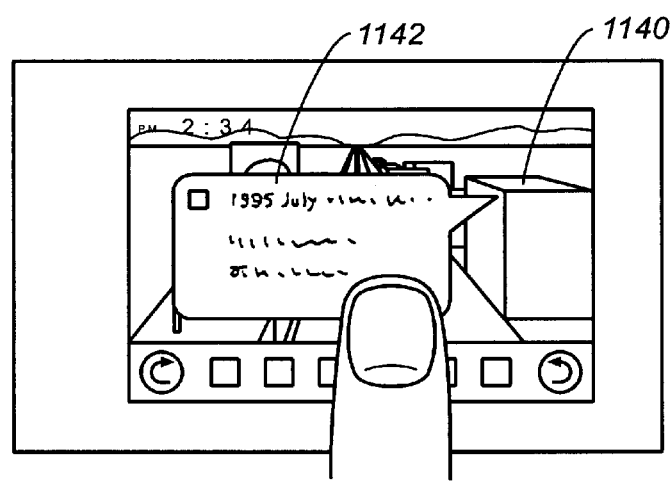
FIG._54C

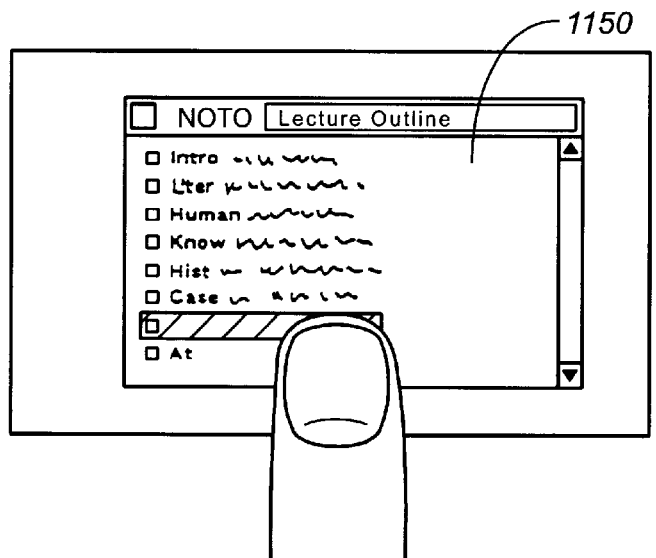
FIG._55A
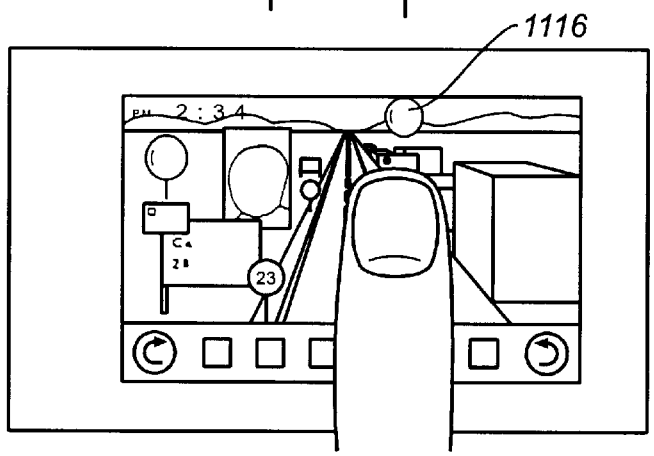
FIG._55B
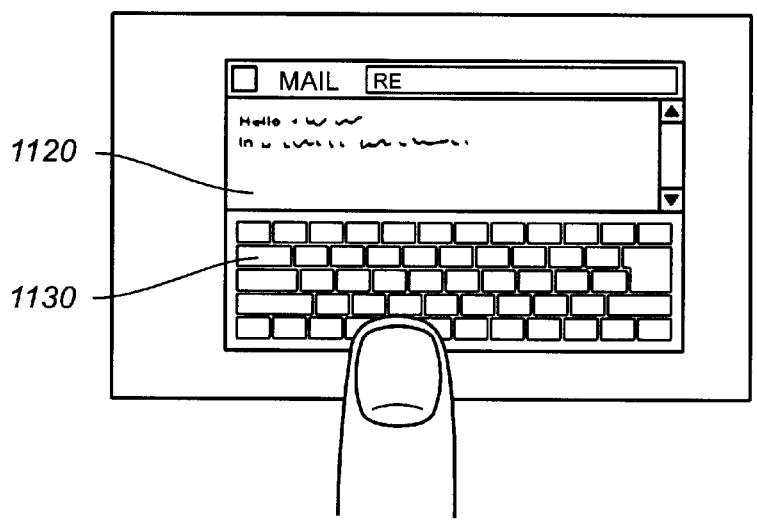
FIG._55C

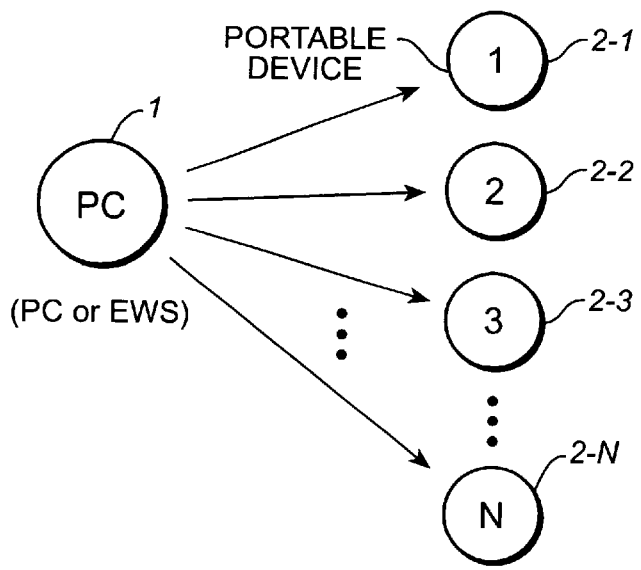
FIG._56A
CASE 1
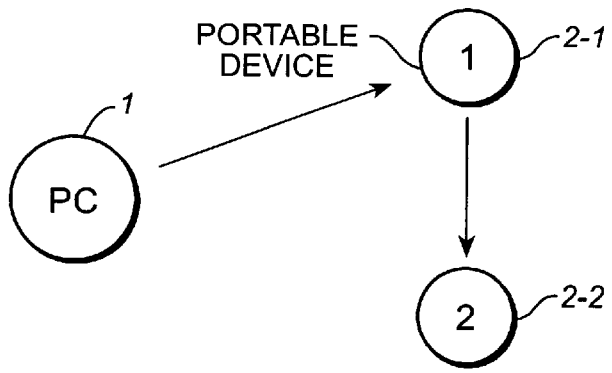
FIG._56B
CASE 2
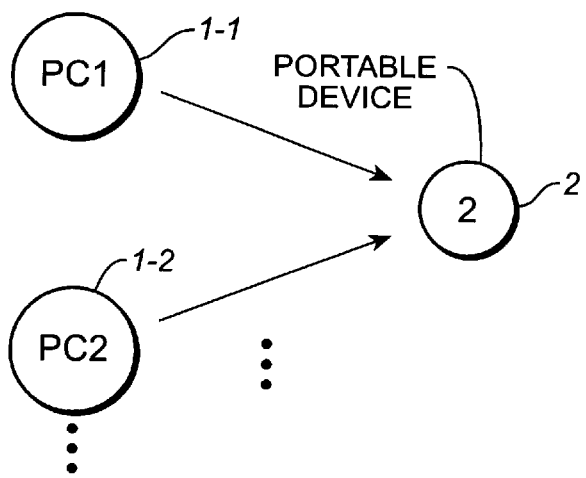
FIG._56C
CASE 3

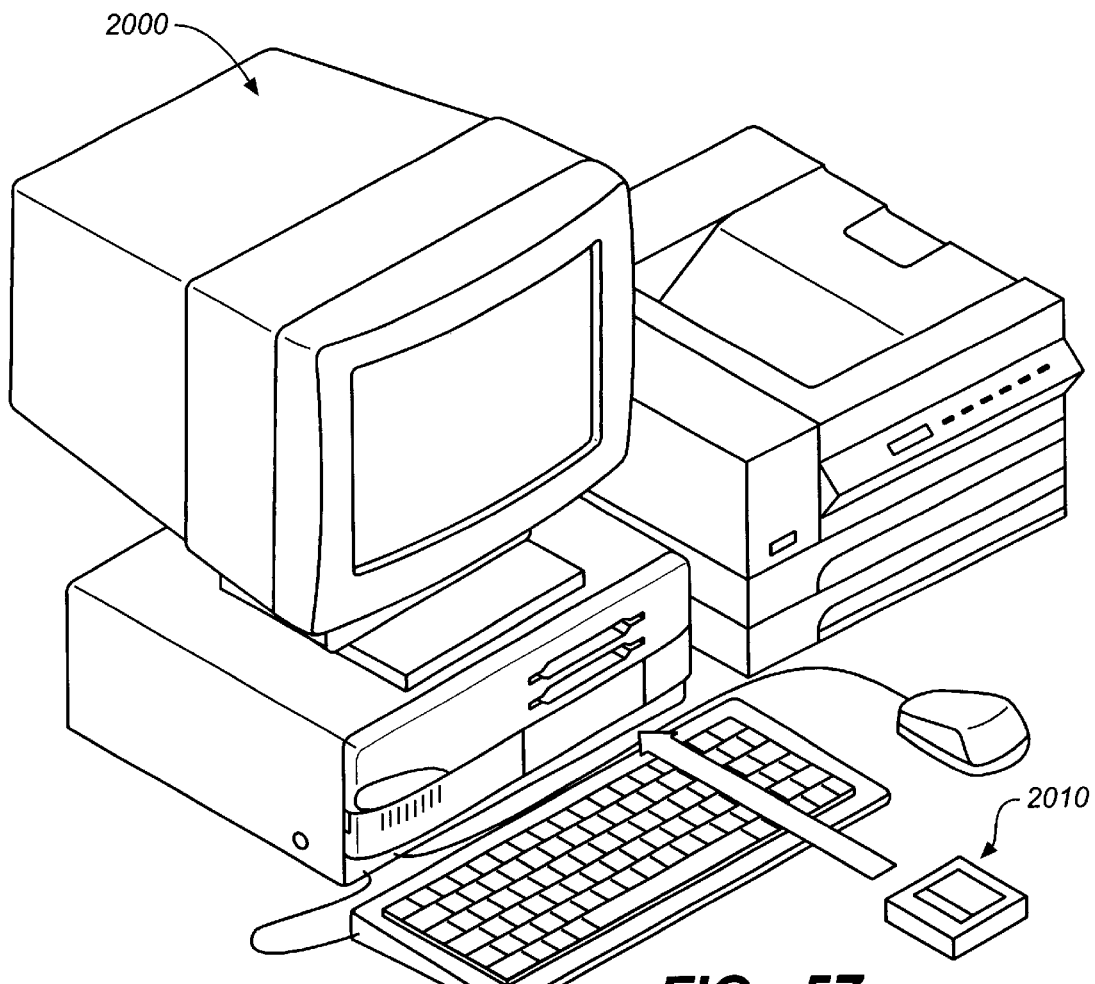
FIG._57
*(PRIOR ART)*

INFORMATION PROCESSING SYSTEM

BACKGROUND OF THE INVENTION

1. Field of the Invention

The present invention relates to an information processing system, and more particularly to an information processing system which synchronizes data between a host and terminal.

2. Description of the Related Art

In recent years, display devices and the like called PDAs (Personal Digital Assistance) which serve as easily-portable compact information processing devices, have come to be known in the field of portable devices. As shown in FIG. 57, a common usage configuration for information processing devices such as PDAs, personal computers (PC), palm-top devices, word processors, etc., is to transfer various types of data from an information processing device 2000 such as a desktop PC or the like which remains stationary at the home or office, to a portable terminal 2010 beforehand, following which the contents of the data in the portable terminal 2010 are used independently at another location, e.g., the contents are updated.

That is to say, the data held in the portable terminal and that in the information processing devices are updated asynchronously, thus necessitating an updating process for maintaining conformity of the data. Generally, portable terminals are connected to the information processing device set up in the home or office using one or more of various methods such as physical cable connection or wireless connection such as infra-red beam communication, and the updated data is re-transmitted from the portable terminal to the information processing device, thereby maintaining conformity (or synchronizing).

Also, regarding known art for a system which simplifies transfer of data between an information processing device and a portable device, Japanese Unexamined Patent Publication No. 5-110546 for example discloses a system wherein a gateway synchronizes differing protocols between a host computer and wireless portable terminal device, so that the user of the wireless portable terminal device can transfer data according to normal communication procedures without necessitating any particular consideration that the communication is that to a host computer.

With the above-described known method for synchronizing updated data by re-transferring the information updated at the portable terminal device to the information processing device such as a PC or the like, there are problems since each time the user sends updated data to the information processing device such as a PC, cable connections need to be made, application software must be started, certain procedures must be followed, and so forth, making the operation troublesome, and further, operation mistakes may occur, such as incorrectly storing the updated data, or forgetting to transfer the data at all.

Also, the above data transfer system is a way of simplifying data transfer by synchronizing the communication protocols between the host computer and portable terminal device, and there is no difference with the earlier art from the perspective that the operator must perform the operation of transferring and updating data from the portable terminal device. Accordingly, this arrangement has not by any means solved the above-described problems.

Now, the display screen of a PDA is smaller than that of a normal PC, so the display thereupon is also smaller, and accordingly, there has been a problem in that it is difficult for the user to understand what is being displayed and the function thereof. Also, font display has been problematic in that the characters are difficult to read and the display screen is not easily understood by the user. For example, displayed Japanese characters are easily read at a font size of 24 dots by 24 dots or larger, but display screen size restrictions have made such font sizes implausible, making Kanji and the like unreadable.

Also, with known devices such as disclosed in Japanese Unexamined Patent Publication No. 1-173139, Japanese Unexamined Patent Publication No. 4-168482, etc., explanatory displays for indicating the detailed meaning of icons and the like which serve as objects in the metaphor environment are provided so that the user does not have to bear such a load of remembering the meaning of each. However, with such a device, information such as keywords and symbols are attached to the icons, and even though this might be effective for users who can understand the attached symbols and keywords, it is a burden for users without any such prior knowledge to remember new symbols and keywords, lowering the operation efficiency. Moreover, the characters are difficult to read, so this arrangement is not practical for PDAs.

Such devices are problematic in that it is a burden for users without prior knowledge to remember new symbols and keywords, and the reading of the attached explanations itself is a troublesome process, so the efficiency of operation decreases.

Also, an arrangement may be conceived wherein icons such as described in Japanese Unexamined Patent Publication No. 5-28157 are displayed, but in order for the user to select the desired function from the plurality of icons displayed in such a general icon display form, the user has no choice but to judge where the desired function is from the design and function name of each of the icons. Also, experienced users who have remembered which functions correspond to which icons and where the desired icon is located, displaying a great number of icons in a matrix layout allows for speedy selection of the desired icon, but a certain amount of time is needed for novices to understand the functions themselves which correspond to the icons, and time to remember where on the screen each icon corresponding with each function is located. Accordingly, it is easy for novices to make mistakes and select the wrong icon.

Particularly, the small display size of PDAs in general makes it difficult to understand which function starts up by selecting an icon, and further, each icon is small and difficult to select.

SUMMARY OF THE INVENTION

The present invention has been made to solve the above-described problems of the known art, and accordingly, it is an object of the present invention to provide an information processing system wherein mutual data is maintained the same between a information processing device and a portable information processing device, and furthermore wherein a menu screen (user interface) corresponding with the display screen of each is formed, such that the user can easily understand the functions correlated with the icons and so forth, thereby improving operability.

To this end, according to a first aspect of the present invention, an information processing system comprises: a first information processing device which performs display processing of at least one piece of first icon information which is displayed on a menu screen; and a second information processing device which performs display processing of at least one piece of second icon information which is displayed on a menu screen, the second icon information having the same concept as the first icon information; and wherein the first information processing device comprises: a first storage unit for storing the first icon information and display data corresponding to the first icon information; a first display unit for displaying at least the first icon information; a first control unit for performing display control of the first icon information upon the first display unit; and a first communication unit for performing transmission and reception of the display data between the first information processing device and the second information processing device; and wherein the second information processing device comprises: a second storage unit for storing the display data and second icon information corresponding to the display data; a second display unit for displaying the second icon information which is formed smaller than at least the first display unit; a second control unit for performing display control of the second icon information upon the second display unit; and a second communication unit for performing transmission and reception of the display data between the first information processing device and the second information processing device, and performing data matching between the pieces of display data each stored in the first and second storage units; and wherein the capacity of the second icon information is formed smaller than the capacity of the first icon information.

Here, the expression "the same 'concept'" means that the arrangement is such that the display forms of the first icon information and the second icon information are different, but the idea and the impression projected to the user is the same.

According to the first aspect, the display data of a first information processing device with a large display screen and a second information processing device with a small display screen can be mutually conformed in real time as one (data synchronizing).

Here, the second display unit of the second information processing device is formed such that the size thereof is small. Accordingly, simplified display is carried out by means of making the information capacity of the second icon information to be displayed on the second display unit to be smaller than the information capacity of the first icon information, and the user can recognize the icon information without any problem on the second information processing device with a smaller display screen, as with the first display screen of the first information processing device.

Accordingly, a menu screen (user interface) corresponding with the display screen of each is formed, such that the user can easily understand the functions correlated with the icons and so forth, while mutual data is maintained the same, thereby improving operability.

According to a second aspect of the present invention, the information processing system according to the first aspect of the present invention is configured such that the first background display of the menu screen of the first display unit and the second background display of the menu screen of the second display unit are displayed according to common background attributes.

In the second aspect of the present invention, the expression "common 'background attributes'" indicates that, e.g., the first background display and the second background display are the same. Accordingly, the user can recognize the type of display data from the background attributes of the menu screen, so operability improves regardless of size.

According to a third aspect of the present invention, the information processing system according to the first aspect of the present invention is constructed such that the first display unit has a plurality of first split display areas for multiple split display of the menu screen according to differing background attributes; the second display unit has a plurality of second split display areas for multiple split display of the menu screen according to differing background attributes; and the background attributes of the first split display area and the background attributes of the second split display area are displayed according to common background attributes.

According to this third aspect of the present invention, a plurality of first split display areas and a plurality of second split display areas are formed according to the same array, so the functions can be recognized simply by the positional relation of the split display areas on the smaller second display unit, as well.

The use can distinguish the attributes simply by the positional relation and display form of the split display areas of the background screen, so the problems of complex hierarchical structures such as with combinations of known application software are resolved, many non-experienced users can easily use the same device, and consequently, an information processing system which is extremely handy for the user can be provided.

According to a fourth aspect of the present invention, the information processing system according to the second aspect of the present invention is configured such that the first and second display units have a plurality of pieces of time information related to the plurality of pieces of the display data; the first control unit performs display control based on the time information so as to display the first icon information on the first display unit in accordance with a time axis, at least; the second control unit performs display control based on the time information so as to display the second icon information on the second display unit in accordance with a time axis, at least; and the time axis of the first background display and the time axis of the second background display differ in length.

According to this fourth aspect of the present invention, the time axis of the first background display and the time axis of the second background display differ in length, so time axes can be formed according to the display sizes of the first and second display units, thereby enabling forming density of the first and second icon information corresponding with the display screen, displayed on the menu screen.

According to a fifth aspect of the present invention, the information processing system according to the fourth aspect of the present invention is configured such that the first control unit performs display control so as to display the first icon information on the first display unit in accordance with N-time on the time axis; and the second control unit performs display control so as to display the second icon information on the second display unit in accordance with M-time (wherein M<N) on the time axis.

According to this fifth aspect of the present invention, by means of displaying the time axis for N-time on the first display unit and displaying the time axis for M-time on the smaller second display unit, the number of pieces of icon information is reduced particularly for display on the second information processing device, thereby avoiding a screen configuration in which the menu screen display is confusing because of the small display size of the second display unit.

According to a sixth aspect of the present invention, the information processing system according to the first aspect of the present invention is configured such that the second storage unit has a plurality of pieces of attribute information for identifying the types of the display data of a plurality of types with differing attributes; and the second control unit selects the second icon information each corresponding with the attributes of the display data of a plurality of types.

According to this sixth aspect of the present invention, multiple types of display data with differing attributes can be displayed on a menu screen as second icon information corresponding to the attributes, based on the attribute information. Thus, the user can distinguish the functions of the multiple pieces of second icon information at a glance, by observing on the menu screen the second icon information which has differing display forms according to the attributes.

According to a seventh aspect of the present invention, the information processing system according to the first aspect of the present invention is configured such that the second icon information is comprised of the first icon information compressed and transferred to the second storage unit.

According to this seventh aspect of the present invention, the display concepts are matched so that the icon information is displayed in a manner visually comprehensible to the user, and at the same time the second icon information is comprised of the first icon information that has been compressed, thereby reducing the amount of data stored in the second storage unit, consequently reducing memory capacity.

According to an eighth aspect of the present invention, the information processing system according to the first aspect of the present invention is configured such that the first information processing device comprises a first operating unit for performing operation input for changing the first icon information on the first display unit into a third icon information; and the first control unit changes the first icon information into the third icon information according to the operating unit at the first operating unit, and also performs transfer control of the third icon information to the second storage unit via the first and second communication units.

According to this eighth aspect of the present invention, first, in the event that the user does not like the display form of the first icon information displayed on the first display unit, third icon information is generated on the first display unit by means of operating input at the first operating unit, and the displayed icon information is switched. Then, by means of operation such as dragging this third icon information using the first operating unit, the third icon information is transferred to the second information processing unit and compressed, so as to be displayed as the second icon information. Accordingly, display of the second icon information at the second information processing device can be matched with that of the first information processing device, corresponding with changes made to the display form of the first icon information at the first information processing device, so both a common concept and a display form desired by the user can be realized, even without storing the second icon information in the second storage unit at the second information processing device.

According to a ninth aspect of the present invention, the information processing system according to the first aspect of the present invention is configured such that the first storage unit further comprises the second icon information; and the first control unit performs control such that a second display area for displaying the second icon information is superimposed on a first display area for displaying the first icon information, based on both the first icon information and the second icon information.

According to this ninth aspect of the present invention, the configuration of the menu screen on the second display screen of the second information processing device can be specified by the first information processing device. Also, user operability can be improved by facilitating ease of comparison of the mutual screen configurations.

According to a tenth aspect of the present invention, the information processing system according to the ninth aspect of the present invention, is such that the second display area is an area formed by extracting a portion of the display data displayed within the first display area and specifying as the second icon information.

According to this tenth aspect of the present invention, selection of the display form of the second icon information can be made at the first display unit, and the user can generate the desired second icon information to be used by the second information processing device.

According to an eleventh aspect of the present invention, the information processing system according to the first aspect of the present invention is configured such that the second information processing device comprises a second operating unit for performing operation input for changing the display of the second display unit; and the second control unit registers the display data to the second storing means anew, based on the operation input at the second operation unit, and performs display control of the second icon information anew upon the menu screen.

According to this eleventh aspect of the present invention, the number of displays of the second icon information increases in the event that display data is registered anew. Thus, the user can visually recognize the number of pieces of display data registered anew, so there is no need to display numerical values or the like as with known arrangements. Consequently, this is particularly advantageous in cases wherein the display screen is small and fonts are displayed at small sizes.

According to a twelfth aspect of the present invention, the information processing system according to the eleventh aspect of the present invention is configured such that the second information processing device further comprises: an audio input unit for inputting audio information; and an audio input control unit for input control of the audio information of the audio input unit, based on operating input of the second operating unit; wherein the second control unit performs display control of the second icon information upon a menu screen, based on the input control of audio information at the audio input control unit.

According to this twelfth aspect of the present invention, the number of displayed pieces of the second icon information increases in the case wherein audio information is registered, as well. Accordingly, the user can visually recognize the number of pieces of audio data registered anew, so there is no need to display numerical values or the like as with known arrangements. Again, this is particularly advantageous in cases wherein the display screen is small and fonts are displayed at small sizes.

According to a thirteenth aspect of the present invention, the information processing system according to the eleventh aspect of the present invention is configured such that the second information processing device comprises: an audio output unit for outputting audio information; and an audio output control unit for output control of the audio information of the audio output unit, based on operating input of the second operating unit; wherein the second control unit performs output control of audio information at the audio output control unit, and performs display control so as to erase the second icon information, based on the operating input at the second operating unit.

According to this thirteenth aspect of the present invention, the number of displayed pieces of the second icon information decreases in the case wherein audio information is deleted. Accordingly, the user can visually recognize the number of remaining pieces of audio data, so there is no need to display numerical values or the like as with known arrangements. Again, this is particularly advantageous in cases wherein the display screen is small and fonts are displayed at small sizes.

According to a fourteenth aspect of the present invention, the information processing system according to the first aspect of the present invention is configured such that the second control unit performs display control so that the unit time intervals on the time axis becomes variable.

According to this fourteenth aspect of the present invention, unit-time intervals on the time axis are variable, so that in the event that the intervals expand, the user can visually grasp the concentration of the second icon information at a local point in time, and in the event that the intervals narrow, the user can visually grasp the overall concentration of the second icon information.

According to a fifteenth aspect of the present invention, the information processing system according to the fourth aspect of the present invention is configured such that the second information processing device further comprises timing means for keeping the current time; and the second control unit performs sequential updating processing of the display screen based on the time information of the timing means, so that the time axis and the icon information move over the screen sequentially proceeding along the single axis, in accordance with elapsing of time.

According to this fifteenth aspect of the present invention, sequential updating is carried out according to the current time, so the newest items always are displayed as the second icon information on the time axis displayed on the second display unit.

According to a sixteenth aspect of the present invention, the information processing system according to the first aspect of the present invention is configured such that the display data comprises e-mail information transmitted and received via the second control unit, and reception time information relating to the time at which this e-mail information has been received; and the second control unit performs display processing of the second icon information in the order of reception, based on the reception time information.

According to this sixteenth aspect of the present invention, e-mail is displayed on the menu screen in the order in which it is received, so the user can at a glance visually recognize the number of e-mails which have arrived and how new or old they are. Also, such a menu screen allows for viewing without a complex hierarchical structure, so complicated operating processes are done away with, and the load on the user is lightened.

According to a seventeenth aspect of the present invention, the information processing system according to the first aspect of the present invention is configured such that the display data comprises input/output information wherein a schedule has been input, and specified time information which the user has specified as a scheduled execution time of the input/output information; and the second control unit performs display processing of the second icon information on the first background display area in the order of creation, based on the specified time information.

According to this seventeenth aspect of the present invention, input information is displayed on the menu screen in the order in which it is created, so the user can at a glance visually recognize the number of pieces of input information and how new or old they are. Also, such a menu screen allows for viewing without a complex hierarchical structure, so complicated operating processes are done away with, and the load on the user is lightened.

According to an eighteenth aspect of the present invention, the information processing system according to the third aspect of the present invention is configured such that the second split display area comprises: a first display area for arrayed display of the second icon information corresponding with communication information; a second display area for arrayed display of the second icon information following at least a time axis; and a third display area for arrayed display of the second icon information, for alphabetically searching the display data of a plurality of types received at the first and second display areas; wherein the second control unit performs display control based on the first through third display areas.

According to this eighteenth aspect of the present invention, at the second split display area, the icon information corresponding to the multiple types of information are classified and displayed according to attributes (communication, schedule, database search) on the first through third display areas (background screen). Accordingly, the user can visually recognize the functions of the icon information (applications) within the areas simply by looking at the classification and background screen of the first through third display areas. Thus, user operability is improved as compared to known menu screens wherein icon information is simply arrayed or wherein icon information and character information is combined and displayed. Particularly, in the event that the display screen is small, this arrangement is advantageous, since there is no need to display character information in order to identify the icon information.

According to an nineteenth aspect of the present invention, the information processing system according to the first aspect of the present invention is configured such that the second information processing device is a portable information processing device including an arm-worn portion which is worn on the arm of the user.

According to this nineteenth aspect of the present invention, forming such an arm-worn portion allows for application to an extremely compact information device, such as a watch or the like.

BRIEF DESCRIPTION OF THE DRAWINGS

FIG. 1 is a schematic drawing of a display screen illustrating an example of an embodiment of a display device according to the present invention;

FIG. 2 is a schematic drawing illustrating an example of lower-tier menu screen (window) displayed when an icon in the display screen shown in FIG. 1 is clicked;

FIG. 3 is a schematic drawing illustrating an example of lower-tier menu screen (window) displayed when another icon in the display screen shown in FIG. 1 is clicked;

FIG. 4 is a perspective view illustrating an example of the portable information processing device and a personal computer in an arrangement wherein a network is formed of the portable information processing device and a personal computer for synchronizing of data;

FIG. 5 is a block diagram illustrating the hardware configuration of each of the portable information processing device and personal computer shown in FIG. 4;

FIG. 6 is a frontal view illustrating the portable information processing device according to the present invention;

FIG. 7 is a schematic diagram illustrating the main screen displayed at the display unit of the portable information processing device shown in FIG. 6;

FIGS. 8A through 8F are each schematic drawings illustrating examples of lower-tier menu screens displayed on the lower-tier menu of the main screen shown in FIG. 7;

FIGS. 9A through 9E are each schematic drawings illustrating examples of screens displayed on the display unit of the portable information processing device shown in FIG. 6;

FIG. 10 is a schematic diagram illustrating the upper menu group, lower menu group, and setting display screens which are displayed step-wise following the control system of the display device according to the present example;

FIG. 11 is a function block diagram illustrating the software configuration of the portable information processing device according to the present invention;

FIG. 12 is another function block diagram illustrating the software configuration of the portable information processing device according to the present invention;

FIGS. 13, 13A and 13B form a function block diagram illustrating the details of the function block diagram shown in FIG. 12;

FIG. 14 is a schematic diagram illustrating the memory map representing the hierarchy of information stored in the storage unit of the portable information processing device according to the present invention;

FIG. 15 is a schematic diagram illustrating electromagnetic signals of data sent and received between the communication unit and other internal devices;

FIG. 16A is an explanatory diagram illustrating an example of a table which defines the relation between character data stored in the storage unit of the portable information processing device, and function programs related to the characters;

FIG. 16B is an explanatory diagram illustrating an example of a table which illustrates character data stored in the storage unit of the portable information processing device, and array position on the screen and menu format;

FIG. 17A is an explanatory diagram illustrating an example of background screen character data stored in the storage unit of the portable information processing device;

FIG. 17B is an explanatory diagram illustrating an example of icon character data stored in the storage unit of the portable information processing device;

FIG. 18 is a flowchart illustrating control procedures executed by the control system;

FIG. 19 is a flowchart describing the process A shown in the flowchart in FIG. 18 in further detail;

FIG. 20A is a flowchart describing Step 3 in the flowchart in FIG. 18 in further detail;

FIG. 20B is another flowchart describing Step 3 in the flowchart in FIG. 18 in further detail;

FIG. 21A is a flowchart describing Steps 32 and 42 in the flowcharts in FIGS. 20A and 20B in further detail;

FIG. 21B is a flowchart describing an example of executing Steps 32 and 42 in the flowcharts in FIGS. 20A and 20B in detail;

FIG. 21C is another flowchart describing an example of executing Steps 32 and 42 in the flowcharts in FIGS. 20A and 20B in detail;

FIG. 22 is a flowchart illustrating the operating procedures executed by the operating system;

FIG. 23A is a schematic diagram of a display screen illustrating an example of another embodiment of the display device according to the present invention;

FIG. 23B is a schematic diagram of a display screen illustrating the main screen of the display device shown in FIG. 23A.

FIG. 24 is a schematic diagram illustrating the upper menu group, lower menu group, and setting display screens which are displayed step-wise following the control system of the display device shown in FIGS. 23A and 23B;

FIGS. 25A through 25C are schematic diagrams illustrating examples of screens displayed on the display unit of the display device shown in FIGS. 23A and 23B;

FIGS. 26A and 26B are schematic diagrams illustrating examples of screens displayed on the display unit of the display device shown in FIGS. 23A and 23B;

FIGS. 27A through 27C are schematic diagrams illustrating examples of screens displayed on the display unit of the display device shown in FIGS. 23A and 23B;

FIGS. 28A through 28C are schematic diagrams illustrating examples of screens displayed on the display unit of the display device shown in FIGS. 23A and 23B;

FIGS. 29A through 29C are schematic diagrams illustrating examples of screens displayed on the display unit of the display device shown in FIGS. 23A and 23B;

FIGS. 30A through 30C are schematic diagrams illustrating examples of screens displayed on the display unit of the display device shown in FIGS. 23A and 23B;

FIG. 31 is a schematic diagram illustrating an example of a screen displayed on the display unit of the display device shown in FIGS. 23A and 23B;

FIG. 32A is a flowchart illustrating the operating procedures executed by the operating system of the display device shown in FIGS. 23A and 23B;

FIG. 32B is a flowchart describing Step 101 in the flowchart in FIG. 32A in further detail;

FIG. 32C is a flowchart describing Step 104 in the flowchart in FIG. 32A in further detail;

FIG. 33A is a schematic diagram of a display screen illustrating an example of another embodiment of the display device according to the present embodiment;

FIG. 33B is a schematic diagram of a display screen illustrating the main screen of the display device shown in FIG. 33A;

FIG. 34 is a schematic diagram illustrating the upper menu group, lower menu group, and setting display screens which are displayed step-wise following the control system of the display device shown in FIGS. 33A and 33B;

FIG. 35 is a schematic diagram illustrating an example of screens displayed on the display unit of the display device shown in FIGS. 33A and 33B;

FIGS. 36A through 36D are schematic diagrams illustrating examples of screens displayed on the display unit of the display device shown in FIGS. 33A and 33B;

FIGS. 37A through 37D are schematic diagrams illustrating examples of screens displayed on the display unit of the display device shown in FIGS. 33A and 33B;

FIG. 38 is a schematic diagram illustrating an example of a screen displayed on the display unit of the display device shown in FIGS. 33A and 33B;

FIGS. 39A and 39B are schematic diagrams illustrating examples of screens displayed on the display unit of the display device shown in FIGS. 33A and 33B;

FIGS. 40A through 40C are schematic diagrams illustrating examples of screens displayed on the display unit of the display device shown in FIGS. 33A and 33B;

FIGS. 41A and 41B are schematic diagrams illustrating examples of screens displayed on the display unit of the display device shown in FIGS. 33A and 33B;

FIGS. 42A through 42C are schematic diagrams illustrating examples of screens displayed on the display unit of the display device shown in FIGS. 33A and 33B;

FIG. 43A is a flowchart illustrating the operating procedures executed by the operating system of the display device shown in FIGS. 33A and 33B;

FIG. 43B is a flowchart describing Step 131 in the flowchart in FIG. 43A in further detail;

FIG. 43C is a flowchart describing Step 134 in the flowchart in FIG. 43A in further detail;

FIG. 44 is a schematic diagram of a display screen illustrating an example of another embodiment of the display device according to the present embodiment;

FIG. 45 is a schematic diagram illustrating the upper menu group, lower menu group, and setting display screens which are displayed step-wise following the control system of the display device shown in FIG. 44;

FIGS. 46A and 46B are schematic diagrams illustrating examples of screens displayed on the display unit of the display device shown in FIG. 44;

FIGS. 47A and 47B are schematic diagrams illustrating examples of screens displayed on the display unit of the display device shown in FIG. 44;

FIGS. 48A through 48F are schematic diagrams illustrating examples of screens displayed on the display unit of the display device shown in FIG. 44;

FIGS. 49A through 49F are schematic diagrams illustrating examples of screens displayed on the display unit of the display device shown in FIG. 44;

FIGS. 50A through 50F are schematic diagrams illustrating examples of screens displayed on the display unit of the display device shown in FIG. 44;

FIGS. 51A through 51F are schematic diagrams illustrating examples of screens displayed on the display unit of the display device shown in FIG. 44;

FIG. 52A through 52C are schematic diagrams illustrating an example of a display screen illustrating an example of another embodiment according to the display device according to the present invention;

FIGS. 53A through 53D are schematic diagrams illustrating examples of screens displayed on the display unit of the display device shown in FIG. 52A;

FIGS. 54A through 54C are schematic diagrams illustrating examples of screens displayed on the display unit of the display device shown in FIG. 52A;

FIGS. 55A through 55C are schematic diagrams illustrating examples of screens displayed on the display unit of the display device shown in FIG. 52A;

FIGS. 56A through 56C are schematic diagrams illustrating an examples of a network formed of a portable information processing device and a personal computer for synchronizing of data; and FIG. 57 is a perspective view illustrating an example of synchronizing data between a portable information processing device and a personal computer according to known art.

DESCRIPTION OF THE PREFERRED EMBODIMENTS

First Embodiment (Overall System Configuration)

FIGS. 4 and 5 illustrate a preferred example of a system to which the present invention has been applied. The system is this embodiment consists of one or more user terminals serving as the first information processing device, a wrist-type portable device 2, and a personal computer (hereafter referred to as "PC") PC 1 serving as a host computer which provides certain services as a second information processing device. A network is formed such that communication can be held between this PC 1 and portable device 2. The PC 1 is installed at the home or office, and the portable device 2 is worn on the arm or the like by the user.

The PC 1 is comprised of an advanced computer, which has therein a timer unit 11 for measuring time, a storage unit 12 for storing data of various types, a display unit 13 for displaying data, an operating unit 14 for operating various and multiple types of information displayed on the display unit 13, communication means 15 for performing transmission and reception of information with another information processing device such as the portable device 2, an audio output unit 16 for outputting audio information, an audio input unit 17 for inputting audio information, and a CPU for governing each of the parts, as shown in FIG. 5.

Stored within the storage unit 12 are dedicated software for operating the PC 1 itself, various programs such as dedicated application software for generating screens which are characteristic of the present invention, a Web browser for downloading to the portable device 2, and other data such as protocols and the like.

Particularly, it is preferable that the above application software for generating screens which are characteristic of the present invention be formed separately and independently from the storage area of the PC 1 proper, by means of a dedicated PC card or the like.

(Data Synchronizing)

Though the portable device 2 is to be used independently, the system is configured such that the portable device 2 can be synchronized with the PC 1 and thus used.

Various means can be conceived for this data synchronizing. For example, data updating means, not shown in the Figures, may be formed, whereby the data display held in the portable device 2 and the PC 1 are compared, and the data updating means instructs updating of data and also synchronizing thereof. In this case, it is preferable that the data updating means be provided within the communication means 15 at the PC 1 and the communication means 25 at the portable device 2, as shown in the block diagram in FIG. 5.

Also, another method for data synchronizing is carried out by the data stored in the storage unit 12 of the PC 1 being downloaded to the storage unit 22 of the portable device 2 in response to a request from the portable device 2, at the time of the portable device 2 system being booted by turning the power switch thereof on. In the event that there is a need to change the data, the data within the storage unit 12 of the PC 1 is re-written. Subsequently, the start-up of the portable device 2 sets the portable device 2 in the same state based on the changed data.

Thus, when basic data input or change is made at either device of the PC 1 or the portable device 2, the portable device 2 or PC 1 is updated automatically. In the present embodiment, even in the case that the devices 1 and 2 are at remote locations, the user can synchronize both devices 1 and 2 even without taking the distance into consideration.

Further, in the case of editing the contents of the display unit 23 of the portable device 2 from the display unit 13 of the PC 1, an image of the portable device 2 is displayed at a portion of the display unit 13 of the PC 1 (FIG. 52). Accordingly, information at the PC 1 side can be cut and pasted within this window, thereby reading the desired image to the portable device 2. Details of this will be described in conjunction with the fifth embodiment. This is particularly advantageous in cases where a PC card is to be inserted into the PC 1, since the display can be observed.

With the system according to the present embodiment, the size of the display unit 13 at the PC 1 is large, and the size of the display unit 23 at the portable device 2 is small. Accordingly, simple synchronizing alone would only result in the image displayed at the PC 1 to be simply compressed at displayed on the display device at the portable device 2. Therefore, in order to allow the display unit 13 and the display unit 23 to have the same image such that the user can take the two devices to be the same in a natural manner, the following arrangement has been devised.

That is, by means of forming a character pattern for the portable device 2 which is different to the character pattern formed at the PC 1, the user can easily understand the icons displayed at the portable device, even though they follow the same image.

(Hardware Configuration of the Portable Device)

FIG. 4 and FIG. 6 schematically show the exterior of the portable device 2. The portable device 2 according to the present embodiment has been formed compact and lightweight, in order to allow for wearing thereof on the arm or the like of the user. Specifically, the portable device 2 is comprised of an arm-worn portion 20 (FIG. 4) which is worn on the arm of the user, a display unit 23 formed of an LCD display or the like for example which is connected to this arm-worn portion 20, and an operation unit 24 which is formed on the four sides of the display unit 23 for various operations of the display screen.

The operating unit 24 has a slider 24A serving as a first operating button, a recording button 24B serving as a second recording button, and a TrackPoint 24C serving as a third operating button.

Specifically, as shown in FIG. 6, provided to the right side of the display unit 23 is a slider 24A serving as mode selecting means sliding in both the A and B directions; formed to the left side of the display unit 23 is a recording button 24B serving as a second operating button, and a TrackPoint (TrackPoint is a Registered Trademark of IBM Corporation) 24C is provided to the lower side of the display unit 23 as a cursor-operating key for moving the cursor in the display screen vertically and horizontally by means of moving the TrackPoint in the directions of the arrows C, D, E, and F. By sliding the slider 24A in the directions of the arrows A or B, one of the following modes is selected: the communication display mode (which is the notify mode+ memo mode); the schedule display mode which is the calendar mode; and the database mode which is the directory mode.

Further, as shown in FIG. 5, the portable device 2 has a CPU 28 which governs the control of the portable device 2, and the bus line thereof is connected to the operating unit 24 and the display unit 23. Incidentally, the functions of the display driving unit shown in FIGS. 12 and 13 are realized by the display driving functions of the CPU 28 and by means of a display interface within the display unit 23 not shown in the Figures.

The storage unit 22 is connected to the bus line of the CPU 28. This storage unit 22 has a control unit 22A in which management programs are stored, and an actual data unit 22B, as shown in FIG. 14, for example. The data within the actual data unit 22B in the storage unit 22 is preferably stored in a ROM, RAM, etc. In this case, the ROM contains data memory for storing the icon character data, background character (background image) data for the menu screen, font data, array positioning data defining the array position of the icons on the background image, etc. Also, the ROM contains program memory storing programs such as function programs defining the functions of the present device, boot program for driving the CPU 28 and starting up the portable device 2 when the power thereof is turned on, predetermined display programs which are set at the later-described first through fourth display setting units. The boot program accesses the storage unit 12 of the PC 1 when the power of the portable device 2 is turned on, reads the Web browser, communication protocols, and other data and the like, which is then downloaded to the RAM.

The RAM holds input information which has been input in accordance with the various setting screens. Accordingly, the functions of the first through fourth display setting units are realized by the display setting functions of the CPU 28, the storage unit 21, and by means of a memory interface provided within the storage unit 21 not shown in the Figures.

Further connected to the bus line of the CPU 28 are a timer 21, audio input unit 27, and an audio output unit 26 having a microphone which is not shown in the Figures, etc.

Also, as shown in FIG. 5 in the block diagram, communication means 25 for communicating with the PC 1 is connected to the bus line of the CPU 28. The communication means 25 contains an infrared communication unit (IRDA) 25D, a wireless communication unit 25C, a modem 25B connected to these and serving the functions of a modem, a telephone device 25E, and a communication unit 25A which includes this telephone device 25E itself as a serial interface and is connected to the aforementioned modem 25B. This communication unit 25a is connected to the CPU 18. Also, the infrared communication unit (IRDA) 25D also has an infra-red ray transmitting unit (port) therein. The modem 25b is comprised as a soft modem whereby the CPU 28 receives bit strings. The modem 25B contains an infra-red ray interface, and processing of the modem 25B and communication unit 25a is carried out by the CPU 28. Accordingly, the portable device 2 is capable of sending and receiving e-mail.

Also connected to the CPU 28 is notifying means 29B for notifying the user of information. Various means can be conceived to serve as the notifying means 29B, such as, e.g., vibrating means to stimulate the user in vibrations and the like in steps, smell generating means for generating smells in steps, sound changing means for changing the sound of an alarm in steps, light emitting means for emitting light that can be adjusted in steps, electric discharging means for applying electrical shocks to the user that can be adjusted in steps, and so forth. Further connected to the CPU 28 is battery capacity detecting means 29A for detecting the battery capacity of the electric source providing means serving as a battery.

Also, detecting means not shown on the Figures for detecting the attitude angle of the display unit as to a horizontal plane may be connected, as well. In this case, the CPU serves to turn the electrical power on in the event that the detected angle is within a certain attitude angle range, and to turn the electrical power off in the event that the detected angle is not within the certain attitude angle range. Accordingly, the power can be turned on or off by tilting the display device itself to a certain angle, so that the power is turned off when the user is not looking at the display screen of the display device, thereby eliminating unnecessary display operations and reducing electrical power consumption.

(Display Screen at the PC)

The present invention is characterized by the icons which of various functions which are displayed on the display screen being pasted and displayed on a single time axis. Also, the display portion of the portable device is smaller than the display portion of the PC, so the maximum time axis is also smaller. Accordingly, the minimal number of icons can be displayed.

The display screen displayed on the display unit 13 can be generally classified into three tiers: the communication display area 30.40, schedule display area 50 (action), and database display area 60. Thus, a menu screen of a first background display by splitting into a plurality of first split display areas based on differing background attributes. Further, the communication display area 30.40 can be classified into an area notifying area 30 for moving to a lower tier notify mode when there has been information notification due to reception of e-mail or the like, and a memo area 40 for moving to a lower tier memo mode for viewing the contents of memos and the like. The schedule display area 50 is an area which servers as a schedule display mode for displaying the schedule and so forth of the user, and a calendar mode. The database display area 60 is an area for opening a lower tier directory mode for classifying lists and address books of senders of the aforementioned e-mail, and a database display mode.

In this case, a "sky" metaphor is displayed as the background screen in the communication display area 30, a "ground" metaphor is displayed as the background screen in the schedule display area 50, and an "underground" metaphor is displayed as the background screen in the database display area 60.

In the communication display area 30.40, along an "electric power line" metaphor are displayed carrier pigeon icons 31, birdhouse icons 32, flower icons 41, and flower-vase icons 42, each of various forms and colors.

The carrier pigeon icon 31 is displayed as a metaphor to represent e-mail, and the contents of e-mail can be viewed by clicking for example on the icon by means of operation performed from the operating unit 24. Opening the e-mail brings up a lower tier menu screen 34 such as shown in FIG. 2. This menu screen 34 can be viewed by clicking the "Recognize" tab 33b which is the lower order pull-down menu of the "Synfo" tab 33a shown in FIG. 2. Incidentally, the other "Synchronize" tab is used for synchronizing data.

Also, the carrier pigeon icons 31 are arrayed along the electric power line in the order in which the e-mails were received, as a time system following a time axis. Further, the forms and colors of the carrier pigeon icons 31 denote particular functions appropriated thereto. For example, a black carrier pigeon icon 31D indicates that the contents of the e-mail are information of urgent nature, and a white carrier pigeon icon 31C indicates that the contents of the e-mail are information of important nature.

The birdhouse icon 32 has the functions of classifying and storing the viewed e-mail according to the contents thereof, so multiple pieces of e-mail are stored in each birdhouse icon 32. In the present example, multiple pieces of e-mail can be tidied and managed by classifying the e-mail into a "Work" birdhouse icon 32A and a "Personal" birdhouse icon 32B. Also, the arrangement may be such that in the event that the number of pieces of e-mail received exceeds a certain number, i.e., in the event that the number of birdhouse icons 32 exceeds a certain number, the e-mail is stored in the birdhouse icon 32.

The flower icon 41 has functions for storing information relating to memos input by hand using a pen or the like, and clicking on the flower icon 41 displays a Post-It tab 43 on which a memo has been written on the display screen. This Post-It tab 43 can be freely changed to any position on any area on the display screen, by means of dragging using the operating unit 24, or like operation. Accordingly, in the event that the contents of the memo relate to a plan made for a certain time, the Post-It tab 43 can be pasted on the time axis in the schedule display area as desired, or in the event that the contents of the memo are unrelated to time, such as a telephone number or the like, the Post-It tab 43 can be directly pasted into the sky for example on the display screen. Clicking the Post-It tab 43 once more returns it to the original flower icon 41. Handwritten memos in the Post-It tabs 43 can be made by memo input in the memo window 35 shown in FIG. 3 serving as a "Post-It creating menu". Then the Post-It tab 43 should be saved by executing "Save Post-It information", and pasted to the desired position by dragging.

Also, the flower-vase icons 42 are classified by function according to the contents written in the memos, so that one flower-vase icon 42 stores information relating to multiple flower icons, i.e., multiple memos. In the present embodiment, the flower-vase icon 42 consists of a "New" flower-vase icon 42A which stores a plurality of memos containing information that has been input relatively recently, a "To-do-list" flower-vase icon 42B which stores a plurality of memos containing items which need to be carried out in the future, and an "Urgent" flower-vase icon 42C which stores a plurality of memos containing information that is urgent.

Further, the number of flowers in the flower-vase icon 42 indicates the number of memos. Three types of characters are prepared for such a display, and the display is divided into representations of one, two, and three or more, so that in the event that three or more memos are stored therein, an icon for "three flowers" is displayed on the display unit 23 even if there are actually ten memos there. This permits reducing the number of character patterns to a minimum, and secures memory capacity, thereby facilitating high-speed displaying.

In the schedule display area 50, a time axis is overlaid and displayed following one direction of the display screen, and a schedule list 51 is displayed for each time corresponding thereto. Further, a Post-It tab 43 is pasted straddling the schedule display area 50 and the communication display area 30.

Provided in the database display area 60 are the input tabs to the databases, i.e., tabs for "Clients" 61, "Vendors" 62, and "Personal" 63; clicking-on any of these allows the user to pull down to a lower menu.

(Display Screen at the Portable Device)

FIG. 7 shows an example of the display screen on the display unit 23 of the portable device 2. As shown in FIG. 6, with the present embodiment, the time and date is displayed on the display unit 23 on a background screen with the same three metaphors of sky, ground, and underground, that are used with the PC 1.

Operating the slider 24A brings up the main screen shown in FIG. 7. This main screen is split into three areas (communication area 70.80, schedule display area 90, database display area 100; these shown in FIG. 7) which are of the same attributes as the three areas (communication area 30.40, schedule display area 50, database display area 60 shown in FIG. 1) displayed on the display screen of the PC 1. Zooming in on one of these three areas changes the mode to that of that area.

With the present embodiment, a metaphor of a natural view is used for these metaphors. Specifically, the upper tier of the display unit 23 is the communication display area 70.80 which displays information sent from the PC 1 or information sent from other information devices via the PC 1. The background is a sky-like screen, since the sky is associated with images of suddenly-changing weather, here representing information flying in from external sources. This communication display area 70.80 can be classified into an area notifying area 70 for moving to a lower tier notify mode when there has been information notification due to reception of e-mail or the like, and a memo area 80 for moving to a lower tier memo mode for viewing the contents of memos and the like.

The middle tier on the display unit 23 is a schedule display area 90 which servers as a schedule display mode for displaying the schedule and so forth of the user, and a calendar mode. The background is a ground-like screen, since the ground is associated with time and people moving over it.

The bottom tier on the display unit 23 is a database display area 100 for opening a lower tier directory mode for classifying lists and address books of senders of the aforementioned e-mail, and a database display mode. The background is an underground-like screen, since the underground is associated with stability. The menu screen is thus configured of a second background display split into a plurality of second split display areas, according to the differing attributes.

Of these, the screen which is being used or is going to be activated displayed in an enlarged manner, and the area which is being used is highlighted, while other areas are set on low contrast.

Further, the display unit 23 has a plurality of icons displayed as animation characters (metaphors) which match the functions of each of the programs with the background, as shown in FIGS. 8A and 8C, as with the display screen of the PC 1 shown in FIG. 1. For example, the carrier pigeon icon 73A displayed on the sky background as shown in FIG. 8A represents e-mail, the flower icons 81A, 81B, 81C as shown in FIG. 8C represent voice memos and handler memos, and the butterfly 110 as shown in FIG. 9C serves as the cursor. In this manner, the icons, 73A, 81A, 81B, 82, etc., have the same attributes as the icons displayed on the display screen at the PC 1.

Now, while the PC 1 has high-resolution bit-mat data for the characters for the icons and also has character information, but the portable device 2 has relatively lower resolution bit-map data for the characters for the icons, i.e., the characters have been simplified as compared to those displayed on the PC, and further, character information is not displayed. Such an arrangement is preferable from the perspective of miniaturization as well, since the icon characters can be clearly displayed even in the event that the display screen of the portable device 2 is very small like that of a wristwatch. Further, less bit-map data is necessary for the character data, so the memory capacity provided to the portable device 2 can be reduced, or, the memory usage area in the low order address portion other than the control and actual data portion of the high order address portion within the storage area 23 can be expanded to store other information or increasing processing speed.

In the event that an icon has a function appropriated thereto, an animal character corresponding thereto, i.e., the carrier pigeon 73A character is displayed. Thus, the user can instantly judge the functions appropriated to the icons. Incidentally, the functions appropriated to the operating unit may be changed according to the contents displayed on the screen.

(Details of Each Mode)

This hierarchical structure is summarized in FIG. 10. With the present embodiment, the system can be switched to three modes from the main screen using the slider 24A, namely the communication display mode, schedule (action) display mode, and database display mode (directory mode), or in the event that the communication display mode is further classified into the notify mode and memo mode, the system can be switched to four modes.

The communication display area 70.80 displays the carrier pigeon icons 70A for e-mail and the like of various types spontaneously sent to the portable device 2 from the PC 1, so that they are arrayed in the order or reception.

That is to say, operating the slider 24A shown in FIG. 6 enlarges the display of the communication display area 70.80 as compared to the other display areas, as shown in FIG. 8A. Then, by clicking on the carrier pigeon icon, for example, a window is displayed showing the heading of the e-mail, i.e., a pictograph or photograph of the sender 74a, the reception time 74d, name of sender 74b, and an icon 74c indicating that the data is e-mail, and further operation brings up the contents of the e-mail 75. Here, the photograph 74a of the sender can be automatically converted into a pictograph as necessary (text data to picture). In this way, multiple types of data can be automatically converted to desired media.

Here, in the event that the portable device 2 receives e-mail, the user is notified by sound from the audio output unit, and a digest of the e-mail and a notifying screen 74 is inserted and displayed on the main screen shown on the display unit 23.

The reception may be notified to the user by means other than sound; namely, color, vibration, smell, light, electric shock, etc., may be used for information notification. In this case, output means should be provided for each, i.e., color-changing control means, vibration control means, smell control means, light quantity and light color control means, and electricity control means. Also, the arrangement may be such that the notification is weakened or intensified according to the state of the user.

Further, the forms and colors of the carrier pigeon icons 73 denote particular functions appropriated thereto. For example, a black carrier pigeon icon 31D indicates that the contents of the e-mail are information of urgent nature, and a white carrier pigeon icon 31C indicates that the contents of the e-mail are information of important nature. Also, a parrot icon 73B denotes voice mail.

Also, as shown in FIG. 8D, clicking on the flower icon 82 brings up a window 83 showing the heading of the memo, i.e., the time at which the memo was input, and further operation displays a post-it type window 84 carrying a handwritten memo, as shown in FIG. 8C. Incidentally, when the flower icon 82 is clicked, the carrier pigeon is displayed at the very top of the display screen.

The number of petals on the flower icon 82 indicates the file size of the memo contents, i.e., the information amount, so that the greater the number of petals, the more information there is. Further, flower icons 81A and 81B which have forms different to that of the flower icon 82 indicate voice memos. Thus, according to the present embodiment, the amount of data, importance, urgency, for example, are represented by the size, color, shape, movement, blinking, etc., of the icon, thus providing meaning to the icon, and changing the icon according to the nature of the data.

The schedule display area 50 is formed so as to be switchable between modes each having time axes of the units of hour, day, week, and month. Also, as shown in FIG. 9A, operating the slider 24A enlarges the schedule display area 91A when the mode is switched to the schedule (action) display mode, and the other communication display area 70.80 and database display area 100 are reduced in display size.

In this schedule display mode 90, first, the time axis is displayed toward the bottom in time units, and schedule icons 92 for list output of the schedule are pasted to this time axis in a corresponding manner. Fonts indicating the contents of the schedule icons 92 are also displayed in an accompanying manner.

With the time axis which is displayed at the portable device displaying M hours, and the time axis which is displayed at the PC displaying N hours, it is preferable that M<N, from the perspective of miniaturization. Also, the time axis 93 has a schedule/no schedule area 93A, and the background screen in this schedule/no schedule area 93A is colored, so that the user can tell at a glance at that time of the day he/she has schedules input. Thus, the user can search easily using time as a key, without necessitating complicated hierarchical structures. Also, intentionally moving data onto a time axis allows using the data as a schedule.

Further, by coloring the background screen 95 which represents the past with the current time as a border, the user can visually recognize the amount of time between the current time and the next schedule, and also how much of the schedule has already gone into the past. In the present embodiment, the time axis is expressed so that the user can distinguish between the past and future by the display color (or monochrome inversion). The current time is represented by the border between the past and present. Thus, the current time and a representation of past, present, and future can be understood at a glance. Incidentally, the data is also displayed on the time axis which is displayed in units of hours.

The display mode 90 is configured to display within the schedule display area a "5 hour view" 91B which displays plans scheduled for the next five hours (FIG. 9B), a "Day view" 91A which displays a calendar in units of days (FIG. 9A), a "Week view" 91C which displays a calendar in units of weeks (FIG. 9C), and a "Month view" 91D which displays a calendar in units of months (FIG. 9D), for each of the four modes.

Incidentally, in the Week view 91C which displays a week's schedule, there are two types of the schedule icon 92, namely, an icon 92A which is displayed in black and an icon 92B which is shaded. The two types of icons thus formed distinguish the contents of the schedule.

Also, the calendar can be scrolled in the directions of the past or the future, by operating the cursor 110 using the TrackPoint 24C. Also, the time axis can be expanded or reduced (i.e., zoomed) while scrolling by means of the operating unit 24, thereby showing all of the time increments of each time axis, as shown in FIG. 9B, for example.

Further, the display contents can be expanded or reduced in sync with the scale of the time axis. The range over which data is displayed is automatically changed according to the zoom scale (5 hours, 12 hours, one-week schedule, etc.) Here, fine data that goes with the schedules may be seen (as an example of an enlarged display, see FIG. 9B) or may not be seen (as an example of a reduced display, see FIG. 9D), depending on the degree of zoom of the time axis scale. Even in the event that the schedule is zoomed away from, the user can tell the general concentration of plans in that area, since the volume of the schedule is represented as covering a certain area. Adjustment of the time axis can be made per digit of the time axis (i.e., hierarchical tiers of month, week, day, hour, etc.). Also, means for changing the color or brightness of the particular days selected is also effective. Further, the time axis moves along with elapsing of time, so the relative time-wise relation between the present and the event or object can be easily understood.

Also, in the present embodiment, the cursor 110 is displayed as a butterfly metaphor as shown in FIG. 9C, thereby allowing the user to recognize the cursor in a more powerful visual manner. It is desirable that the cursor be designed to flutter like a butterfly would in the event that there is operating input from the operating unit 24 for a certain amount of time. In order to design the cursor so, random numbers from an unshown random number generator are used to calculate a movement pattern from the present position, so the movement thereof is unpredictable, and further, display control of the cursor is performed during movement such that the pointer of the cursor 110 is turned on and off each time it moves so as to change shape during movement. Thus, with the present embodiment, the cursor is changed according to the nature of the data, using representations in movement, blinking, etc. On the other hand, an arrangement may be employed wherein the butterfly flutters following a period during which there is no operating input form the operating unit 24, somewhat like a screen-saver.

The database display area 100 displays alphabet letter, such as A, B, C, D, and so forth. The user selects the desired name of a person, address, company name, etc., based on the alphabet.

For example, as show in FIG. 8E, in the event that the user selects the alphabet letter D, a portion of a group of data starting with the letter D is displayed in the window 102. Opening this window 102 brings up an enlarged display of the database display area 100 as compared to the other areas, and the communication display are 70.80 and schedule display area 90 are displayed in a compressed manner.

Display screen 103 information relating to "Dale", and so forth, such as work phone number, FAX number, etc., as shown in FIG. 8F.

During times in which there is no display of the modes, i.e., in the event that here is no operating input from the operating unit 24 for a certain amount of time, the initial screen is displayed to serve as a screen-saver. Also, this area may be closed as necessary, so that the communication display area is displayed as a black background area just like closing one's eyes.

(Software Configuration of the Portable Device)

FIG. 10 shows a block diagram of the portable device for realizing such a hierarchical structure as described above.

In the Figure, the display control system for setting each of the modes has a operating unit 24, an audio input unit 27, first through fourth display setting units 210A through 210D, a display control unit 260, display unit 23, audio output unit 26, and an audio output control unit 270. The operating unit 24 is connected to the first through fourth display setting units 210A through 210D, and information for settings of selection of the screen of the display unit 23 and various types of information is output therefrom. In the present embodiment, the operating unit 24 is comprised of the TrackPoint 24C and the like and the interface thereof. Moving the TrackPoint 24C vertically and horizontally the cursor moves over the screen by means of the later-described display control, and clicking this allows selection of the various menus displayed on the screen.

Next, the details of the first through fourth display setting units 210A through 210D will be described with reference to FIG. 12.

The first display setting unit 210A sets the initial screen, which is displayed following the power having been turned on and formed into a composite screen with font data indicating the time, on the background screen which is displayed as a certain metaphor. Then, operating the slider 24A brings up the main screen.

The second display setting unit 210B sets the higher order menu group comprised of four split areas as display information. In the present embodiment, there are the four mode items "Notify", "Memo", "Calendar", and "Directory". These four modes are arranged on the display unit 23 so that, as shown in FIG. 7, the "Notify" mode 70 is displayed to the upper area, the "Memo" mode 80 is displayed to the upper middle area, the "Calendar" mode 90 is displayed to the lower middle area, and the "Directory" mode 100 is displayed to the lower area. This group of four modes is displayed on the main screen of the display unit 23 which is set following the initial screen being displayed after the power is turned on. Then, operating the slider 24A to select one of the modes on the main screen enlarges the display area of the selected mode.

Also, one of the modes can be selected by operating the TrackPoint 24C to move the cursor over the main screen. The selected information is output from this second display setting unit 210B to the third and fourth display setting units 210C and 210D.

Also, in the "Notify" and "Memo" modes, icons 73A, 71, 82, etc. are also displayed on the above-described main screen. Also, in the "Calendar" mode, a time axis divided into time units is displayed, and in the event that there is a schedule on the time axis, the background color is displayed on the "schedule/no schedule" background color display area space for displaying color. In the "Directory" mode, the letters of the alphabet A, B, C, D, E, and so forth are displayed in the alphabet display space to serve as the first letter of words to be searched for in the database. One of these icons and letters can be selected by operating the TrackPoint 24C to move the cursor on the main screen. The selected information is output from this second display setting unit 210B to the third and fourth display setting units 210C and 210D.

Based on the output of the second display setting unit 210B, in the event that there is a further plurality of lower menus below the upper menu of the icon or character selected by the second display setting unit 210B, the third display setting unit 210C sets the lower order menu group as display information. FIGS. 8 and 9 show an example of a lower order menu group. For example, in the event that the "carrier pigeon icon" 73a has been selected by the second display setting unit 210B, the "e-mail display space" 75 (FIG. 8B) which is the lower order menu thereof is set as the display information by the third display setting unit 210C. These lower order menu groups are displayed in a window or the like opened on the main screen of the display unit 23 by means of driving by the display driving unit.

Subsequently, the user operates the TrackPoint 24C to move the cursor over each mode screen, and a lower order menu is selected for one of the mode screens. This selection information is output from the third display setting unit 210C to the fourth display setting unit 210D.

The fourth display setting unit 210D sets as display information a display screen or setting screen corresponding with the selected higher order menu (only in the event that there is no lower order menu to that higher order menu) or lower order menu, based on the output from the second (or third) display setting unit 210C (or 210D).

Once the screen has been set by the fourth display setting unit 210D, the display driving unit performs display control of the lower order menu screen on the display unit 23, in addition to the mode screens.

For example, in the event that "5 hour view" 91A is selected with the third display setting unit 210C in the "Calendar" mode, and the schedule icon 92 therein is clicked on, the contents of the schedule are displayed.

Also, in the event that the name display setting screen 102 (FIG. 8E) is displayed in the "Directory" mode by means of the third display setting unit 210C, the personal data display screen 103 (FIG. 8E) is displayed by the fourth display setting unit 210D.

Incidentally, various types of information corresponding with the selected items can be input by operating of a trackball. The conditions information set by operation of the trackball is superimposed on the setting screen displayed on the display unit 23, thereby enabling confirmation of the set information.

Also, in the event that there are multiple lower order menus, fifth, sixth, etc., display setting units may be provided.

(Display Setting Units)

Now, the details of the display setting units 210 will be described with reference to FIGS. 13, 13A and 13B. As shown in the Figure, the display setting unit 210 has: a data processing unit 230 which processes data itself based on time information from a timer unit 21 and communication information from a communication unit 25; a UI processing unit 240 for generating background images and icon character data and the like to be displayed on the display screen, setting the display screen itself, and processing the user interface, based on data from the data processing unit 230 and operating input from the operating unit 24; and a storage unit 22 which stores data processed at the data processing unit 230 and the various types of data processed at the UI processing unit 240. The data processing unit 230 and the UI processing unit 240 conduct mutual communication in response to input processing from the operating unit 24.

The data processing unit 230 is comprised of processing unit corresponding with the functions of various applications, such as a mail processing unit 230A for processing mail data, a memo processing unit 230B for processing memo data, a database processing unit 230C for processing database data, a voice memo processing unit 230D for processing voice memo data, and so forth.

Examples of the types of data to be processed at the data processing unit include communication information from the communication unit 25, time information from the timing unit 21, input/output information based on operation of the operating unit 24, and so forth. Communication information includes e.g., e-mail information sent and received via the communication unit 25, and reception time information relating to the reception time of the e-mail information, this reception time information having been stored in a header portion attached to the e-mail information. This reception time information and e-mail information are stored in the data managing unit 200 in the storage unit 22 as a set in the form of communication information. Also, in the event that the communication information is audio information, the audio communication information includes reception time information of the voice mail information which is stored in a header portion attached to the voice mail information.

The input/output information is comprised of: schedule information to which the schedule has been input; specified time information that exists in the event that the user has specified the planned execution time of the schedule information, this specified time information being stored in the first header of the schedule information; and operation input time information of the operating input by the user, based on the timing unit 21, this operation input time information being stored in the second header of the schedule information; these three being stored in the data managing unit 200 in the storage unit 22 as a set in the form of input/output information. Also, in the event that the input/output information is audio information, the audio input information includes voice memo information to which the voice memo has been input, and input time information of the time of input of the voice mail information which is stored in a header portion attached to the voice mail information.

The UI processing unit 240 is comprised of: a contents analysis unit 242 which analyzes the contents of appended data such as reception time information, file size, number of files, etc., of data appended to the main data body which is processed by the data processing unit 230, such as the header portion; an updating processing unit 244 for updating the display screen based on the time information from the timing unit 21 and operating input from the operation unit 24, a background screen character data control unit 250A for generating background screens; an icon character data control unit 250B for generating icon information; a font data control unit 250C for generating type information; and an image composing unit 252 including a state holding unit for composing one of the pieces of data from the control units 250A through 250C.

The contents analysis unit 242 has functions for analyzing various types of data, such as a header analyzing unit 242A for analyzing the contents of the multiple headers 1, 2, and so forth in the header portion, a file size analyzing unit 242B for analyzing the contents of the file size, a file number analyzing unit 242C for analyzing the number of files, and so forth. Also, the header analyzing unit 242A serves as a reception time header analyzing unit in the event that reception time information is stored in the header portion for example, and serves as a specified time header analyzing unit in the event that specified time information is stored in the header portion, for example.

The background screen character data control unit 222A serving as metaphor environment generating means receives the results of execution of the data processing unit 230, and forms and outputs to the display unit 23 background screens using metaphors (character data) which imitate scenery and events of the real world which the user comes into contact with in everyday life, based on control signals from the operating input control unit 280.

The icon display character data control unit 222B receives the interpretation results which are the output of the contents interpretation unit 242, and instructs change in the operation state of the displayed screen and the like to the image composing unit 252, based on the data from the storage unit 22 (data comprised of a selection of a corresponding function made from a function group prepared beforehand). For example, in the event that reception time information is stored in the header portion, the icon display character data control unit 222B functions to perform display processing on the display unit 23 of icon display character data stored within the icon display character data storage unit 222B in the data storage unit 222, in the order of reception, based on the analysis results (comparison of reception time). Also, in the event that specified time information is stored in the header portion, the icon display character data control unit functions to perform display processing on the display unit 23 of icon display character data stored within the icon display character data storage unit 222B in the data storage unit 222, in the order of planned time, based on the analysis results (comparison of specified time).

As described here, e-mail information, for example, includes text data which is the main data body, and appended data which is stored in the header portion of this e-mail data and is attached to the text data. Examples of this appended data include reception time, file size, etc. The contents analyzing unit 242 judges whether or not there is any such data appended, and extracts the appended data, such as reception time or the like. Accordingly, the appended data contains the file name in the header portion, so the function units such as the header analyzing unit 242A (reception time) and the file size analyzing unit 242B (data amount) judge by suffixes, such as characteristic suffixes like TXT, GRP graphics, Exls, and so forth.

Thus, information is extracted, and the icon display character data control unit 222B brings up the corresponding data and reflects this on the objects, based on the reception information such as that which indicates urgency, for example.

A state holding unit is provided within the image composing unit 252, to hold the current operation state, and to output the operation state to the display unit 23 via the display control unit 260.

The storage unit 22 has a data managing unit 220 for storing data processed at the data processing unit 230, and a data storage unit 222 for storing data processed by the UI processing unit 240.

The data managing unit 220 has various tiers, such as a mail data storage unit 220A for managing data which processes address books and the like, a memo data storage unit 220B which manages memo data, a voice memo data storage unit 220C which manages voice memo data, and so forth.

The data storage unit 222 has a background screen character data storage unit 222A which stores multiple types of background screen character data (the time axis, sky metaphor, etc.), an icon character data storage unit 222B which stores multiple types of icon character data, and a font data storage unit 222C which stores multiple types of font data. The background screen character data storage unit 222A stores the display images of metaphors applied, such as sky scenery used for the sky metaphor, for example.

Also, in addition to the background screen character data, icon character data, and font data, the data storage unit 222 of the storage unit 22 has a metaphor rule accumulation unit, wherein is stored metaphor rules describing rules for the applied metaphors, such as the range of movement of characters and the method of display thereof for the sky metaphor comprised of a character representing the sky scenery which represents the operation environment, for example.

The operation input control unit 280 is comprised of control units corresponding to various types of operation input from the operating unit 24, such as: an audio input control unit 280A which controls sending of audio input information from the audio input unit 27 to the data processing unit 230; a key input appropriation control unit 280B which controls the correlation between the plurality of operating buttons 24A, 24B, 24C, and so forth, with the icon information, cursor, etc., on the display unit 23; a data input control unit 280C for correlating input information other than the audio input information, such as handwriting input or the like, with fonts on the display unit 23; an image hierarchy control unit 280D serving as a hierarchy control unit executing control so as to switch the hierarchy layer on the display screen (higher order menu <=>lower order menu) and selectively display the hierarchy layers selectively; a mode switching control unit 280E for controlling switching of the various modes of the display screen; an expansion/reduction control unit 280F which controls expansion/reduction of the overall display screen and particular areas thereof (i.e., enables expansion/reduction of time increments on the time axis, and enables expansion/reduction of the size of icon information in accordance with the expansion/reduction of the time axis); a scroll control unit 280G for controlling scrolling of the display screen; an icon movement control unit 280H for controlling the movement and the like of icon information on the display screen; and so forth.

Regarding the operation input control unit 280, in the event that the data input control unit 280C for example is to function, the operation input control unit 280 has the functions of detecting the input coordinates position corresponding to the display unit 23 at the time of operating input, and outputting the coordinates position according to the state of the screen as data to the UI processing unit 240.

The display control unit 260 receives the present state of the image composing unit 252, reads a necessary display image and forms a display screen, which is output to the display unit 23.

Thus, the above data managing unit 220 serves as the first storage means, and the data storage unit 222 for storing various types of data serves as the second storage means.

The data managing unit 220 classifies and stores the multiple types of data with differing attributes according to the attributes, so mail data (communication information) and memo data (input/output information) and the like are stored in the main data storage unit 220A, memo data storage unit 220B, voice memo data storage unit 220C, and so forth. In addition to the display data, each storage unit stores attribute information for the multiple attributes for distinguishing the multiple types of information in various formats, e.g., a dedicated suffix for indicating mail data files, a dedicated suffix for indicating memo data files, a dedicated suffix for indicating voice memo data files, and so forth. These types of displayed data have attached thereto a plurality of pieces of time information relating to multiple types of information. This time information includes transfer time information which is transferred via the communication unit, in addition to the timed by the above-described timer unit 21.

Now, in the present embodiment, the expression "attributes information" means information for distinguishing the multiple types of information, such as e-mail files, memo files, schedule files, voice memo files, and so forth. Suffixes or the like for distinguishing the file format in the file system have been given as an example of this "attributes information", but the present invention is not restricted to such.

Also, the expression "the same 'concept'" means that the arrangement is such that the display forms of the first icon information and the second icon information are different, but the idea and the impression projected to the user is the same.

Further, the expression "common 'background attributes'" indicates that, e.g., the first background display (the metaphor of each of the first, second, and third display areas at the PC) and the second background display (the metaphor of each of the first, second, and third display areas at the portable device) are the same.

The icon character storage unit 222B of the data storage unit 222 stores multiple types of icon information each corresponding with multiple types of attribute information. Also, the background character storage unit 222A stores time-axis displayed data for displaying the time axis, background display data for background display of the time axis area, background screen color data for color display of the background of the time axis area, time axis color data for color display of time areas correlating the icon information with the time axis, and so forth.

Incidentally, time axis display data consists of first tier display time axis data for displaying the first tier which is segmented by increments of hours and thus displayed, second tier display time axis data for displaying the second tier which is segmented by increments of days and thus displayed, third tier display time axis data for displaying the third tier which is segmented by increments of weeks and thus displayed, and fourth tier display time axis data for displaying the fourth tier which is segmented by increments of months and thus displayed.

Accordingly, the control means 210 selects icon information corresponding with the multiple types of information attributes based on attributes information, and controls the display on the display screen based on the time information relating to the multiple types of information such that the pieces of selected icon information are all arrayed on the time axis according to the corresponding time. Also, the background screen character data control unit 250A and image composing unit 252 comprise an background screen generating unit.

In the event that the multiple types of information consist of e-mail information sent and received via the communication unit 25, the e-mail information header portion has reception time information relating to the time of reception. Accordingly, the control means 210 performs display control of icon information on the display screen in the order of reception.

In the event that the multiple types of information consist of a ToDo list, the header portion has specified time information regarding the time which the user has specified for executing the scheduled plan. Accordingly, the control means 210 performs display control of icon information on the display screen based on the specified time information.

Thus, the display device according to the present invention has first storage means, second storage means, display means, and control means.

(Display Processing of Menu Screen)

With reference to FIG. 8A which illustrates an example of the display screen according to the present embodiment, the background screen shows the sky metaphor, and the objects on the background screen are the carrier pigeon icons 73A for instructing activation of the application program. Here, the contents analyzing unit 242 analyzes the information appended to the header portion of the e-mail information as appended data, e.g., reception time, file size, etc. Then, the character data control unit 250 performs icon display control in different forms and the like of reception order indicating urgency, file size, and so forth.

The user can operate these objects by selecting with the operating unit 24 (i.e., by a pointing operation).

In the event that the carrier pigeon icon 73A is selected, the corresponding application (e-mail related program) is initiated, and a display window for the application (lower order menu, lower order command screen) is displayed.

That is to say, in the event that the carrier pigeon icon 73A is selected in the state that an operating world (the sky metaphor screen) such as shown in on the display unit 23 is being displayed, the input coordinates corresponding to the display unit 23 are detected by the operation input control unit 280, and data (activation request for the application) corresponding to the state on the current screen (the carrier pigeon icon 73A is displayed at the input position) is generated. The data generating unit 230 receives this data via the character data control unit 250, selectively executes corresponding processing from the application program (e-mail related program) and outputs the execution results (completion of activation of the application).

The character data control unit 250 receives the execution results from the data processing unit 230, receives rules accumulated in the metaphor rule accumulating unit and the like (rules relating to application activation), and determines the corresponding screen display state (composes and displays fonts on the background screen by the font data control unit). The image composing unit 252 changes the action state according to the instructions, and outputs a new action state to the display control unit 260. The display control unit reads necessary display images (application start-up screen, etc.) and forms the new display screen, based on this action state, and then outputs the new display screen to the display unit 23. Thus, the application start-up screen is displayed as a result of the user selecting the carrier pigeon icon 73A.

While the application is running, the user performs input to the application by making selections from lists on the screen or selecting objects such as software buttons using the cursor, and subsequently instructs processing by selecting objects on the display screen. When execution of the application is completed, the window is closed, and the screen returns to the sky metaphor which was displayed before activation of the application. Thus, the details of the contents and state are displayed on the screen, and the user can visually understand the selection, execution, etc., of the application.

Further, the operating unit generates data from coordinates position subsequently input by the user (application input, etc.), according to the received new action state. This data is also received by the data processing unit and processed as input data during execution of the application. Consequently, corresponding font data is called at the font data control unit 250C, the action state of the image composing unit 252 (display screen, etc.) is changed, and the display on the display unit 23 is changed via the display control unit 260.

In the event that the user performs input to quit the application, the action state of the image composing unit 252 is changed in the same manner as before, the window closes, and the display returns to the metaphor screen (main screen). The display control unit 260 receives the changed action state of the image composing unit 252, and changes the display of the character (changing or moving an image, etc.) and outputs this to the display unit 23. Such operation thus indicates the action state to the user in a visual manner.

In this way, providing a unified operating world with a sky metaphor enables the user to visually understand the contents being executed by the application, and facilitates easy understanding of the display contents and actions with no more than everyday knowledge that an average user would be expected to have.

Another example shown in FIG. 8C concerns displaying a message on a Post-It 84. To this end, the message is written as ink data with a separate device beforehand, such as a memo tablet, and saved as a text file. This text file is transferred to the portable device 2, and stored in the storage unit 22 using the data processing unit 230 via the communication unit 25. The UI processing unit 240 is used to generate a Post-It display area 84 by the background screen character data control unit 250A, and the font data corresponding with this text data is superimposed on the Post-It display area 84 by means of the font data storage unit 222A. Now, the message written on the tablet is stored in BMD (bit-map data) format. Or, line information may be used for finer and more precise writing.

In a further example, in the case of performing scrolling processing, the display screen of the display unit 23 is sequentially re-written by means of the scroll control unit 280G updating the updating processing unit 244, generally based on the operating unit 24. However, it is preferable to perform processing such that the current time is re-read one hour from now and the time data alone is changed and re-displayed, rather than moving the background screen itself. That is, the entire screen is flushed, and the background screen is displayed. Next, data for one hour later is generated, and the various characters are composed. The screen is moved to one direction, and updating processing by the updating processing unit 244 is repeated. However, it is preferable that only the new area lacking display due to the movement should be generated. That is, a display algorithm should be prepared beforehand whereby the common portions of the display screen before and after scrolling are held in that state, and following scrolling the screen that has been held in the same state is displayed, upon which the display are which is to be newly added is re-written.

Also, in the event of performing display processing to change the color of the background screen for a certain time period in the schedule, there is the need to analyze the start time and end time of the period. That is, start-time and end-time are attached to the data proper as appended data. Also, the start-time and the planed time may be combined and provided as appended data. In the case of mail, the main data has a plurality of headers such as people attending and so forth, so the title and time can be displayed at the same time. Accordingly, the user can tell how busy the schedule is.

Further, in the event of conducting enlarging/reducing processing, a plurality of enlarged or reduced character patterns are provided beforehand, and these are updated one at a time according to the operating state at the operating unit.

Now, description will be made regarding display processing of the initial screen displayed when the power is turned on, i.e., the main screen, with reference to the data tables for menu display shown in FIGS. 16A, 16B, and 17.

FIG. 16B is a menu data table (Table 2), this table being comprised of menu name data for identifying each piece of menu data, menu format for indicating the format for display of the menu, background display character data pointers BI1 through BI7 for pointing to addresses in FIG. 17A where background display character data to be used as the background for the menus is stored, and so forth, and array position data of the icons indicated by X-coordinate and Y-coordinate on the screen. Incidentally, next-layer menu No. data indicating the menu that exists at the next hierarchical layer, and icon No. data representing the icons provided in the menu, should also preferably be stored.

The menus defined by this menu data table is the main screen and each mode in the next hierarchical layer. The icons corresponding with the functions that the scheduler according to the present invention has are displayed on the desktop.

Also, FIG. 16A is an icon data table (Table 1) containing a plurality of pieces of icon data. This table identifies each piece of icon data, and is comprised of function name data for identifying each piece of icon data and serving as the name of the function corresponding to each icon, character data pointers DI1 through DI11 for pointing to addresses in FIG. 17B where character data is stored, and so forth, and a function program pointer which points to addresses in FIG. 14 where function programs F1 through F9 defining the functions corresponding to each icon are stored.

The above are the data tables for displaying menus. Next, a brief description will be given regarding display processing.

Reference is made to the menu format of the menu to be displayed from the menu data table (Table 2 [FIG. 16B]), and in the event of full-screen display, the background display character data (FIG. 17A) pointed to by the background display character data pointers BI1 through BI7, and so forth, is displayed on the full screen. In the event that the format is pop-up format, a window frame for a pop-up window is displayed, and background display character data pointed to be the pointers is displayed in the window in the same manner. Next, reference is made to the icon to be composed and icon array position data from the menu data table (Table 2), reference is made to the character data pointed to by the background display character data (FIG. 17B) pointers BI1 through BI11 and so forth in the icon data table (Table 1) of the icon data corresponding to these icons, the icons to be displayed are assembled, and the assembled icons are positioned and displayed on the screen according to array position data (X1, Y1) and so forth of the menu data table.

In the event that an icon has been selected, reference is made to function program pointers F1 through F8 and so forth of the icons, and the corresponding function programs (F1 through F9 in FIG. 14) are activated.

(Mail Processing Unit)

Contained within the mail processing unit 230A in the processing unit 230 are unshown mail input/output means, mail transmission/reception means, recipient list managing means, and so forth. The mail input/output means has a mail creating processing unit for creating new mail, a transmission operation processing unit for sending mail, and a mail editing processing unit for changing the recipient list. The mail transmission/reception means has a mail transmission processing unit for sending mail according to the recipient list, and a mail reception processing unit for notifying the receiver that the mail has been received. The recipient list managing means has a recipient list initializing processing unit for initializing the recipient list, a recipient list adding unit for adding a new recipient, and a recipient list deleting processing unit for deleting a recipient from the list.

Incidentally, at the PC, the display screen for the e-mail system is configured as shown in FIG. 2, and accordingly, spaces are provided in the display window 34 for displaying, e.g., name 24a, title 24b, company name 34c, company address 34d, business phone number 34e, business FAX number 34f, home phone number 34g, personal e-mail address 34h, and comments 34i.

(Data Structure)

Now, description will be made regarding the structure of data used by the programs, stored in the mail data storage unit 220A in the data managing unit 220 of the storage unit 22, in order to display a window such as described above. FIG. 14 illustrates the hierarchical structure of the data stored in the mail data storage unit 220A.

The storage unit 22 has a control unit 22A in which management programs are stored, various applications F1 through F9 including the e-mail related program F1, tables including the above-described Tables 1 and 2, the data storage unit including character data 222A and 222B and font data 220C.

In the event that an information recording medium according to the present invention for at least storing information for generating a display image is to be formed by this storage unit 22, the various types of information shown in FIG. 14 should be had at least.

In this case, the multiple pieces of attributes information for identifying the multiple types of information, the multiple pieces of time information relating to the multiple types of information, etc., are stored in respective header portions. Multiple types of information each corresponding with the multiple pieces of attributes information are stored as icon character data 222B, and time axis display data for displaying the time axis is stored as background screen character data 222A. Also, information for selecting pieces of icon information each corresponding with the multiple types of information, based on the attributes information, and controlling the display on the display screen so that the selected pieces of icon information are each arrayed according to time on the time axis, based on time information relating to the multiple types of information, is stored as management program 22A.

The data management unit 220 has a mail data storage portion 220A, a memo data storage unit B, database data storage unit C, and so forth.

The mail data storage portion 220A is formed of a plurality of files 1, 2, and so forth, and each file is formed of header portions 220A-1, 220A-2, 220A-3, and so forth, and an actual data portion 220A-15 relating to the contents of the mail. Stored in the header portion 220A are the reception time as header 1 (220A-1), file size as header 2 (220A-2), name (ID) as header 3 (220A-3), and so forth.

Mail data storage portions 220A are created for each node displayed within the display window shown in FIG. 2 for example, and stored in the storage unit 22. More, specifically, a mail data storage portion 220A consists of the following entries: file size; date and time of reception; name (ID); bit-map data of the photograph (or pictograph) of the sender; display position of the photograph; size of the photograph; date and time of opening mail; date and time of transfer; display position of mail display window; size of mail display window; display position of time in space below mail display window; size of time display area; size of letters of the time display; size of letters (font size) of the mail contents; actual data (main data body) relating to the mail contents; sender list; list of transfer recipients (address book, recipient addresses, etc.); attributes; pointer to icon; comments; and so forth. Incidentally, with the present embodiment, all such appended data other than the actual data (data main body) is hierarchically arranged, e.g., from the top as Header 1, Header 2, and so forth, and the contents thereof are analyzed at the above-described header analyzing unit 242A.

It is also preferable to have other tables as well, such as a window managing table (for the mail display screen), recipient list managing table, and so forth.

Here, "name (ID)" refers to an identifier for each user, and generally, the name or nickname of the user serves as this identifier. The address to which the mail is to be sent is set as the recipient address. Now, in general e-mail, the e-mail address is information for specifying the storage place in the storage unit, and the user access this storage place and finds out the reception state of e-mail addressed to himself/herself. The date of opening is provided by the real-time clock within the timing unit 21, and this is set to the date and time at which the received mail was first viewed. The transfer date and time is set to the date and time at which the mail was transmitted (forwarded or returned), according to a recipient list set beforehand. The attributes sets flags identifying whether or not the receiver which is a node corresponding to the data structure is capable of editing the recipient list, and whether or not the receiver is absent. Coordinates, character strings, the size of icons and the like within the display window that displays character strings and icons at the node corresponding to the data structure, are set for the display coordinates and size. A pointer pointing to the area at which an icon image (image information, character data) indicating the node corresponding to the data structure displayed within the display window is set for the pointer to the icon. Input comments are set as comments. Incidentally, the number of entries may be formed so as to be variable.

The window managing table is a collection of data sets for displaying the window groups on the display screen, and is stored in the storage unit. The window managing table has items such as window names, window coordinates, and the width and height of windows defined in number of pixels, and is comprised of a collection of data sets corresponding to each item in the address book display window and the like, for example.

Also, the mail data storage portion 220A has a recipient address book managing table. The recipient address book managing table holds the various types of information for all registered users, and the various types of information held therein are displayed in a window as a list. This table contains items such as names, recipient addresses, etc., and is comprised of a collection of data sets corresponding to each above item regarding each registered user.

(Action of the Portable Device)

FIG. 18 shows an action flowchart for the portable device. First, the power for the portable device is turned on to start it up, whereupon the CPU accesses the PC via the communication unit according to a boot program stored in the storage unit, and reads terminal operating software, protocols, and other necessary data stored in the storage unit.

Next, an initial screen such as shown in FIG. 6 for example is displayed on the display unit 23 of the portable device 2. Next, the display switches to the main screen, wherein icons are appropriated with icon functions based on data, and displayed as characters within the display area. Accordingly, the user can instantly understand the various functions in a visual manner, thereby realizing a portable device which is easier to use. Incidentally, while the present embodiment is described as having still images, animated images may be displayed as necessary.

Turning the power on first displays the initial screen (Step (hereafter abbreviated simply as "S") 1), and performing operations from the operating unit S2) displays the main screen (S3). Display of this main screen is performed based on display information from the first display setting unit 210A shown in FIG. 12. that is, the CPU 28 shown in FIG. 2 calls display information corresponding to the main screen stored in the storage unit 22, and transfers this information to the display unit 23 for display.

This main screen is as shown in FIG. 7, and selection of one of the three higher order menus displayed in a split manner can be selected.

Here, S3 which displays the main screen performs processing such as shown in greater detail in the flowcharts shown in FIGS. 20A and 20B. First, in the event that some sort of operation action is made, this creates a state in which the screen must be updated. Judgment is made whether or not there is updating of the main screen (S30), and background display processing for the background screen is performed (S32) to update the screen. This background display processing is background display processing for generating the main screen, so display control is carried out by, e.g., pasting background screen character data BI1 through BI7 shown in FIG. 17A in certain positions.

Next, if the command "Any mail?" (S33) yields "YES", a window which is shown in FIG. 8A is displayed in the screen, and the user is notified of the information (S34). This information notification is only performed when mail is received by the portable device, so first judgment is made whether or not this is the first time for this display (34a), and the photograph, topics, etc., of the mail sender are displayed for a certain amount of time, such as one second, following which processing is performed such that the display automatically goes off (S34b).

Next, the contents of the mail are analyzed S(35). Here, data which is the contents of the mail itself being sent by communications is processed (S35a). For example, first, the data is stored in the mail data storage unit 220A in the data managing unit 220 within the storage unit 22. Further, in the even that the data is being transmitted to the portable device, there are header portions (220A-1 through 220A-N) at the head thereof, like the electromagnetic signals shown in FIG. 15, so the header analyzing unit 242A reads the various types of information (e.g., mail sender, date and time of reception, etc.) stored in the header portions (220A-1 through 220A-N). The file size is also appended information attached thereto, so analysis of the file size is conducted, as well (S35c).

Also, while not described in detail here, the name of the mail sender, and so forth, are analyzed by the analysis of the header portions.

Thus, the pigeon icon bit-map image is selected from the multiple characters comprised of bit-map images and stored in the storage unit, as a corresponding character, by means of the background screen character control unit and icon character control unit shown in FIG. 13, and the pigeon icon for example is superimposed on the background screen (S37).

Subsequently, judgment is made whether or not there is any other mail (S37), and in the event there is, the steps S34 through S36 are repeated; in the event there is no more mail remaining, the flow enters a standby state until there is an update (repeating S30 and S31). The program stands by until there is key input. Repeating these steps until there is no more mail lines up pigeon icons on the background display.

Incidentally, an arrangement may be made in S35 wherein the degree of urgency, for example, is defined by how early or late the mail arrived, and arrange beforehand to paste a red pigeon icon in the event that urgency is high and to paste a normal pigeon icon in the event that urgency is low, and also arrange the header analysis unit such that mail which has arrived before a point in time prior by a certain amount of time to the current time is understood to be low in priority, and mail which has arrived after this point in time is understood to be high in priority, whereby desired character icons are superimposed on the display screen in S36 by the character data control unit, based on this analysis.

Also, information such as the time at which the e-mail was written is saved in the header portion, so the pigeon icon can be pasted on the time axis at the desired position in order of time, based on such information.

In the same manner as with the above mail, judgment is made regarding whether or not there is updating of the main screen for memos as well (S41), and display processing of the background screen is conducted (S42).

Next, if the command "Any memos?" (S43) yields "YES", a Post-It window such as shown in FIG. 1A is displayed on the screen (S44).

Incidentally, S43 may be made to include a judging block calling, "What sort 30 of memo?"

Then, the contents are analyzed, in the same manner as the above S35 (S45). That is, information such as the time at which the memo was written is saved in the header portion, so the Post-It can be pasted on the time axis at the desired position, based on such information. Also, in the event that there is text data in the data, the font data control unit receives the main text, and extracts corresponding font data based on the font data storage unit and the data processing unit, and outputs this to the image composing unit. The font data storage unit has font data such as 1, 2, 3, 4, A, B, C, D, and so forth, and the font data is brought and pasted to the Post-It one at a time, thereby outputting text information (S40). Incidentally, the font data storage unit has various types of font data with the atmosphere of handwriting, and is not limited to fonts such as Mincho or Gothic.

Subsequently, judgment is made whether or not there are any more memos (S47), and in the event there are, the steps S44 through S46 are repeated; in the event there are no more memos remaining, the flow enters a standby state until there is an update (repeating S40 and S41). Repeating these steps until there are no more memos lines up Post-Its on the background display, as shown in FIG. 1.

Icons of various types relating to various types of information, such as icons for memos, schedules, voice memos, etc., are superimposed and displayed on the screen according to similar means, so detailed description thereof will be omitted here.

Further, based on analysis of the file size, the icon character data control unit is controlled to select a flower icon with many petals in the event that the file size is of a certain size or greater, and to select a flower icon with few petals in the event that the file size is of a certain size or smaller, thereby superimposing display of flower icons with many petals and flower icons with few petals on the display screen.

Also, with the present embodiment, a time axis is displayed on the main screen for the background display processing in the above S32 and S44, so the flow for generating this time axis will now be described with reference to the flowchart shown in FIG. 24A.

In the event that there is updating due to operating of the operating unit, such as scrolling, enlarged/reduced display, mode switchover, etc. (S50), the display area (display scale) to be displayed at the standard size on the display screen is determined (S51), and the time axis is superimposed over the background screen at this scale (S52). Next, the current time is checked (S53), and based on the display scale and the current time, the time to be displayed at one end of the display screen on the time axis and the time to be displayed at the other end, and the position to display the arrow indicating the current time, are determined (S54). Subsequently, the background screen of the time which is past compared to the current time is colored. Incidentally, the current time from the timing unit sequentially progresses, so it is needless to say that updating of the display of the time axis is constantly being performed in accordance with passing of time at the timing unit. Thus, the user can visually see sequential movement of the time axis and various types of information over the display screen in accordance with the passage of time.

Further, the time axis according to the present embodiment has a plurality of square sections which each represent time increments that are connected to form a grid, and a square section representing a time period in which there is a schedule is displayed in color. In this case also, characters are superimposed at the corresponding time on the time axis in the background display processing in S32 and S44 (S60), and subsequently, areas corresponding to the aforementioned squares and schedule/no schedule area are colored (S61).

Next, returning to FIG. 18, when the main screen is displayed, in the event that the screen is to be returned to the original state by means of operating from the operating unit, the screen returns to the initial screen (S4), and if there is no such operating of the operating unit, the flow stands by until further operating is conducted.

In the event that there is mode changing operation from the operating unit (S6), display of the background screen in each mode is conducted by the mode switching control unit 280E shown in FIG. 13 (S7). This mode changing operation is conducted by operating the operating unit (slider) vertically. Here, only the characters for background display differ from the main screen display processing (S3), and superimposing processing of other icons and the time axis is practically the same as the above S2 (more specifically, S30 through S37 in FIGS. 20A and 20B, and S40 through S47), so detailed description thereof will be omitted.

In the same way, in the event that the screen is to be returned to the original state by means of operating from the operating unit, the screen returns to the initial screen (S8), and if there is no such operating of the operating unit, the flow stands by until further operating is conducted.

In the event that there is scrolling operation from the operating unit (S10), display of the background screen after scrolling is performed by the scrolling control unit 230G shown in FIG. 13 (S11). This scrolling operating is conducted by moving the cursor over the screen by means of operating the operating unit. Here also, only the characters for background display differ from the main screen display processing (S3), and superimposing processing of other icons and the time axis is practically the same as the above S2 (more specifically, S30 through S37 in FIGS. 20A and 20B, and S40 through S47), so detailed description thereof will be omitted.

In the same way, in the event that the screen is to be returned to the original state by means of operating from the operating unit, the screen returns to the initial screen (S12), and if there is no such operating of the operating unit, the flow stands by until further operating is conducted.

In the event that there is enlarging/reducing operation from the operating unit (S14), enlarged/reduced display of the background screen is performed by the enlarging/reducing control unit 230F shown in FIG. 13 (S15). Zooming and the like can be realized by operating a specified operating unit. Here also, only the size of the background screen characters and icon characters differ from the main screen display processing (S2), and other superimposing processing of icons and the time axis is practically the same as the above S2 (more specifically, S30 through S37 in FIGS. 20A and 20B, and S40 through S47), so detailed description thereof will be omitted. Subsequently, the program stands by until there is key input, and in the event that key input is detected, judgment is made regarding whether or not the key input is for canceling the zoom.

In the same way, in the event that the screen is to be returned to the original state by means of operating from the operating unit, the screen returns to the screen following scrolling (S16), and if there is no such operating of the operating unit, the flow stands by until further operating is conducted. In the event that there are subsequent display changing operations, the above various operations are carried out (S5, S4, S13, S17).

In the event there are no other display changing operations, process A (S18) is executed. In this process A, first, the user judges whether or not to select a desired icon (S19) since various icons are displayed in each screen, as shown in FIG. 19.

Here, icon selection is performed by operating the operating unit to move the cursor over the screen, and this cursor is positioned over one of the icons and clicked. This sets S19 in FIG. 19 to "YES". As an example, information of an icon selected by operating the operating unit is output to the third and fourth display setting units 210C and 210D by the second display setting unit 210B. Upon receiving this information input, the display setting unit 210C judges whether or not there are a plurality of lower order menu groups under the selected icon. In the event that the display setting unit 210C judges that there are a plurality of lower order menu groups under the selected icon, the lower order menu groups are displayed on each mode screen. This display is carried out by opening a window on each mode screen by means of the third display setting unit and displaying the lower order menu group within the window. For example, in the event that the "red pigeon icon" is selected in S19 from the higher order menu group shown in FIG. 10, the lower order menu corresponding to this icon, i.e., the "e-mail display screen 1" is displayed (S21).

Selection of the lower order menu is conducted by operating the operating unit, in the same manner as selecting an icon. In the event that one of the lower order menus is selected by operating the operating unit, the judgment in S23 is set to "YES", the information of the selected lower order menu is output from the third display setting unit to the fourth display setting unit, and the flow proceeds to S24. Incidentally, even in the event that the judgment in S23 is "NO", the flow proceeds to S24. A case in which the judgment in S23 would be "NO" is a case wherein an object for which a lower order menu group does not exist is selected. In this case, the fact that a setting screen corresponding to the selected icon exists is judged by the fourth display setting unit, based on the output from the second display setting unit, so S24 and the subsequent steps are executed by the functions of the fourth display setting unit. Or, information to the event that there is no corresponding lower order menu group may be output from the third display setting unit toward the fourth display setting unit.

Executing the actions of the above S19 through S24 determines one of the items, and then, the actions of S25 and subsequent steps are carried out by the functions of the fourth display setting unit. This fourth display setting unit displays a setting screen corresponding to the selected item on the display screen. Then, by moving the cursor displayed within the setting screen with the data input control unit 280C and clicking it based on operating from the operating unit, various types of input are conducted. Once operating from the operating unit carries out the input, S25 is set to "YES", and the input information is displayed within the setting screen (S26). Subsequently, in the event that the input has been completed by later-described actions, S27 is set to "YES", the flow returns to Steps 3, 7, 11, 15, and the main screen is displayed again. Also, this setting screen has displayed therein other lower order menus included in the same class, so in the event that another lower order menu is selected at this setting screen, S28 is set to "YES" and the flow returns to S21, and a setting screen corresponding to the selected lower order menu is displayed. In the event that S28 and S27 yield "NO", S25 through S27 are repeated.

The image hierarchy control unit 280D controls the upper order menu and lower order menu hierarchy at the first through fourth setting units, based on 35 operation at the operating unit 24.

Also, in the case of moving an icon to a desired position, the icon movement control unit 280H is controlled, based on operation at the operating unit. Based on this control, the desired icon and icon pasting position at the icon character data control unit 250B for example of the UI processing unit 240, and output to the display unit.

Further, in the event of inputting audio or the like, audio input is performed by the audio input unit 27. The audio information is moved to the data managing unit by the audio input control unit 280A. When the specified time comes, the audio output control unit 270 reads out the stored audio information via the operating unit and outputs this as audio to the audio output unit 20, and also makes a desired display on the display unit via the display control unit.

Also, with the present embodiment, in the calendar display mode included in the schedule display mode, a butterfly cursor is used, and displayed such that the wings of the butterfly are fluttering while the cursor is moving. Accordingly, even in cases wherein the background screen is formed of a plurality of square sections like a calendar, the cursor can be easily visually recognized. A preferable example of such display processing is the processing shown in FIG. 22.

That is, in FIG. 22, first, whether or not there are instructions to display the cursor is judged (S90), and in the event there are no such instructions, the flow enters a stand-by state until there are instructions to display the cursor. Once there are instructions, the butterfly character data stored in the storage unit is superimposed and displayed on the coordinates to which the cursor points (S91).

Then, judgment is made whether or not there are movement operations being performed to move the butterfly cursor (S92). In the event there are no movement operations, S93 is carried out. In S93, control is performed such that a plurality of pieces of butterfly character data formed to represent sequential movement as if the wings of the butterfly were actually fluttering are alternately displayed at certain time intervals, and control is performed to move the butterfly character data based on random coordinates to which the cursor points, generated by an unshown random number generating unit.

Judgment is made whether or not the cursor movement operation has ended (S94), and in the event the cursor movement is still continuing, S93 is repeated, and in the event that the cursor movement operation has ended, the process is quit.

Next, description will be made regarding how to use the PC 1 or the portable device 2. First, in the state that the menu screen is displayed, the user operates icons to which the various functions are appropriated. When an item is selected, the "communication mode" is selected from the upper order menu group shown in FIG. 10 in S6 shown in FIG. 18, and further, selecting the "red pigeon icon" displays the "e-mail display screen in S21 via S19. The user sets and inputs data regarding e-mail while watching this setting screen, based on the operating unit. Here, FIG. 2 shows an example of the setting screen. In the example in the Figure, display spaces are displayed in a vertical array within the setting screen 34.

The conditions can be changed by moving the cursor (conditions setting bar) to be set in the position of the desired display space, by operating the operating unit. Setting of the various types of input for the PC 1 or the portable device 2 are completed according to the above procedures in the same manner.

Once the various types of input have been completed, the settings can saved for example, by selecting "File" from the pull-down menu space on the screen of the PC 1 for example and selecting a lower order menu. The data is automatically set as data for a screen data setting item, and is sent to the PC.

Then, once data input thus is sent from the portable device 2 for example to the PC 1, the PC 1 matches the data with a database, and displays a screen on the display unit of the portable device. Thus, the user can perform various types of input and viewing from the portable device 2.

Incidentally, it is needless to say that the software configuration shown in the above FIGS. 12 and 13 for example, the memory map shown in FIG. 14, etc., and be applied to other information processing devices, PCs, EWS, and the like, and is by no means restricted to portable devices.

Second Embodiment

Next, description will be made regarding a second embodiment of the display device according to the present invention with reference to FIGS. 23 through 32. Incidentally, detailed description of configurations that are the same as the above-described first embodiment will be omitted. With the present embodiment, the display screen is configured as shown in FIGS. 23A and 23B.

The portable device 300 according to the present embodiment 300 has an operating unit 301 comprised of a cursor button 301A which is an oval rugby-ball-shaped rotational input unit, a tab switch 301B, an option button 301C, and a recording button 310B.

The cursor button 301A is comprised so as to be capable of three types of operation: rotating operation wherein the cursor button is rotated in a q direction with the vertical axis Y in FIG. 23B as the center, a raising operation wherein the cursor button is raised in the direction of the arrow P following having been pressed in the direction of the arrow O, and a depressing operation wherein the cursor button is pressed in the direction of the arrow Q following having been pressed in the direction of the arrow O.

Also, the tab switch 301B is configured so that it can be pressed upwards in a direction vertical to the plane of the Figure.

FIG. 23A shows the state of the initial screen 310 (default view) after the power has been turned on. This initial screen 310 displays a day-of-the-week display area 310A which displays the current day of the week toward the top of the display unit 302, a time display area 310B which displays the current time toward the middle thereof, and a date display area 310C which displays the current date toward the bottom thereof.

As shown in FIG. 23A, after turning the power on the initial screen 310 is first displayed on the display unit 302, and then the schedule display mode 320A as shown in FIG. 23*b* which serves as the main screen is displayed by operation of the operating unit 301B.

The schedule display mode 320A is comprised of a date display area 330 at the very top of the display screen and vertical lines representing a certain time axis, and has a schedule display area 340 which serves as a calendar, a time axis display area 350A which indicates time increments of the schedule display area 340, and an icon display area 360 at the very bottom of the display screen.

Formed at the very bottom of this date display area 330 is a black bar 334 which is an arrow representing the current time on the schedule display area 340, serving as a cursor.

The background screen area which represents the past time area with the vertical line 344 of the time axis pointed to by this black bar 334 as the border thereof is displayed as a background screen color display area 342, colored gray, for example.

Also, the schedule display area 340 has a schedule icon 346 relating to a certain planned time, and operating the schedule icon 346 allows the user to view a lower order menu.

Also, a schedule/no schedule colored area 352 which is a colored representation on the time axis corresponding to the schedule icon 346 is formed in the dime axis display area 350. In FIG. 23B, the schedule icon 346 is formed from 9:00 to 12:00, so the time area from 9:00 to 12:00 is colored in the schedule/no schedule colored area 352 as well, so that whether or not there is a plan scheduled can be understood at a glance. Thus, the user can easily visually find the current schedule.

Displayed in the icon display area 360 is a microphone icon 362 which represents that a voice memo has been recorded, and an envelope icon 264 which indicates that a message has been received in the mailbox. Operating these icons in the same manner as with the schedule icon 346 allows lower order menu voice mail and e-mail to be listened to and viewed.

Pressing the tab switch 301B allows the user to switch the time axis of the schedule display mode 320A between a 6-hour mode, 12 hour mode, 1-week mode, and 1-month mode, and can zoom in (enlarged display) on each mode. Also, the user can zoom out (reduced display) by raising the tab switch 301B. FIG. 23B shows the 1-hour mode, FIG. 26A the 12 hour mode, and FIG. 26B the 1-week mode.

In FIG. 27A, pressing the cursor button downwards switches from the schedule display mode to the memo mode. That is, by a depressing operation of the cursor button 360A, the date display area 330 jumps downwards to the icon area 360. Then, rotating the cursor button 301A moves to the position of the desired icon, and once the cursor is moved to the position of the microphone icon 362A, pressing the tab switch 301B allows the user to listen to the recorded contents via the voice output unit.

Next, in the event that this recording information is to be included in the schedule display area 340, the microphone icon is raised by a raising operation of the tab switch 301B as shown in FIG. 27C, so as to bring the microphone icon into contact with the black bar 334. Then, a raising operation of the tab switch 301B as shown in FIG. 28A raises the date display area 330 as shown in FIG. 28B. Subsequently, rotating the cursor button 301A moves the microphone icon 362A to the desired time, e.g., 6:00 PM. Then, the microphone icon 362A breaks away from the cursor by means of depressing the tab switch 301B, and the microphone icon 362A is pasted on the schedule display area 340, thereby completing assembling thereof into the time axis.

Further, as shown in FIG. 29A, operating the option button 301C once allows the user to switch between modes, and pressing it again returns the mode to the normal mode (schedule display mode).

In the present embodiment, the system is switched to a database mod such as shown in FIG. 29B. Here, the database mode 400 is classified into two categories; "Clients" 410, "Vendors" 411, "Personal" 412, and "Setting" 413. Incidentally, the "Setting" mode is for adjusting the time and for performing other various adjustments.

The black bar is moved in the horizontal direction by operating the cursor button 301A, one of the categories is selected, and as shown in FIG. 29C, the "Clients" list is selected by operation of the tab switch 301B. This displays a screen such as shown in FIG. 30A. Rotating the cursor button 301A moves the selection bar in the horizontal direction, and an initial, e.g., K, is selected.

Then, a virtual cursor which can be moved vertically is displayed to the side of the name list as shown in FIG. 30B, and a desired name can be selected by raising or depressing the cursor button 301A. When the cursor reaches the edge of the cursor display portion 302, the list is automatically scrolled.

Information obtained by the name shown in FIG. 30C can then be viewed by means of operating the tab switch 301B. Subsequently, desired information can be searched for by raising or depressing the cursor button 301A which moves the cursor vertically, thereby scrolling the information.

Also, when e-mail is received, a notification window such as shown in FIG. 25C is displayed. This notification window can display the photograph and name of the sender, and the time of transmission.

In the event that the information is not urgent, notification is not performed, and the envelope icon 364 is pasted. Subsequently, the user can view the contents by selecting the icon 364.

Further, in the event of recording a voice memo, operating the recording button 301D allows the user to make a recording during the period in which the display screen shown in FIG. 31 is being displayed.

Then, in the schedule display mode in FIG. 23B, scrolling in the same direction as the time axis direction can be performed by rotational operating of the cursor button 301A. Known arrangements have had a problem in the case that the user wears an arm-worn portable device such as a wristwatch on the arm and attempts to operate the operating unit, in that position specification of the cursor or scrolling on the screen could not be performed well due to the direction in which the device is worn and to the size of the operating unit. Conversely, with the present embodiment, the operating unit is configured so as to be rotatable in the same direction as the scrolling direction, so user operability improves.

Also, in the case that a mouse or TrackPoint which allows the cursor to move in all direction is used, the cursor tends to become unstable and actually more inaccurate in the pointing precision thereof. Conversely, with the present invention, the cursor can only be moved along one axial direction, so movement can be made in a sure and precise manner. In addition, rotating operation along this single axial direction allows faster movement while retaining stability by using centrifugal force generated at the time of rotation and also inertia thereof. Accordingly, performing rotational operation enables precise pointing and high-speed movement by the cursor in the horizontal direction, and the execution of operation and the response on the screen thereto are univocally defined, so an interface which is easy to understand can be realized.

Also, the present embodiment has a function for displaying data outside of the display frame (catch-net metaphor). Memos (or objects) pasted to the time axis move as the time axis moves according to the passing of time. However, even in the event that the time to which the memo is pasted passes off of the screen, necessary memos remain outside of the frame without disappearing.

In such cases, a dedicated catch-net area is provided across the left portion of the display unit 302 that represents past time, and data that has run off of the time axis is pasted there. That is, the catch-net area displays on the time axis display area icon information which would be lost owing to passage of time.

The display processing of this catch-net area is carried out as illustrated in the flowchart shown in FIG. 21C.

That is, at the time of performing updating processing for moving the time axis, judgment is made whether or not an icon has been entered into the catch-net area (S70). In the event that such is confirmed, the icon is displayed in a layered manner or otherwise in the catch-net area, regardless of the time axis (S71). Otherwise, icons are displayed according to the normal time axis. Then, icons within the catch-net area are deleted from the display screen on the catch-net area K hours after the schedule of the schedule icon occurs (i.e., in the event that the difference between the schedule input time and the current time exceeds K hours) (S72). Thus, icons can be deleted once a certain K number of hours passes.

FIG. 24 shows a hierarchical structure of the screen display such as described above. The user can switch between the database display mode and the schedule mode using the operating unit.

FIGS. 25A through 25C show the screen being scrolled and also zoomed. In the case of performing this scrolling processing, first, the cursor button 301A which is an oval rugby-ball-shaped rotational input unit is rotated (S100), and the direction of rotation is determined by process A (S101).

That is, in process A in S101, first, judgment is made whether the direction of rotation was to the left or to the right. In the event that the direction of rotation was to the left, the amount of rotation to the left, e.g., angle of rotation or number of rotations, is detected (S111a). Next, the amount of scrolling movement on the display screen as to the amount or rotation detected is calculated using a rotation amount/scrolling movement amount conversion table or the like (S112a). Subsequently, display processing of the display screen at the display unit, i.e., updating of the display screen, is performed according to the amount of scrolling movement calculated (S113a). Thus, the flow reaches the display screen scrolling process (S102).

Regarding the updating processing of the display screen relating to this scrolling processing, in the event that the amount X by which the screen moves horizontally due to scrolling is smaller than the horizontal size X1 of the display screen, it is preferable that the display area X1-X which does not need to be updated is temporarily held and the display image is retained, and updating processing is performed wherein only the newly-displayed area X is added. This facilitates improvement in the processing speed when scrolling.

Also, in the event that the direction of rotation was to the right, processing the same as S111a through S113a is performed, as shown in S111b through S113b. In S112b, a dedicated rotation amount/scrolling movement amount conversion table is provided for left rotation, but may be shared with one for right rotation.

Then, display processing relating to scrolling processing is conducted (S102). Subsequently, confirmation is made whether or not the rotation of the cursor button 301A has stopped (S103), and processing B is conducted (S104).

In addition to scrolling processing of the display screen by rotation processing, the cursor button 301A of the operating unit in the present embodiment can also perform enlarging/reducing processing by being pressed upwards or downwards, or movement processing of the black bar (cursor) in vertical directions. Accordingly, the following processing B can also be carried out thereby.

In processing B in S104, as shown in FIG. 32C, in the event that there has been operation of pressing the cursor button 301A downwards or upwards (S120), judgment is made regarding whether an upwards pressing operation or downwards pressing operation has been conducted (S121). In the event that there has been no operation, processing B ends. In the event that operation of pressing the cursor button upwards is detected, display processing for enlarging the lower display area is conducted (S122). In the event that operation of pressing the cursor button downwards is detected (S123), display processing for enlarging the upper display area is conducted (S124). Then, in the event of ending the enlarged display, processing B is ended; in the event that enlarged display is to be continued, the steps from S121 are repeated (S125).

Thus, according to the second embodiment, the system can tidy and manage the contents of created or received display data on the display screen in the time axis at that point in time. Accordingly, the need for a complicated hierarchical structure is done away with, and the data can be searched with time as the key.

Also, by means of intentionally moving the data onto a time axis, the data can be used as a list or schedule. Further, the time axis moves according to the passage of time, so the relative relation in time of the events and the like currently in interest can be understood well.

Also, the representation of the time axis, i.e., the past and future, can be identified by the display color (or monochrome inversion), so the current position is represented by the border between the two display colors. Accordingly, the user can tell at a glance whether an event is in the past, future, or the present.

Also, adjustment of the time scale (zooming) and each digit of the time axis (hierarchy of month, week, day, time, etc.) can be zoomed in on or out of separately by each hierarchy. Enlarging/reducing of the display contents synchronized with the time scale can be performed. The area of data display is automatically changed according to the zoom scale (5-hour, 12-hour, or 1-week schedule).

Fine data accompanying each schedule may be visible in the event that the time axis scale is enlarged, or not visible in the event that the time axis scale is reduced. Even in the event that the time axis is reduced, the overall degree of how crowded the schedule is can be told by the volume of the schedule being represented by area.

Incidentally, in the above embodiment, a table was provided whereby the control relation between the rotation input portion and the scrolling is something like three rotations move the screen by several centimeters, but an arrangement may be used wherein rotation angle detecting means are connected to the CPU, a rotation amount/horizontal direction movement conversion table defining the correlation between the rotational angle and the amount of horizontal movement is stored in the storage unit, and the CPU functions as the rotation amount/horizontal direction movement control means.

Third Embodiment

Next, a third embodiment of the display device according to the present invention will be described with reference to FIGS. 33 through 43. Configurations the same as those in the above first and second embodiments will be denoted with the same reference numerals, and detailed description thereof will be omitted. The present embodiment is configured as shown in FIGS. 36A and 36B.

In the Figures, the portable device according to the present embodiment has an operating unit consisting of a stem 501A which is a rotational input unit, a zoom-in button above the stem 501A, a zoom-out button above the display unit, and a recording button 501E.

The stem 501A is capable of two operations: rotation in the direction of the arrows R and S in FIG. 36; and pressing and pulling in the direction of T. This rotating operation moves the cursor vertically (in the U and V directions), and when the cursor moves to the top or bottom edge of the screen, the screen can be scrolled upwards (U) or downwards (V).

The zoom-in button 501B is for switching within modes within the schedule display mode, i.e., the 5-hour mode, 12-hour mode, 1-week mode, 1-month mode, and 1-year mode. Also, the zoom-in button 501C is for making icon selection and displaying the lower order menu screen. Pressing the zoom-in button 501B and the zoom-in button 501C together returns the screen to the 1-day 5-hour schedule display mode, regardless of the current screen.

In the 1-week mode in the schedule display mode, only the e-mail icon 560 and voice memo icon 550 are placed on the time axis, and details of the schedule are not displayed. Accordingly, in order to find a schedule time span wherein a certain plan has been scheduled, first, as shown in FIG. 36D, the cursor is set on the week to which the user wants to zoom in to in the 1-month mode of the schedule display mode, and the screen is enlarged using the zoom-in button 501B. In the same way, as shown in FIG. 36C, the day which the user wants to zoom in on in the 1-week mode of the schedule display mode is selected, and the desired plan can be searched.

In FIG. 33B, the schedule display mode serving as the main screen is split into the following areas, from the left: plan date display area 512; time axis display area 520; schedule display area 530; and current time display area 516. The time axis and schedule are arranged such that the upper side of the screen represents the future and the bottom side thereof represents the past, with the border of the two representing the current time, and the background screen below the border line is colored and displayed, with a color such as gray.

Toward the bottom of the display unit 503 are formed the voice memo icon 550 and e-mail icon 560 which represents accumulation, displayed toward the top of the display unit 503 are ToDo icons 536A through D, and displayed in the schedule display area is the schedule icon 534.

The ToDo icon 536 represents an item which must be carried out yet, so it is displayed at the upper right which represents the future. The size of the ToDo icon indicates the importance and urgency of each item. These icons are arrayed from the left in the order of how old they are.

A characteristic of this display screen is that when the time for completing a schedule draws near, the icon information, e.g., the schedule icon 534 shown in FIG. 33B, the TO-DO list icon 536A and so forth, are displayed at a larger size. Also, the voice memo icon 550A is displayed at a larger size in the event that the time of recording is long, so that the user can remember the contents thereof just by the size.

Also, the e-mail icons 560 are displayed in an accumulated manner so as to include the superimposed area, and icons of the same type are displayed one upon another while being sequentially shifted downwards, thereby enabling display of a great number of icons. Thus, the user can get a general idea of the number of e-mails and the like by the degree of how many icons are layered. Incidentally, the number of icons layered is represented as a great number when the number thereof exceeds a certain number.

Selecting the ToDo icon 536 and opening a window brings up a display screen such as shown in FIG. 39A. Selection is made between "DONE" 538A and "NOTYET" 538B by pressing or pulling the stem 501A, and making a selection with the zoom-in button 501B. In the event that the DONE tab 538A is selected, a check mark 589 such as shown in FIG. 39B is displayed, and means for displaying an explosion of the window (dialog box) is provided, thereby giving the user the satisfaction of carrying out the ToDo.

The voice memo icon 550 is something that has been created already, so it is arrayed and displayed at the lower right of the screen which represents the past.

Selecting the voice memo icon 550 by operation of the zoom-in button 501B and opening a window brings up a bar graph with the date, time, and recording time for creation (recording) of the memo displayed toward the top, as shown in FIG. 40A. The user can use this as a hint to remember the contents of the memo without actually replaying it.

Icons "Discard" 552A, "Play" 552B, and "Move to time axis" 552C are displayed toward the bottom, indicating options for processing the memo.

The stem 501A is pressed or pulled to invert the desired icon, and pressing the zoom-in button 501B which has selection functions selects the process. In the event that the memo is not to be processed in any way, pressing the zoom-out button 501C which has cancel functions closes the window.

In the event that "Move to time axis" 552C is selected, the voice memo icon 550a is captured by the cursor and blinks. The icon is dragged to the desired time by rotating the stem 501A, and pasted onto the time axis by pressing the stem 501A.

At this time, pressing the zoom-in button 501B displays the window, the time and date to be set is confirmed, and following setting of the notifying means such as the sound of the alarm, beep, vibration, etc., the voice memo icon 550c is placed on the schedule (FIG. 40B).

Incidentally, the notifying means is comprised of a first notifying unit which notifies the user of the present state, a second notifying unit which performs notification according to the contents of the information, and a third notifying unit which performs notification according to the importance and urgency of the item to be notified, with the user being able to switch between these three. For example, in the event that the user is sleeping, the user is notified of mail arriving by a gentle blinking, during meetings the user is notified with vibrations instead of sound, the user is notified by his/her own name being called, and so forth. Examples of other notifying means are: a sound changing unit for notifying by sound, an audio changing unit, vibration generating unit, smell generating unit, light generating unit, electricity generating unit for generating an electric shock, and so forth.

In the event of recording a voice memo, pressing the recording button 502 opens a window such as shown in FIG. 42A, creating a recording stand-by state. The user can recording in this state. When the device catches a voice, the "RECORD" screen 622 blinks as shown in FIG. 42B, indicating that recording is in progress, and the time elapsed during recording is displayed by the bar. When the user stops talking, the recording automatically ends, and the window 624 of the next lower layer menu opens.

This window 642 displays the date, time, and recording time of the recording as shown in FIG. 42C, and the user selects one of the processes "Delete" 626A, "Play" 626B, and "Move to time axis" 626C by pressing and pulling of the stem 501A and operating of the zoom-in button 501B. Pressing the zoom-out button 501C returns the screen to the schedule display screen.

In the event that e-mail is received by the desktop or notebook PC, or a server, information to that extent is notified to the present portable device 2, as well. More specifically, as shown in FIG. 41A, a blinking e-mail icon 560 is automatically displayed at the position of the current time, as shown in FIG. 41A. Operating of the zoom-in button 501B displays a window 561 of a lower order menu having the heading of the mail type such as "URGENT" 561B, "R.S.V.P.", etc., and the photograph 561A of the sender and a summary of the contents of the message 561C are displayed within the window 561.

Further pressing the zoom-in button 501B in this state displays a lower order menu screen 562 shown in FIG. 41B, and the reception time, date, and name of sender are displayed to the upper portion of the window 562. Options for the processing to be executed for this icon, "Opened" 563B or "Move to time axis" 563A are selected from the icons displayed toward the bottom. The option "Move to time axis" can be set such that notification is made when the time comes.

Also, these icons can be incorporated into the timeframe of the schedule, by freely pasting onto the time axis. For example, in the example shown in FIG. 40C, a voice memo icon 550B is placed beside the time axis, as well.

Further, in the present embodiment, the voice memo icon 550, e-mail icon 560 are placed on the time axis in the form of input time, reception time, etc., but those in the past that is already off the display are gathered to the lower area of the schedule display area and displayed in the catch-net metaphor.

FIG. 38 shows the sleep mode state which is the initial screen following turning the power on. In this sleep mode, the area which displays the current time 518 toward the bottom is enlarged, and covers the screen like an eyelid. A battery level display is added to this portion. Also, the configuration at this time may be to completely close this portion, or to display only a scale wherein two hours for example of the schedule is visible. In the case of the latter, the schedule can be confirmed even in the event that the main screen is not brought up. Forming such a sleep mode darkens the screen, and the contents of the schedule are not easily seen by others. The schedule display area is darkened out for security purposes. However, the various icons can be displayed, to check whether or not there is a plan scheduled. The bar graph to the right indicates the battery charge level.

As with a screen saver, operating any of the switches brings up the schedule display mode shown in FIG. 36. In the event that there is no operation at the operating unit for a certain amount of time, the mode returns to the sleep mode again.

(Scrolling)

As shown in FIG. 38, the screen is scrolled by rotating the stem. Here, the rotation of the stem and the speed of scrolling are made to match.

Now, in order to scroll, first, the stem is rotated as shown in FIG. 43A (S130), and the direction of rotation is determined by the processing A (S131).

That is, with the processing A of S131, in the event that the direction of rotation is upwards, first, judgment is made whether the direction of rotation is upwards or downwards (S140). In the event that the direction of rotation is upwards, the amount of rotation upwards, e.g., angle of rotation or number of rotations, is detected (S141a). Next, the amount of scrolling movement on the display screen as to the amount or rotation detected is calculated using a rotation amount/scrolling movement amount conversion table or the like provided in the storage unit beforehand (S142a). Subsequently, display processing of the display screen at the display unit, i.e., updating of the display screen, is performed according to the amount of scrolling movement calculated (S143a). Thus, the flow reaches the display screen scrolling process (S132).

Regarding the updating processing of the display screen relating to this scrolling processing, in the event that the amount Y by which the screen moves upwards due to scrolling is smaller than the horizontal size Y1 of the display screen, it is preferable that the display area Y1-Y which does not need to be updated is temporarily held and the display image is retained, and updating processing is performed wherein only the newly-displayed area Y is added. This facilitates improvement in the processing speed when scrolling. Also, in the event that the direction of rotation was downwards, processing the same as S141a through S143a is performed, as shown in S141b through S143b. In S142b, a dedicated rotation amount/scrolling movement amount conversion table is provided for downwards rotation, but may be shared with one for upwards rotation.

Then, display processing relating to scrolling processing is conducted (S132). Subsequently, confirmation is made whether or not the rotation of the stem 501A has stopped (S133), and processing B is conducted (S134).

In addition to scrolling processing of the display screen by rotation operating, the stem 501A of the operating unit in the present embodiment can also perform horizontal movement processing of the cursor by being pressed in or out. Accordingly, the following processing B can also be carried out thereby.

In processing B in S134, as shown in FIG. 43C, judgment is made regarding whether there has been operation of pressing the stem 501A in or out. In the event that there has been no operation, processing B ends. In the event that operation is detected, the amount of movement of the stem 501a is detected (S151). Next, the amount of movement of the cursor is calculated based on the amount of movement of the stem 501A using a corresponding table (S152). Thus, cursor movement processing is carried out (S153). Subsequently, various types of display processing such as clicking or dragging with the cursor are performed (S154), and judgment is made whether or not further cursor movement is necessary (S155). In S155, in the event that such movement is necessary, processing is repeated from S150, and in the event that there is no need for movement in S155, processing B is ended.

Now, when scrolling, the scale of the schedule can be switched between 5 hours, 12 hours, 1 week, and 1 month, as shown in FIGS. 36A through 36D. Thus, according to the size of the scale, the date, time axis, balance of schedule display area, and particularly the width of time axis (width of the time axis display area) are reduced in the order of G1->G2->G3->G4, The width of the schedule/no schedule colored area 522 is reduced in the order of H1->H2, and the plan date display area 512 is enlarged in the order of F1->F2->F3->F4, so the time scale can be visually understood. Incidentally, the number of display fonts and the font size in the heading of the schedule are changed according to the scale.

Also, in the event that the first information of the lower order hierarchy of an item in the schedule has related information such as an address or the like stored within the portable device, this is automatically recognized and the first information and the related information are correlated, and the heading for this related information is displayed in the item space in the aforementioned schedule.

(Database)

Selecting the function button 501D switches to the database mode, and the database menu screen 572 such as shown in FIG. 37A is displayed. Displayed in this database menu screen 572 are five categories, namely, "PEOPLE" 572A, "OFFICE" 572B, "PROJECT" 572C, SYNCHRONIZE" 572D, and "PREFERENCE" 572E. The stem 501A is rotated to invert the desired category ("OFFICE" 572B in the example shown in FIG. 37A), the stem 501A is pulled to select the category, whereby the system moves to the hierarchical layer of a lower order. Then, as shown in FIG. 37B, an lower order initials selecting screen 584 displaying the list of names in alphabetical order is brought up from the right side of the screen as shown in FIG. 37B, and the menu selection area 582 which displays the higher order hierarchical categories is shunted to the left.

Further, in the initials selecting screen 584, the desired initial is inverted by rotating the stem 501A ("G" in the example shown in FIG. 37B), which is selected by pulling the stem 501A, and the system moves to the lower order hierarchical layer.

Now, in order to generate a display screen such as shown in FIG. 37B, means such as described below are preferred. That is, generally, an screen over which the cursor can move is a meaningful screen, and an area over which the cursor cannot move is a meaningless screen, so in FIG. 37B, the screen other than the initials selecting are 584 is displayed as the background screen. The initials selecting are 584 is sequentially updated according to scrolling by the operating unit, and rotating the stem in the order of A, B, C, D, and so forth goes on to bring up G, then H, and so forth. Here, only the portion of "G" is displayed.

Then, in the screen after G has been selected, for example, the entire display screen is updated and becomes a different display screen which is selected and shunted width-wise to the left side, as shown in FIG. 37C. Here, the menu selection area 582 is not re-written, but other areas are re-written.

Incidentally, the configuration is such that the data is arrayed according to the hierarchical structure beforehand, so the trouble of sorting and extracting random data each time a search is to be conducted can be done away with, simplifying control. Accordingly, it is preferable that the data all be arrayed in alphabetical order.

At the layer shown in FIG. 37C, a name selecting screen 590 wherein the name list is in alphabetical order is displayed.

At this name selecting screen 590, the menu selecting area 582 and the initials selecting are 584 are further shunted to the left. In this name selecting area 590, the stem 501A is rotated to invert the desired:name, and selection is made by pulling the stem 501A. This brings up the personal data display screen 600 which is at the bottommost hierarchy, as shown in FIG. 37D.

In the personal data display screen 600, the menu selecting area 582, the initials selecting area 584, and the name selecting area 590 are further shunted to the left. In the personal data display area 608 of this personal data display screen 600, the photograph 610, name 612A, telephone number 612B, and address 612C are displayed.

In the present embodiment, the category "PEOPLE" 572A has the hierarchy of: menu screen ->initials selecting screen 580->name selecting screen 590->personal data display screen 600.

Then, the lower hierarchical layers appear from the right in sequential order, That is, as shown in FIG. 37B through 37D, the width of the menu selecting area 582 narrows the lower the hierarchy is displayed, in the order of L1->L2->L3, and width of the initials selecting area 584 also narrows the lower the hierarchy is displayed, in the order of M1->M2->M3. Thus, the hierarchical layers of data are arrayed sideways, the items therein are arrayed vertically, and movement between the hierarchies is performed by pressing the stem 501A, while selection within the same hierarchical layer is performed by rotating the stem 501A.

Accordingly, all hierarchical layers above the presently displayed hierarchical layer are displayed at the top of a single screen regardless of what hierarchical layer the system is at, so the hierarchical structure of data is easily understood, and ease of chancing to other hierarchical data is facilitated. Also, the direction of the hierarchical structure of the data is made to be the same direction as the operating direction for selecting the hierarchy, defining the operating direction for selection univocally, thereby realizing an easily-understood interface.

Incidentally, in the above embodiment, a table was provided whereby the control relation between the rotation input portion and the scrolling is something like three rotations move the screen by several centimeters, but an arrangement may be used wherein rotation angle detecting means, horizontal movement detecting means, and rotation angle speed detecting means are connected to the CPU, a rotation angle/vertical direction movement conversion table defining the correlation between the rotational angle and the amount of vertical movement, a stem horizontal movement amount/cursor movement amount conversion table defining the correlation between the amount of movement of the stem to the right or left and the amount of movement of the cursor, and a rotation angle speed/enlarging-reducing conversion table defining the correlation between the rotation angle speed of the stem and enlarging or reducing, are stored in the storage unit, so that the CPU functions as the rotation amount/vertical direction movement control means, the stem movement amount/cursor movement amount conversion control means, and the rotation angle speed/enlarging-reducing conversion control means.

The icons increase in size when the importance and degree of urgency increase, for example. Also, the icons increase in size when the time for completing a schedule draws near. Further, the longer the recording time is the large the icon is, so the use can remember the contents simply by the size of the icon.

Fourth Embodiment

Next, a fourth embodiment of the display device according to the present invention will be described with reference to FIGS. 44 through 51. Configurations the same as those in the above first, second, and third embodiments will be denoted with the same reference numerals, and detailed description thereof will be omitted. The present embodiment is configured as shown in FIG. 44.

The portable device 700 according to the present invention is comprised as a card-type portable device capable of handling handwriting input. Accordingly, the hardware configuration is different from that described in the above first through third embodiments, in that the configuration of the block diagram shown in FIG. 5 is added, the system has a pen input operating unit, and further the CPU has recognizing means for recognizing characters and shapes input by the pen; the various types of processing are carried out based on the recognition results. The storage unit includes, in addition to the above-described RAM and ROM, nonvolatile memory cards detachable form the portable device, PCM-CIA cards, ID cards specialized for the present portable device, and so forth. Also, text data may be input from the operating unit.

The display unit has an active matrix type liquid display panel having the functions of both an image display and an electrostatic induction tablet, a coordinates detecting circuit for detecting the coordinates at the tip of the pen input operating unit on the display panel based on signals received from the pen input operating unit, and a control circuit controlling the image display action and coordinates detecting action.

The pen input operating unit is linked to line electrodes and column electrodes on the display panel by a floating capacity and has an area detection electrode with high input impedance, so that induction voltage is inducted at the above detecting electrode owing to scanning pulses applied to the line electrodes or scanning pulses applied to the column electrodes. The coordinates detecting circuit detects the timing of generation of induction voltage generated at the detecting electrode of the pen input operating unit based on the coordinates detecting timing signals form the control circuit, thereby detecting the tip coordinates.

Also, switching can be performed between: a function which has instruction judging means for judging the contents of the processing menu pointed to by the pen input unit from the menu displayed on the display screen; and a function which has recognizing means for recognizing letters and shapes input by the pen and performs various processing according to the recognition results.

Incidentally, in the event that the pen input operating unit and the portable device are not connected by a cable, it is preferable that the arrangement be such that the pen input operating unit contain of signal generating code information sending unit and the like which sends code information and position pointing signals based on an information collecting unit, code information generating unit, temporary storage unit, position detecting unit, and operating instructions from the user, thereby enabling handwriting input and bar code input with a single penshaped shaped coordinates pointing device, and the display unit should be configured so as to have a matrix sensing unit, position detecting unit (pointing coordinates sensing unit), code information extracting unit, and a position detecting unit.

Accordingly, the portable device 700 according to the present embodiment has a pen input operating unit 703 and operating buttons 0 through 9 as an operating unit.

FIG. 44 shows a layout of the screen configuration of the main screen. As shown in the Figure, the display area has date display area 710 for displaying the current time and date at the top of the display unit 706, an e-mail display area 720, a schedule display area 730, and a database display area 740.

The date display area 710 displays the date as "AM 10:05:59 Thursday Oct. 12" 701, for example. The e-mail display area 720 is positioned at the distant side of the time axis based on the image that mail arrives from afar, and the sender mailbox icon 721 and the number therein, the sending mailbox icon 722 and the number therein, the receiving mailbox icon 723 and the number therein, and the opened mailbox icon 724 and the number therein, are displayed.

The schedule display area 730 is displayed based on a time axis display area 733 with a perspective view following a landscape metaphor, with schedules displayed to the right side as building icons 736 and 737, and ToDo lists displayed to the left as billboards 738.

The time axis of the time axis display area 733 represents time flow wherein the front is close to the present, and the distant side represents the future. Thus, the GUI is configured of the time axis is positioned as a road viewed from above, and objects placed near the road. In the present embodiment, for example, the road serves as a time axis, the buildings as schedules, the billboards as ToDos, and manholes as memos. Also, a schedule/no schedule colored area 734 which colors the areas with plans scheduled is formed, and a background screen colored display area 732 wherein the past area is colored with the present time as the center is also formed.

The road serving as the time axis is drawn to have perception of depth, so things in the distance (future) are small, and when the present time gradually approaches that time the objects are more clearly visible, and user can recognize the general contents.

Schedules are displayed to the right of the road in the form of buildings, and TODO lists are displayed to the left side as billboards, and the user operates the change-direction icons 744 and 745 which serve as change-field-of-view buttons switches the view of the user to one side or the other, thereby entering one of the function modes.

The building icons 736 and 737 are of 3-D animation icons of a plurality of types with-differing forms and attributes. The type of building represents the type of plan, and the meaning of the schedule that is has differs. In the present embodiment, office buildings 736a represent official plans, and houses 737 represent private plans.

The billboard icons 738 are fixed at a certain point in the road (time), and are represented as billboard icons 738A that have signposts driven into the ground, representing data that is related to the time, and billboard icons 738B that are floating in the air, representing data that is not related to the time. Also, the past area on the time axis display area 733 has a manhole icon 739 for writing a memo thereto. Also, the portion representing the past in the time axis is darkened out so the current point in time is easily identified.

Further, scrolling changes the perspective view of the road to change the scale (1 day/1 week) for viewing the schedule, so that distant items are compressed, and displayed as a bird's-eye view. That is, the scrolling operation increases the scale of the time axis and displays the screen in a reduced manner, and the 3-D point of view is correspondingly raised gradually, so that a bird's-eye view mode 850 is generated when reduced as the display with a view from above shown in FIG. 46A. In this case, the time axis display area 852 is a time axis in increments of days, and the icons in the schedule display area 854 are formed small. Incidentally, the length of the small icons in the direction intersecting the time axis at right angles represents how crowded the schedule is that day.

Now, in order to generate such a display screen, the type of building is changed according to the information by means of having separate characters and changing the bitmap image according to time. Incidentally, in the event that fine control is not to be executed, the road portion is replaced with numbers.

Also, the display of the bird's-eye view should be arranged so that the position of each icon is determined according to the start time information at the head of the schedule and information relating to the length thereof, and a character is selected from the several types available and pasted onto the time axis.

In this case, a case wherein the schedule is in ten minute increments and there is a great number of characters would place a great burden on processing, it is preferable to restrict the number of types. For example, in the event that a cube-shaped character serves as a building icon, it is preferable that forming means be employed wherein only the right side and left side of the cube are stored as pictures, and the area between the right side and left side are connected with lines based on the starting time and ending time, so as to form only a dot data shadow.

The database display area 740 to the lower portion of the display unit 706 serves as a personal database, and has a telephone book icon 741, an icon 743 for scrolling toward the future on the time axis, an icon 742 for scrolling toward the past on the time axis, a change-direction icon 744 for changing directions to a two dimensional view so that the building icons 736a are viewed from the front, and a change-direction icon 745 for changing directions to a two dimensional view so that the billboard icons 738 are viewed from the front.

The scale can be switched in the order of increments of months, increments of weeks, and increments of days, by the scale switching buttons 704A, 704B, and 704C, positioned on the side of the card. The image is that increments of days is a view from a position near the ground, increments of weeks is a bird's-eye view, and increments of months, is viewing the town from a satellite and then zooming in.

FIG. 51D shows the display in the increment of months. This display in the increment of months, unlike the display in the increment of days or weeks, is arranged so that the top of the display represents near the present time and the bottom of the display unit represents the future. This bar graph represents the total amount of schedules for the day.

Then, as shown in FIG. 51E, continually touching the scroll icon scrolls the time axis, and removing the pen stops the scrolling.

In FIG. 51F, the area for November 14 (844), for example, is double-touched. This switches the time axis to a time axis in the increment of days for that day. As shown in FIG. 50A, further double-touching on the building 736 displays the contents of the schedule as shown in FIG. 50B. Now, in order to change the schedule form November 14, the building on the time axis is dragged to the desired position, as shown in FIG. 50C.

As shown in FIG. 51A, mail is opened from the received mail by double-touching on the received mail displayed in the list. In this window, the name of the sender and the heading are listed. Double-touching on the desired mail displays a lower order menu window such as shown in FIG. 54B.

Now, as shown in FIG. 51D, touching the time display area at the top of the display area returns to the time axis display mode of the present time.

Or, in the case of simply closing, double-touching on the close box to the upper left closes it.

As shown in FIG. 50D, touching any key on the keyboard with the pen input operating unit 703 opens a memo input screen in the memo mode as shown in FIG. 50E. Of the icons positioned at the uppermost portion of the memo input screen window (in the title bar of the memo screen), the schedule input format selection icon 786 is selected with the pen input operating unit 703, and double touched.

This brings up the schedule display screen 790 as shown in FIG. 50F. In this schedule display screen 790, the time is set by tracing the scale within the screen with the pen input operating unit 703. In the case that a name is input, an icon indicating the data is displayed behind the name in the event that there is related data in the database.

Also, alarm/no alarm is set with the alarm/no alarm icon 796. Further, the type of building is selected from one of the building icons 794A through 794D.

Closing the input screen for inputting the above schedule automatically pastes the building icon 736 representing the schedule on the time axis, as shown in FIG. 49A.

Next, in the case of creating e-mail, the memo input screen 780 is opened in the memo mode, as shown in FIG. 49B. Of the icons positioned at the uppermost portion of the memo input screen window (in the title bar of the memo screen), the mail input format selection icon 782 is selected with the pen input operating unit 703, and double touched.

This brings up the e-mail display screen 800 as shown in FIG. 49C. In this e-mail display screen 800, input is made from the keyboard. In the case that a name is input, the e-mail address is automatically pulled up from the database, and displayed within the e-mail display screen 800. After the e-mail has been created using the keyboard, double-touching the close-box icon 802 positioned at the left of the title bar which is at the top of the e-mail display screen 800 closes the e-mail display screen 800.

Once the e-mail has been created and closed, the e-mail is stored in the sending mailbox icon 722, and when a card included in the present portable device is connected to a telephone line, the e-mail is automatically sent.

Next, in order to create an item for a reminder of something to do in the future (a ToDo list), the pen input unit 703 is touched against the keyboard, as shown in FIG. 49D. This opens a memo input screen 780 in the memo mode. Of the icons positioned at the uppermost portion of the memo input screen window (in the title bar of the memo screen), the TODO list input format selection icon 784 is selected with the pen input operating unit 703, and double touched. Incidentally, touching the Reply button switches to the reply mail creating screen.

This brings up the TODO list display screen 810 as shown in FIG. 49F. In this TODO list display screen 810, handwriting ink data input is made within the handwriting area 812 within this TODO list display screen 810, using the pen input operating unit 703.

In FIG. 49F, there is handwritten input stating "BUY WINE". In this case, the display character is not a font such as Mincho or Gothic, but handwriting font data. Though not shown in the Figure, in the event that the input is made as text data from the keyboard, font data such as Mincho or Gothic is displayed within the handwriting area 812.

When characters are input to this handwriting area 812, this area is pasted on the time axis without change.

Also, there are two types of TODO lists; ToDo lists which are on the time axis, and ToDo lists which are not on the time axis. Then, when the time is specified, the ToDo lists which are on the time axis are pasted on the time axis as billboards with signposts. On the other hand, the ToDo lists which are not on the time axis float in arbitrary positions as billboards without signposts.

Normally, the billboard icons disappear from the screen as time passes. However, in the event that a deleting operation for a ToDo list on the time axis is not carried out, the billboard icons accumulate at the bottom area, regardless of passage of time. When several billboard icons accumulate toward the bottom, the icons are layered and displayed.

Then, in the case of removing a billboard icon 738B, checking the billboard icon with the pen input operating unit 703 automatically removes the billboard icon 738B representing the ToDo list.

Next, in the event of searching the database, double-touching the database ox icon 741 with the pen input operating unit 703 switches to the database display ode for searching.

As shown in FIG. 48C, in the search mode screen 750, a search text such as a character string representing the first letters in a name, e.g., "ya" is input with the keyboard to the search work input tab 752, and touching the binoculars icon 754 with the with the pen input operating unit 703 starts and search. After the search is completed, the data can be displayed.

This brings up the data in the data list display screen 760, as shown in FIG. 48D. Double-touching the selection tab 762 of the desired data from the data list with thwitith the pen input operating unit 703 enables detailed data to be displayed in a data display screen 770 such as shown in FIG. 48E.

Next, in the event of creating a memo, the keyboard is touched with the with the pen input operating unit 703, as shown in FIG. 48F. Then, as shown in FIG. 47A, the memo input screen 780 is opened. Handwriting ink data input is made within the memo input area 780 shown in FIG. 47A, using the pen input operating unit 703.

A note "TAXI ¥120" is handwritten in FIG. 47A. In this case, the display character is not a font such as Mincho or Gothic, but handwriting font data. Though not shown in the Figure, in the event that the input is made as text data from the keyboard, font data such as Mincho or Gothic is displayed within the memo input screen 780.

Then, touching the close box icon with the pen input operating unit closes the memo input screen 780, which is pasted on the time axis to which the memo has been created as a manhole icon, as shown in FIG. 47B. Conversely, double-touching a manhole icon 739 displays the contents of the memo.

Fifth Embodiment

Next, a fifth embodiment of the display device according to the present invention will be described with reference to FIGS. 52 through 55. Configurations the same as those in the above first, second, and third embodiments will be denoted with the same reference numerals, and detailed description thereof will be omitted. The display screen according to the present embodiment is configured as shown in FIG. 55C.

FIG. 52A shows the display screen 1002 (second display area) presently being displayed on the portable device as a window within the display screen 1000 (first display area) of the PC. The PC can access other servers on the Internet and the like and display reference material, photographs, descriptions, etc., on the screen thereof, and then transfer the displayed images to the storage unit in the portable device. In this case, a camera tool is selected using tools such as software relating to the present display device (PIM software) on the PC, the range of the image to be transferred is specified, thereby selecting the area to read. Subsequently, the image is transferred into a memo in the memo mode of the present display device.

Thus, the PC can specify the configuration of the menu screen on the display unit of the portable device. Also, comparison of the screen is simplified at both ends, thereby improving user operability.

Further, as shown in FIG. 52B, this image can be read into a ToDo list in the ToDo mode. That is, the second display area functions as a specifying area for extracting a portion of the display data displayed on the PC and specifying it as icon information. This enables selection of the display state of icon information of the portable device from the PC.

The PC and portable device can synchronize only information specified beforehand, so the PIM software proper, memo on the PIM, the downloaded e-mail, etc., can be synchronized with the present portable device. Accordingly, the image read into the display screen currently on the PC is simultaneously synchronized as data to the present portable device. Accordingly, even if the user only carries the portable device, the PIM software proper, memo on the PIM, the downloaded e-mail, etc., can be handled the same as with the PC.

Also, an arrangement may be employed wherein an icon displayed within the display screen 1000 of the PC (first icon information) is compressed and transferred to the storage unit of the present portable device, so as to display an icon (second icon information) within the display screen 1002 currently displayed on the portable device. Thus, icon information which is conceptually the same and thus is easily visually understood by the user can be displayed, while at the same time reducing the amount of data stored in the storage unit, thereby reducing memory capacity.

Further, in the event that the user performs operation input to change the prefabricated first icon information into e.g., third icon information at the display unit of the PC, the PC changes the first icon information into third icon information, and transfers it to the portable device via the communication unit. Then, an arrangement may be employed wherein the third icon information is compressed at the portable device and display control is executed so that it becomes the new second icon information.

In this case, first, in the event that the user does not case for the display form of the first icon information displayed on the display unit of the PC, third icon information is generated on the display unit by operation input of the operating unit, and the icon information is switched. Then, this third icon information is transferred to the portable device by means of operation such as dragging by the operating unit, compressing it and displaying as second icon information. Thus, the second icon information at the portable device can be made to match the changes in the state of displaying the first icon information at the PC, so a displays state that the user desires can be realized while maintaining the same concept, even without storing second icon information in the portable device.

FIG. 52C represents the details of the display screen at the portable device. In the Figure, unlike the above-described fourth embodiment, the time axis of dates is represented by the metaphor of traffic signs on the road. Also, this embodiment differs from the fourth, embodiment in that the height of the building icons represents how crowded the schedule is.

FIG. 54A shows an image read into the above ToDo list being displayed as a billboard 1118 in the mode following changing of direction. Thus, read images can be used as character data for ToDo list icons.

FIG. 54c shows an example wherein, in the event that information notification is set beforehand, audio information such as a melody is output from the audio output unit of the portable device when the set time comes, and also a pop-up menu 1142 showing a summary of the schedule is displayed next to the building icon 1140 to which the schedule has been input. Thus, the user can be notified using both audio information and display information.

FIG. 54B illustrates a display screen for writing schedules into a ToDo list. In the Figure, the mode for the ToDo list 1110 is opened, the window for the text input interface 1130 represented by the display image of the keyboard, and the keyboard tabs on the text input interface 1130 are selected using the pen input operating unit 703, or the user's finger, whereby text input is made to the ToDo list 1110.

FIG. 55A shows a note display mode 1150. In this note display mode, the order of various items can be changed, and new items can be added. Changing the order of items can be performed by touching with the user's finger or the pen input operating unit. In the case of adding new items as well, pen input can be performed by touching with the user's finger or the pen input operating unit, using the above text input interface 1130 displayed on the keyboard on the screen.

FIG. 55B displays balloon icons 1116. Touching a balloon icon 1116 allows the user to open an e-mail, and display a lower order display screen mode which displays the specific contents thereof. This is shown in FIG. 55C. Mail can be created or edited for replying by using the text input interface 1130, for the e-mail display screen 1120 shown in FIG. 55C as well.

Further, the created mail can be sent to a desired recipient. In the case of carrying out this transmission, first, the card according to the present portable device is attached to a docking station which has built therein a modem, a battery for extended use, etc., following which the portable device is connected to a telephone. Then, as shown in FIG. 53A, transmission can be performed by moving the balloon icon 1116 representing e-mail on the screen onto the postbox icon 1114. Subsequently, the portable device is automatically connected to a telephone line, and when transmission of the mail is completed, the line is automatically hung up.

FIG. 53B shows a plurality of displayed screen as received e-mail floating along the road as balloon icons 1116.

FIG. 53C shows an example of an e-mail display screen 1120 showing the specific contents of the e-mail following clicking on one of the balloon icons 1116. In the Figure, in the event that the e-mail has a schedule attached thereto, a schedule-confirming icon 1122 is displayed on the e-mail display screen 1120. Selecting this icon displays a schedule display mode of the corresponding date as a lower order menu screen.

FIG. 53D illustrates a reverse case wherein a schedule is attached to e-mail and sent. Clicking on the schedule OK button automatically registers the schedule item, and at the same time, a reply e-mail screen opens. Then, clicking on the postbox icon 1114 sends the e-mail.

Now, which the device according to the present invention and the method thereof have been described following several particular embodiments, one skilled in the art is capable of making various modifications to the embodiments of the present invention described in the text, without departing from the spirit or scope of the present invention. For example, as shown in the conceptual drawings in FIGS. 56A through 56C, the display device according to the embodiment including the portable device can be used within a network such as shown in FIGS. 56A through 56C. That is, the network can be configured so as to perform communication between the PC 1 and portable devices 2-1, 2-2, and so forth.

The embodiment has been described with the present invention being worn on the arm of the user, but the present invention is not restricted to such; rather, the present invention can be used for various purposes according to need. Also, neither the number of keys nor the key array of the portable device according to the above embodiments is not restricted to such; rather, other arrangements and other number or keys can be employed.

Also, the example described involved an LCD display being used as a display unit, but the present invention is not restricted to such; rather, other various display devices can be used, such as thin CRTs, miniature TVs using liquid crystal shutters, plasma displays, etc. Also, the image displayed on the display unit in the present invention need not be a 3-D image.

Further, in the event that the icon character data at the display unit of the PC is changeable, e.g., for a pigeon to another animal, an arrangement may be used wherein icon character data is displayed as animals on the display unit of the portable device, thereby synchronizing the portable device and the PC. In this case, the PC should be arranged to download view icon information corresponding to animals to the portable device, along with normal information.

Further, the PC 1 may be arranged to connect to other Internet servers via an Internet line LAN, WAN, intranet line, etc., and the portable device may be arranged to access other servers on the Internet line via the PC 1, and an arrangement may be used wherein information can be exchanged between the portable device 2 and other portable devices via the PC 1.

Also, though a PC has been described as the second information processing device, and the display device according to the present invention as the first information processing device, a PDA, MCC, server, etc. may be used for the first information processing device. Also, a PC is used as the second information processing device, but a workstation, mainframe, word processor device, etc., may be used instead.

Further, the device comprising the display screen described in the above fourth and fifth embodiments may be of a configuration to be worn on the arm.

What is claimed is:

1. An information processing system, comprising:
a first information processing device which performs display processing of at least one piece of first icon information which is displayed on a first menu screen; and
a second information processing device which performs display processing of at least one piece of second icon information which is displayed on a second menu screen, said second icon information having the same concept as said first icon information;
wherein said first information processing device comprises:
a first storage unit for storing said first icon information and display data corresponding to said first icon information;
a first display unit for displaying at least said first icon information, said first display unit having a plurality of first split display areas for multiple split display of said first menu screen according to differing background attributes;
a first control unit for performing display control of said first icon information upon said first display unit; and
a first communication unit for performing transmission and reception of said display data between said first information processing device and said second information processing device;
and wherein said second information processing device comprises:
a second storage unit for storing said display data and second icon information corresponding to said display data;
a second display unit for displaying said second icon information which is formed smaller than at least said first display unit, said second display unit having a plurality of second split display areas for multiple split display of said second menu screen according to differing background attributes;
a second control unit for performing display control of said second icon information upon said second display unit; and
a second communication unit for performing transmission and reception of said display data between said first information processing device and said second information processing device, and performing data matching between pieces of said display data each stored in said first and second storage units;
wherein the capacity of said second icon information is formed smaller than the capacity of said first icon information;
and wherein the background attributes of said first split display area and the background attributes of said second split display area are displayed according to common background attributes.

2. The information processing system according to claim 1, wherein the first background display of the menu screen of said first display unit and the second background display of the menu screen of said second display unit are displayed according to common background attributes.

3. The information processing system according to claim 1:
wherein said second storage unit has a plurality of pieces of attribute information for identifying the types of said display data of a plurality of types with differing attributes;
and wherein said second control unit selects said second icon information each corresponding with the attributes of said display data of a plurality of types.

4. The information processing system according to claim 1:
wherein said second icon information is comprised of said first icon information compressed and transferred to said second storage unit.

5. The information processing system according to claim 1:
wherein said first information processing device comprises a first operating unit for performing operation input for changing said first icon information on said first display unit into a third icon information;
wherein said first control unit changes said first icon information into said third icon information according to the operating unit at said first operating unit, and also performs transfer control of said third icon information to said second storage unit via said first and second communication units.

6. The information processing system according to claim 1, wherein said display data comprises e-mail information transmitted and received via said second control unit, and reception time information relating to the time at which this e-mail information has been received;
and wherein said second control unit performs display processing of said second icon information in the order of reception, based on said reception time information.

7. The information processing system according to claim 1, wherein said display data comprises input/output information wherein a schedule has been input, and specified time information which the user has specified as a scheduled execution time of said input/output information;
and wherein said second control unit performs display processing of said second icon information on said first background display area in the order of creation, based on said specified time information.

8. The information processing system according to claim 1, said second split display area comprising:
a first display area for arrayed display of said second icon information corresponding with communication information;
a second display area for arrayed display of said second icon information following at least a time axis; and
a third display area for arrayed display of said second icon information, for alphabetically searching said display data of a plurality of types received at said first and second display areas;
wherein said second control unit performs display control based on said first through third display areas.

9. The information processing system according to claim 1, wherein said second information processing device is a portable information processing device including an arm-worn portion which is worn on the arm of the user.

10. An information processing system, comprising:
a first information processing device which performs display processing of at least one piece of first icon information which is displayed on a first menu screen; and
a second information processing device which performs display processing of at least one piece of second icon information which is displayed on a second menu screen, said second icon information having the same concept as said first icon information;
wherein said first information processing device comprises:
a first storage unit for storing said first icon information and display data corresponding to said first icon information;
a first display unit for displaying at least said first icon information;
a first control unit for performing display control of said first icon information upon said first display unit; and
a first communication unit for performing transmission and reception of said display data between said first information processing device and said second information processing device;
and wherein said second information processing device comprises:
a second storage unit for storing said display data and second icon information corresponding to said display data;
a second display unit for displaying said second icon information which is formed smaller than at least said first display unit;
a second control unit for performing display control of said second icon information upon said second display unit; and
a second communication unit for performing transmission and reception of said display data between said first information processing device and said second information processing device, and performing data matching between pieces of said display data each stored in said first and second storage units;
wherein the capacity of said second icon information is formed smaller than the capacity of said first icon information;
wherein the first background display of the menu screen of said first display unit and the second background display of the menu screen of said second display unit are displayed according to common background attributes;
wherein said first and second display units have a plurality of pieces of time information related to the plurality of pieces of said display data;
wherein said first control unit performs display control based on said time information so as to display said first icon information on said first display unit in accordance with a time axis, at least;
wherein said second control unit performs display control based on said time information so as to display said second icon information on said second display unit in accordance with a time axis, at least;
and wherein the time axis of said first background display and the time axis of said second background display differ in length.

11. The information processing system according to claim 10:
wherein said first control unit performs display control so as to display said first icon information on said first display unit in accordance with N-time on said time axis;
and wherein said second control unit performs display control so as to display said second icon information on said second display unit in accordance with M-time (wherein M<N) on said time axis.

12. The information processing system according to claim 10, wherein said second information processing device further comprises timing means for keeping the current time;
and wherein said second control unit performs sequential updating processing of said display screen based on said time information of said timing means, so that said time axis and said icon information move over said screen sequentially proceeding along said single axis, in accordance with elapsing of time.

13. An information processing system, comprising:
a first information processing device which performs display processing of at least one piece of first icon information which is displayed on a first menu screen; and a second information processing device which performs display processing of at least one piece of second icon information which is displayed on a second menu screen, said second icon information having the same concept as said first icon information;

wherein said first information processing device comprises:
- a first storage unit for storing said first icon information and display data corresponding to said first icon information;
- a first display unit for displaying at least said first icon information;
- a first control unit for performing display control of said first icon information upon said first display unit; and
- a first communication unit for performing transmission and reception of said display data between said first information processing device and said second information processing device;

and wherein said second information processing device comprises:
- a second storage unit for storing said display data and second icon information corresponding to said display data;
- a second display unit for displaying said second icon information which is formed smaller than at least said first display unit;
- a second control unit for performing display control of said second icon information upon said second display unit; and
- a second communication unit for performing transmission and reception of said display data between said first information processing device and said second information processing device, and performing data matching between pieces of said display data each stored in said first and second storage units;

wherein the capacity of said second icon information is formed smaller than the capacity of said first icon information;

wherein said first storage unit further comprises said second icon information;

and wherein said first control unit performs control such that a second display area for displaying said second icon information is superimposed on a first display area for displaying said first icon information, based on both said first icon information and said second icon information.

14. The information processing system according to claim 13:
wherein said second display area is an area formed by extracting a portion of the display data displayed within said first display area and specifying as said second icon information.

15. An information processing system, comprising:
a first information processing device which performs display processing of at least one piece of first icon information which is displayed on a first menu screen; and
a second information processing device which performs display processing of at least one piece of second icon information which is displayed on a second menu screen, said second icon information having the same concept as said first icon information;

wherein said first information processing device comprises:
- a first storage unit for storing said first icon information and display data corresponding to said first icon information;
- a first display unit for displaying at least said first icon information;
- a first control unit for performing display control of said first icon information upon said first display unit; and
- a first communication unit for performing transmission and reception of said display data between said first information processing device and said second information processing device;

and wherein said second information processing device comprises:
- a second storage unit for storing said display data and second icon information corresponding to said display data;
- a second display unit for displaying said second icon information which is formed smaller than at least said first display unit;
- a second control unit for performing display control of said second icon information upon said second display unit; and
- a second communication unit for performing transmission and reception of said display data between said first information processing device and said second information processing device, and performing data matching between pieces of said display data each stored in said first and second storage units;

wherein the capacity of said second icon information is formed smaller than the capacity of said first icon information;

wherein said second information processing device comprises a second operating unit for performing operation input for changing the display of said second display unit;

wherein said second control unit registers said display data to said second storing means anew, based on the operation input at said second operation unit, and performs display control of said second icon information anew upon said menu screen.

16. The information processing system according to claim 15, said second information processing device further comprising:
an audio input unit for inputting audio information; and
an audio input control unit for input control of the audio information of said audio input unit, based on operating input of said second operating unit;
wherein said second control unit performs display control of said second icon information upon a menu screen, based on the input control of audio information at said audio input control unit.

17. The information processing system according to claim 15, said second information processing device comprising:
an audio output unit for outputting audio information; and
an audio output control unit for output control of the audio information of said audio output unit, based on operating input of said second operating unit;
wherein said second control unit performs output control of audio information at said audio output control unit, and performs display control so as to erase said second icon information, based on the operating input at said second operating unit.

18. The information processing system according to claim 15, wherein said second control unit performs display control such that the unit-time intervals on said time axis becomes variable.

* * * * *